United States Patent
ChoFleming et al.

(10) Patent No.: US 12,530,296 B2
(45) Date of Patent: Jan. 20, 2026

(54) SYSTEMS, APPARATUS, ARTICLES OF MANUFACTURE, AND METHODS FOR IMPROVED DATA TRANSFER FOR HETEROGENEOUS PROGRAMS

(71) Applicant: Intel Corporation, Santa Clara, CA (US)

(72) Inventors: Kermin ChoFleming, Hudson, MA (US); Swapna Raj, Westport, CT (US)

(73) Assignee: Intel Corporation, Santa Clara, CA (US)

( * ) Notice: Subject to any disclaimer, the term of this patent is extended or adjusted under 35 U.S.C. 154(b) by 781 days.

(21) Appl. No.: 17/710,524

(22) Filed: Mar. 31, 2022

(65) Prior Publication Data

US 2022/0222177 A1     Jul. 14, 2022

(51) Int. Cl.
  *G06F 12/08*     (2016.01)
  *G06F 12/0806*     (2016.01)

(52) U.S. Cl.
  CPC .. *G06F 12/0806* (2013.01); *G06F 2212/1016* (2013.01)

(58) Field of Classification Search
  CPC .. G06F 12/08; G06F 11/3433; G06F 11/3447; G06F 8/4441; G06F 12/0806;
  (Continued)

(56) References Cited

U.S. PATENT DOCUMENTS 8,970,607 B2    3/2015   Harney et al.
9,280,395 B2 *   3/2016   Jiang ..................... G06F 9/5094
(Continued)

FOREIGN PATENT DOCUMENTS

KR     20220076325 A *   6/2022  ............. G06F 12/08
WO    WO-2019020651 A2 *   1/2019  ........... G06F 9/5016
WO    2022125133           6/2022

OTHER PUBLICATIONS

L. Alvarez et al., "Runtime-Guided Management of Scratchpad Memories in Multicore Architectures," 2015 International Conference on Parallel Architecture and Compilation (PACT), San Francisco, CA, USA, 2015, pp. 379-391.*
(Continued)

*Primary Examiner* — Pierre Michel Bataille
(74) *Attorney, Agent, or Firm* — Hanley, Flight & Zimmerman, LLC

(57) ABSTRACT

Methods, apparatus, systems, and articles of manufacture are disclosed for improving data transfer for heterogeneous programs. An example apparatus includes instructions in the apparatus, and processor circuitry to at least one of execute or instantiate the instructions to determine a runtime associated with executing a code object by a heterogeneous electronic device based on at least one of a location of a memory object or a data transfer penalty, the data transfer penalty associated with access of the memory object in response to execution of the code object, identify a memory operation for the memory object based on the runtime, and generate an executable file based on the memory operation, the executable file, when executed, to cause execution of the code object by at least one of first hardware or second hardware of the heterogeneous electronic device based on the memory operation.

25 Claims, 21 Drawing Sheets

(58) Field of Classification Search
CPC .... G06F 11/302; G06F 15/7867; G06F 30/34; G06F 2212/1016; G06F 2209/509; G06F 12/0813; G06F 2201/835; G06F 12/0811; F06F 11/30

See application file for complete search history.

(56) References Cited

U.S. PATENT DOCUMENTS

| | | | | |
|---|---|---|---|---|
| 9,430,369 | B2* | 8/2016 | Doerr | G06F 9/3853 |
| 10,447,273 | B1 | 10/2019 | Roberts et al. | |
| 11,093,277 | B2* | 8/2021 | Sankaran | G06F 9/3001 |
| 11,243,816 | B2* | 2/2022 | Goossens | G06F 9/505 |
| 11,263,060 | B2* | 3/2022 | O'Donncha | G06F 8/451 |
| 2011/0320786 | A1* | 12/2011 | Chen | G06F 8/4442 |
| | | | | 711/E12.017 |
| 2013/0239128 | A1* | 9/2013 | Dawson | G06F 9/548 |
| | | | | 719/320 |
| 2015/0242786 | A1* | 8/2015 | Abraham | G06Q 10/06316 |
| | | | | 705/7.26 |
| 2017/0242672 | A1* | 8/2017 | Bean | G06F 8/4441 |
| 2018/0157531 | A1 | 6/2018 | Bobba et al. | |
| 2019/0155367 | A1 | 5/2019 | Rao et al. | |
| 2019/0155658 | A1 | 5/2019 | Cheng et al. | |
| 2019/0317880 | A1* | 10/2019 | Herr | G06F 11/3447 |
| 2019/0347125 | A1* | 11/2019 | Sankaran | G06F 9/3877 |
| 2021/0028952 | A1* | 1/2021 | Baribault | H04L 65/1073 |
| 2021/0318984 | A1* | 10/2021 | Park | G06F 15/7807 |
| 2022/0107793 | A1* | 4/2022 | Capota | G06N 3/08 |
| 2023/0027823 | A1* | 1/2023 | Jones | G06F 8/443 |
| 2023/0333911 | A1* | 10/2023 | Zoller, IV | G06F 9/5077 |

OTHER PUBLICATIONS

Yan Solihin, Jaejin Lee and J. Torrellas, "Automatic code mapping on an intelligent memory architecture," in IEEE Transactions on Computers, vol. 50, No. 11, pp. 1248-1266, Nov. 2001.*

S. A. Ostadzadeh, M. Corina, C. Galuzzi and K. Bertels, "Runtime extraction of memory access information from the application source code," 2011 International Conference on High Performance Computing & Simulation, Istanbul, Turkey, 2011, pp. 647-655.*

Lee Joo Hyun et al., KR-20220076325-A, "Host Appratus, Heterogeneous System Architecture Device and Heterogeneous System based on Unified Virtual Memory", Jun. 8, 2022.*

* cited by examiner

← 800

| KERNEL IDENTIFIER (KERNEL ID) | EXECUTION TARGET | OBJECTS ACCESSED BY KERNEL (OBJECT ID) |
|---|---|---|
| 0 | HOST | 0, 2, 3 |
| 1 | ACCELERATOR | 0, 1, 2, 3 |
| 2 | ACCELERATOR | 0, 2 |
| 3 | HOST | 0, 1, 3 |
| 4 | ACCELERATOR | 0, 3 |
| 5 | HOST | 0, 1 |
| 6 | ACCELERATOR | 0 |

FIG. 8

| OBJECT 0 | | | | DATA TRANSFER PENALTY TO ACCESS REMOTE MEMORY | |
|---|---|---|---|---|---|
| KERNEL ACCESS ORDER | EXE TARGET | LOCAL MEMORY | REMOTE MEMORY | IN-PLACE ACCESS FROM REMOTE MEMORY | MIGRATE PAGES TO LOCAL MEMORY |
| 0 | HOST | HOST | ACC | 100 | 200 |
| 1 | ACC | ACC | HOST | 300 | 50 |
| 2 | ACC | ACC | HOST | 20 | 100 |
| 3 | HOST | HOST | ACC | 150 | 70 |
| 4 | ACC | ACC | HOST | 200 | 100 |
| 5 | HOST | HOST | ACC | 150 | 70 |
| 6 | ACC | ACC | HOST | 30 | 20 |
| OBJECT 1 | | | | DATA TAX TO ACCESS REMOTE MEMORY | |
| KERNEL ACCESS ORDER | EXE TARGET | LOCAL MEMORY | REMOTE MEMORY | IN-PLACE ACCESS FROM REMOTE MEMORY | MIGRATE PAGES TO LOCAL MEMORY |
| 1 | ACC | ACC | HOST | 300 | 50 |
| 3 | HOST | HOST | ACC | 150 | 200 |
| 5 | HOST | HOST | ACC | 150 | 70 |
| OBJECT 2 | | | | DATA TAX TO ACCESS REMOTE MEMORY | |
| KERNEL ACCESS ORDER | EXE TARGET | LOCAL MEMORY | REMOTE MEMORY | IN-PLACE ACCESS FROM REMOTE MEMORY | MIGRATE PAGES TO LOCAL MEMORY |
| 0 | HOST | HOST | ACC | 50 | 200 |
| 1 | ACC | ACC | HOST | 20 | 200 |
| 2 | ACC | ACC | HOST | 100 | 200 |
| OBJECT 3 | | | | DATA TAX TO ACCESS REMOTE MEMORY | |
| KERNEL ACCESS ORDER | EXE TARGET | LOCAL MEMORY | REMOTE MEMORY | IN-PLACE ACCESS FROM REMOTE MEMORY | MIGRATE PAGES TO LOCAL MEMORY |
| 0 | HOST | HOST | ACC | 150 | 200 |
| 1 | ACC | ACC | HOST | 30 | 50 |
| 3 | HOST | HOST | ACC | 150 | 70 |
| 4 | ACC | ACC | HOST | 50 | 100 |

FIG. 9

SYSTEMS, APPARATUS, ARTICLES OF MANUFACTURE, AND METHODS FOR IMPROVED DATA TRANSFER FOR HETEROGENEOUS PROGRAMS

FIELD OF THE DISCLOSURE

This disclosure relates generally to processor circuitry and, more particularly, to systems, apparatus, articles of manufacture, and methods for improved data transfer for heterogeneous programs.

BACKGROUND

Heterogeneous systems, such as heterogeneous electronic devices, typically include a host component (e.g., general purpose processor circuitry) and an accelerator component (e.g., a graphics processing unit). Applications or programs executing on these heterogeneous systems may be partitioned between the host and accelerator components. The host and accelerator components may be disaggregated over an input/output (I/O) bus. Scarcity of I/O bandwidth in such heterogeneous systems can impact performance.

BRIEF DESCRIPTION OF THE DRAWINGS

FIG. 8 is a table including mappings of example kernels to example target hardware and example memory objects to be accessed during execution of the kernels.

FIG. 9 is a table including mappings of example memory objects, example target hardware, and example data taxes to access remote memory.

DETAILED DESCRIPTION

Figure 1:
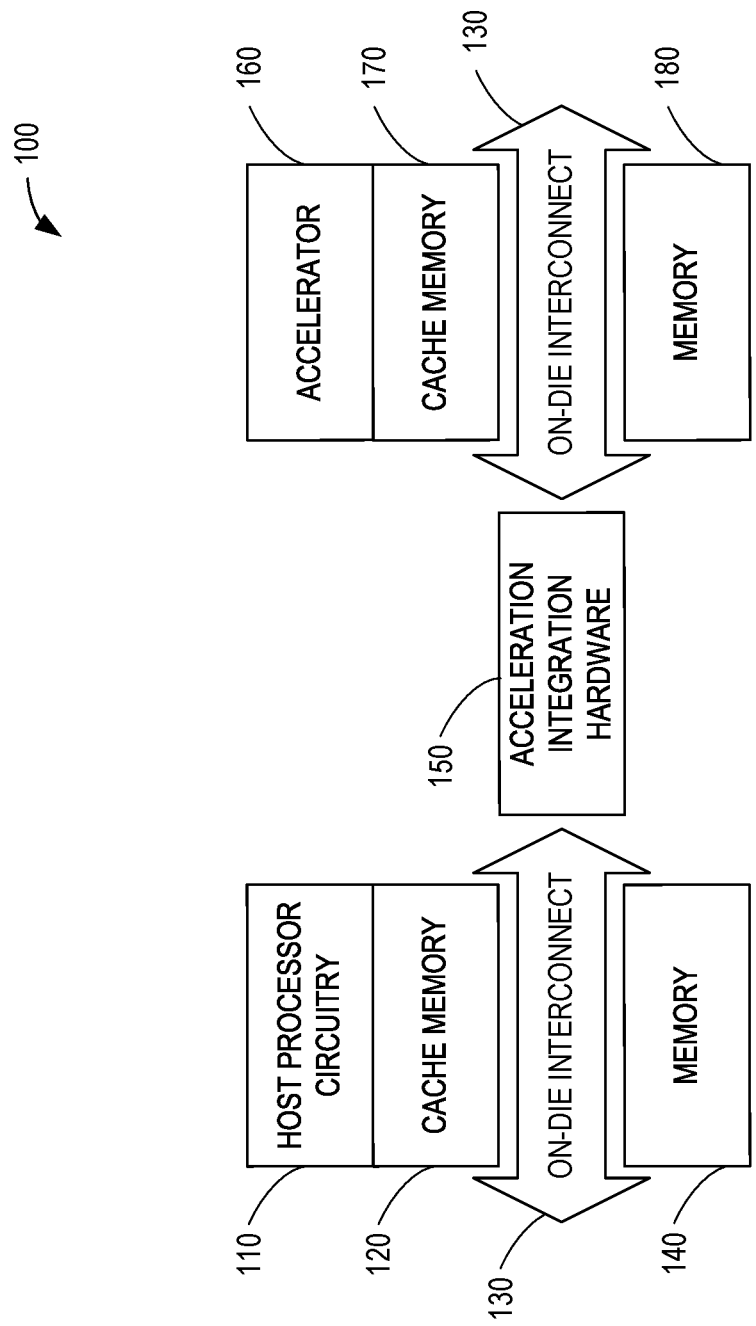
FIG. 1 is a block diagram of an example electronic system that can execute heterogeneous programs.

In general, the same reference numbers will be used throughout the drawing(s) and accompanying written description to refer to the same or like parts. The figures are not to scale.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time+/−1 millisecond.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Electronic systems (e.g., computing systems, electronic devices, etc.) have become increasingly heterogeneous with an expanded class of accelerators operating alongside host processor circuitry. These accelerators include new classes of accelerators, such as those represented by the Intel® Data Streaming Accelerator (DSA) and Intel® Hardware Queue Manager (HQM), and existing accelerator types (e.g., GPUs, general purpose GPUs (GPGPUs), accelerated processor units (APUs), and FPGAs). Effectively leveraging accelerators to reduce program execution time can be challenging in existing software systems as it can be difficult for programmers to understand when an accelerator can be beneficially used, especially for large software systems. Various factors can complicate the decision to offload a portion or partition of a program (e.g., a software application or software program) to an accelerator. Accelerator execution models (e.g., vector, spatial, etc.) and optimization patterns are different from those for some host processor circuitry (e.g., x86 processors) and it can be unclear which code segments of a program possess the right properties to map to an accelerator and how much additional performance can be achieved by offloading to an accelerator. Further, utilizing an accelerator incurs additional overhead, such as program control and data transfer overhead, and this overhead should be more than offset by the execution time reduction gains by offloading program portions to an accelerator to make the offloading beneficial. As a result, while advanced programmers may be able to identify and analyze key program loops for potential offloading, it can be difficult to identify and exploit all potential program portions that could be offloaded for program performance gains.

In some examples, programs can be quite large, so programmers may expend substantial effort for manual examination of the code to identify key loops and/or development of analytical models to support offload analysis. Manual examination of preselected key offload regions of a program does not provide enough insight into the impact of accelerators on the whole program and may be beyond the capabilities of average programmers. In some examples, programmers manage data transfer and location (e.g., location of data or memory objects in memory) for programs in a manual fashion, but such manual management may lead to less than optimal program execution. In some examples, hardware manages data transfer and location for programs in a fine-grained and localized fashion, but the hardware may consider only a short temporal access stream, which may lead to less than optimal program execution with respect to the entire program.

In some instances, automated profilers may partially support offload analysis efforts. The automated profilers can extract application metrics, but these automated profilers are partially manual rather than being fully automated because they require programmer input. Further, some existing analytical models that estimate offloaded overheads require users to identify offloaded regions and corresponding memory operations (e.g., in-place access operations, migration operations, direct access operations, etc.) prior to analysis. This does not allow a user (e.g., a developer, a programmer, etc.) to easily consider various offload strategy and/or memory operation strategy trade-offs and may result in the selection of an offload strategy and/or memory operation strategy that is inferior to other possible offload strategies and/or memory operation strategies.

Examples disclosed herein include an example offload analyzer, which includes an example memory operation selector, to allow users to analyze how industry-sized real-world applications that run on host processor circuitry may perform on heterogeneous architectures in near-native time. The example offload analyzer can estimate the performance improvement potential of a program ported to a heterogeneous electronic system. The example offload analyzer can improve the utilization of accelerators in heterogeneous systems. The example offload analyzer can generate accelerator-enabled execution strategies based on existing programs, such as any existing x86 program, and estimate performance results of the recommended execution strategies.

As used herein, the terms "accelerator," "accelerator circuitry," and "acceleration circuitry" are used interchangeably and refer to any circuitry to be utilized for program acceleration, such as an FPGA, a GPU, a GPGPU, an APU, a configurable spatial accelerator (CSA), a coarse-grained reconfigurable array (CGRA), or any other type of processing circuitry. As used herein, the terms "host" and "host processor circuitry" are used interchangeably and refer to any processing circuitry designated for executing program code in an electronic system. Reference to electronic system (e.g., computing system, electronic device, etc.) heterogeneity refers to the availability of different types of processing circuitry in an electronic system for program execution.

The example offload analyzer can improve estimation of the performance of existing programs on electronic systems with heterogeneous architectures, understand performance-limiting bottlenecks in the program, and identify offload implementations (or strategies, recommendations, etc.) for a given heterogeneous architecture that improves program performance. Offload analyses can be performed at near-native runtime speeds. To generate performance estimates for a heterogeneous program (e.g., a version of the program under analysis that, when executed, offloads portions of a program, such as code objects, from host processor circuitry to an accelerator), runtime metrics generated from the execution of the program on host processor circuitry are transformed to reflect the behavior of the heterogeneous architecture.

In some examples, the offload analyzer includes an analytic accelerator model. The accelerator model can model a broad class of accelerators, including spatial architectures and GPUs. In some examples, the offload analyzer generates estimated accelerator metrics for program code objects (e.g., regions, portions, parts, partitions, or segments—as used herein, these terms are used interchangeably) based on runtime metrics collected during execution of the program on host processor circuitry, such as an x86 processor. The example offload analyzer can further generate modeled data transfer metrics based on runtime metrics. For example, the offload analyzer can track the memory footprint of each loop or function, which allows for a determination of how much memory and which memory structures in memory are used by the loop or function. In some examples, the runtime metrics can include metrics indicating the memory footprint for code objects, which can be used by the data transfer model to estimate how much offload overhead time is spent in transferring data to an offloaded code object.

In some examples, once estimated accelerator metrics are generated, the offload analyzer can estimate the performance of code objects if the code objects are offloaded to the target accelerator. The example offload analyzer can use a constraint-based approach in which target platform characteristics, such as cache bandwidth and data path width, are used to estimate accelerator execution times for code objects based on various constraints. In some examples, the maximum of these estimated accelerator execution times is the estimated accelerator execution time for the code object. There is also overhead associated with transferring control and data to the accelerator. These offload costs are added to the estimated accelerator execution time to derive an estimated accelerated time for the code object. In some examples, if a code object is to run quicker (e.g., with a reduced runtime) on an accelerator than on host processor circuitry based on its host processor circuitry execution time and estimated accelerated time, the code object is selected for offloading.

In some examples, the offload analyzer selects code objects for offloading that, if considered independently, would run slower if offloaded to an accelerator. In some examples, the relative cost of transferring data and program control to the accelerator can be reduced by executing more temporally local (e.g., a loop nest) portions of the program on the accelerator. In some examples, the offload analyzer can offload a code object that executes slower on the accelerator than on host processor circuitry (e.g., serial code running on an x86 processor) to avoid the cost of moving data.

Management of data locality in heterogeneous systems is challenging, particularly as conventional I/O buses allow remote access to data in addition to data transfer to target hardware. As I/O bandwidth is scarce, data transfers can have substantial performance impact and thus determining the correct choice between data transfer and remote access is an important factor for application performance and/or the determination to offload code object(s). The example memory operation selector disclosed herein can optimize and/or otherwise improve data locations and transfers with respect to a host-accelerator-partitioned program. In some examples, the memory operation selector can incorporate such optimizations and/or improvements into programs in an automated fashion, including incorporation as hints to a runtime system.

In some examples, the memory operation selector generates per-data structure data transfer strategies across an entire program execution. In some examples, the memory operation selector can generate the per-data structure data transfer strategies to indicate which data objects (e.g., memory objects) should be transferred across the program to improve performance and to reduce total data transfer bandwidth. Advantageously, the example memory operation selector can improve data transfer to improve program execution time and system energy consumption.

FIG. 1 is a block diagram of an example electronic system 100 that can execute heterogeneous programs. For example, the electronic system 100 can be a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of electronic and/or computing device.

The electronic system 100 includes example host processor circuitry 110, first example cache memory 120, an example on-die interconnect (ODI) 130, first example memory 140, example accelerator integration hardware 150, an example accelerator 160, second example cache memory 170, and second example memory 180. In some examples, the host processor circuitry 110 can be implemented by one or more integrated circuits, logic circuits, FPGAs, microprocessors, CPUs, GPUs, DSPs, and/or microcontrollers from any desired family or manufacturer. In some examples, the host processor circuitry 110 may be implemented by one or more semiconductor based (e.g., silicon based) devices. For example, the host processor circuitry 110 can be an x86 processor. In some examples, the accelerator 160 can be implemented by an FPGA, a GPU, a GPGPU, an APU, a CSA, a CGRA, or any other type of accelerator. For example, the accelerator 160 can be a GPU.

In the illustrated example, the host processor circuitry 110 has access to a memory hierarchy that includes the first cache memory 120 and the first memory 140. The ODI 130 allows for communication between the host processor circuitry 110 and the accelerator 160. The ODI 130 can include and/or otherwise implement a network, such as a mesh network or a ring network, which connects multiple constituent components of an integrated circuit component. In some examples, the ODI 130 can be implemented by an interconnect technology capable of connecting two components located on the same integrated circuit die or within the same integrated circuit component but located on separate integrated circuit dies, such as Peripheral Component Interconnect (PCI), Peripheral Component Interconnect express (PCIe), Compute Express Link (CXL), or the like.

The accelerator 160 of the illustrated example has access to a memory hierarchy that includes the second cache memory 170 and the second memory 180. The accelerator 160 can be located and/or otherwise disposed on the same integrated circuit die as the host processor circuitry 110, within the same integrated circuit component as but on a different integrated circuit die than the host processor circuitry 110, or within an integrated circuit component that is separate from the integrated circuit component including the host processor circuitry 110. In some examples, if the accelerator 160 and the host processor circuitry 110 are located on separate integrated circuit components, they can communicate via any interconnect technology that allows for communication between computing system components, such as PCI, PCIe, Intel® Ultra Path Interconnect (UPI), Intel® QuickPath Interconnect (QPI), or the like. In some examples, the memory hierarchy accessible by the host processor circuitry 110 includes the second memory 180 and the memory hierarchy accessibly by the accelerator 160 includes the first memory 140.

The electronic system 100 of the illustrated example is a heterogeneous system (e.g., a heterogeneous electronic or computing system). For example, when the electronic system 100 is executing an application or program (e.g., a heterogeneous application or program), some portions of the application/program can be executed on the host processor circuitry 110 and some portions of the application/program can be executed on the accelerator 160. In some examples, a heterogeneous program can represent workload(s) (e.g., compute or computing workloads) that can be partitioned to be executed in part by the host processor circuitry 110 and in part by the accelerator 160.

Naively, in some examples, one would assume that the choice of execution (e.g., whether to execute on the host processor circuitry 110 or the accelerator 160) depends only on the parallelism exhibited by the program portion. For example, more serial codes stay on the host processor circuitry 110 and more parallel codes move to the accelerator 160. However, the choice of where a particular portion will execute depends on a number of factors, such as parallelism, memory access properties, and data location (e.g., whether a data or memory object is stored in the first cache memory 120, the first memory 140, the second cache memory 170, the second memory 180, etc.). For example, parallel code accessing data located on the host processor circuitry 110 may run faster on the host processor circuitry 110, simply because the data is resident. At the same time, if the code is sufficiently parallel it may be faster to transfer the data to the accelerator 160 and incur a data transfer penalty or cost (e.g., a time associated with transferring and/or otherwise accessing the data) to execute on the accelerator 160 with localized data, and to transfer data back to the host processor circuitry 110. In some examples, data transfer penalties are a first order determiner of system performance as host-accelerator communication bandwidths are often much lower than main memory bandwidths, especially in high bandwidth memory (HBM) based systems.

Decisions as to where data should be homed and how it should be transferred are less complex when analyzing single subroutines of a program. However, data location is stateful and choices regarding location in one subroutine can influence decisions made in other subroutines. Thus, a purely local decision, such as made by a human-in-the-loop or by hardware with limited scope, may be deeply suboptimal.

Examples described herein can optimize and/or otherwise improve data location and transfer decisions in an automated fashion at the scope of the entire program, using scalable polynomial-time analysis routines. Given a pre-existing choice of where subroutines of a program are to be executed (e.g., the host processor circuitry 110 or the accelerator 160) and data regarding memory access patterns, examples described herein can optimize and/or otherwise improve determinations of where data should be located and when data should be transferred between the host processor circuitry 110 and the accelerator 160 to reduce program execution time and system energy consumption.

Figure 2:
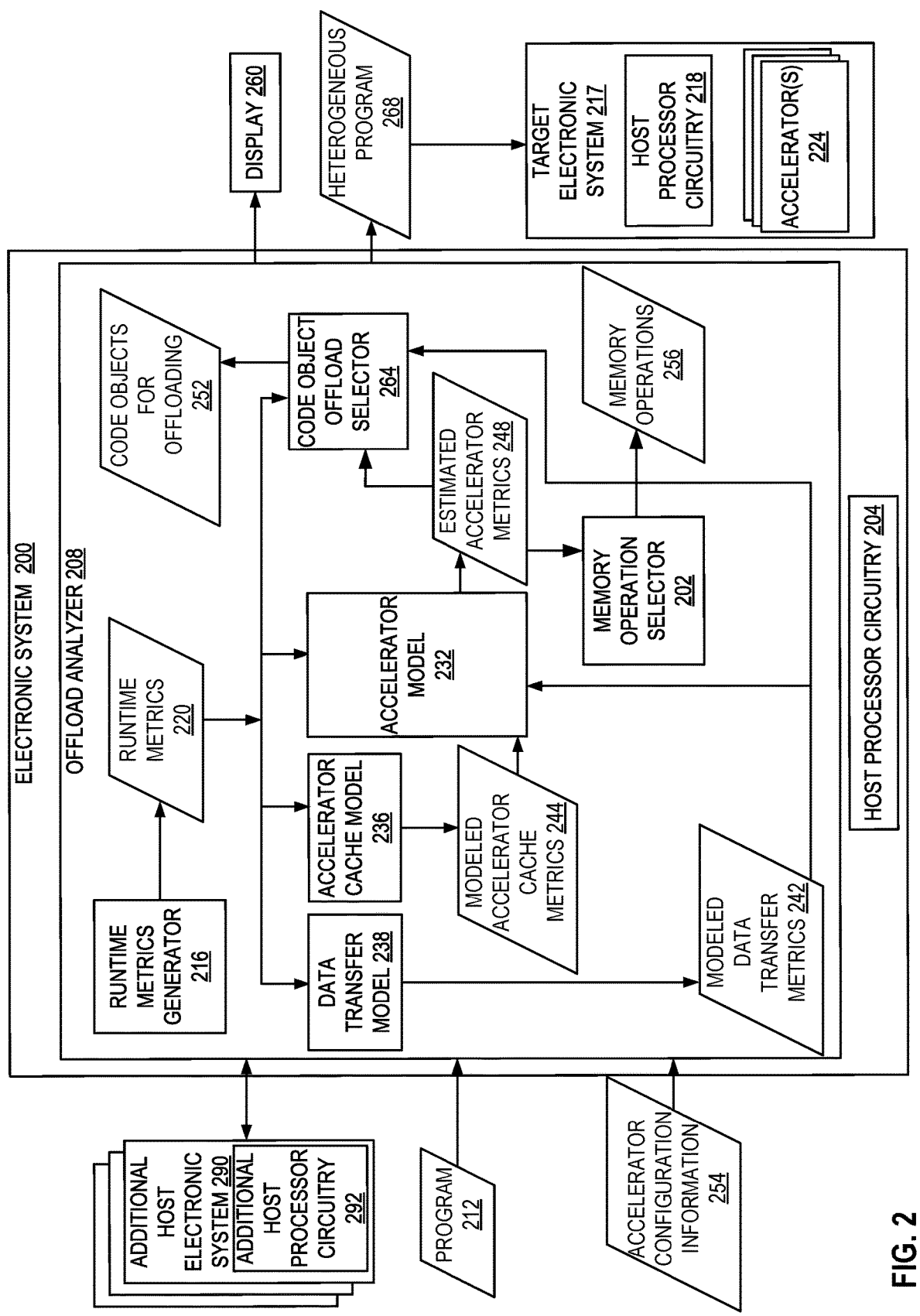
FIG. 2 is a block diagram of an example offload analyzer including an example memory operation selector.

FIG. 2 is a block diagram of an example offload analyzer 208 including an example memory operation selector 202. In the illustrated example, the offload analyzer 208 is implemented by and/or otherwise executed on an example electronic system 200, which includes first example host processor circuitry 204. In some examples, the electronic system 200 can implement the electronic system 100 of FIG. 1. In some examples, the first host processor circuitry 204 can implement the host processor circuitry 110 of FIG. 1. In some examples, the offload analyzer 208 is implemented as a software development kit (SDK). For example, the electronic system 200 can download and/or otherwise obtain an SDK that, when installed and executed on the electronic system 200, can instantiate the offload analyzer 208 to execute the examples described herein.

In some examples, the offload analyzer 208 is software that operates on the hardware resources (e.g., the first host processor circuitry 204) of the electronic system 200. In some examples, the offload analyzer 208 can be firmware, hardware, or a combination of software, firmware, or hardware. In some examples, the offload analyzer 208 estimates the performance improvements of (i) an example program 212 executing on an example heterogenous target electronic system 217, which includes second example host processor circuitry 218 (which can be of the same processor type as the first host processor circuitry 204 or a different processor type) and an example accelerator 224, over (ii) the performance of the program 212 executing on the first host processor circuitry 204 and without the benefit of an accelerator (e.g., the accelerator 224). In some examples, the offload analyzer 208 estimates the performance improvements based on estimated performance improvements of code objects of the program 212 if the program 212 were ported to the target electronic system 217 and the code objects were offloaded to the accelerator 224. The offload analyzer 208 can consider various offload implementations (e.g., offload strategies) in which different sets of code objects are considered for offloading and determine an offload implementation that provides the optimal and/or otherwise best performance improvement out of the various offload implementations considered.

In some examples, the program 212 can be any program executable (e.g., an executable binary file, a program executable file, one or more kernels, etc.) on host processor circuitry (e.g., the first host processor circuitry 204, the second host processor circuitry 218). In the illustrated example, the target electronic system 217 includes multiple instances of the accelerator 224. Alternatively, the target electronic system 217 may include a single instance of the accelerator 224. In some examples, the target electronic system 217 may include multiple accelerators of different types. In some examples, the accelerator(s) 224 can implement the accelerator 160 of FIG. 1.

In the illustrated example, the offload analyzer 208 includes an example runtime metrics generator 216, an example accelerator model 232, an example accelerator cache model 236, an example data transfer model 238, an example code object offload selector 264, and the example memory operation selector 202. In some examples, the runtime metrics generator 216 can cause the program 212 to be executed by the first host processor circuitry 204 to generate the runtime metrics 220 that are used by the accelerator model 232, the accelerator cache model 236, and the data transfer model 238. The runtime metrics 220 (e.g., actual runtime metrics, observed runtime metrics, etc.) can be generated by instrumentation code that is added to the program 212 prior to execution on the first host processor circuitry 204. For example, the instrumentation code can generate the runtime metrics 220, which can include program performance information during execution of the program 212. Thus, the runtime metrics 220 can indicate the performance of the program 212 executing on the first host processor circuitry 204, the second host processor circuitry 218, etc.

In some examples, the runtime metrics 220 can include metrics (e.g., values of parameters, statistics, etc.), that indicate program operation balance, program dependency characteristics, and/or other program characteristics. In some examples, the runtime metrics 220 can include metrics such as loop trip counts, the number of instructions performed in a loop iteration, a loop execution time, a number of function calls, a number of instructions performed in a function call, function execution times, data dependencies between code objects, data (e.g., data structures, data objects, memory objects, etc.) provided to a code object in a code object call, data returned by a called code object, code object size, etc. In some examples, the runtime metrics 220 can include a number of memory accesses (e.g., a number of reads, a number of writes, total number of reads and/or writes, etc.) made by a code object, an amount of memory traffic (e.g., an amount of data read from memory, an amount of data written to memory, a total amount of data read from and/or written to memory, etc.) between host processor circuitry (e.g., the first host processor circuitry 204, the second processor circuitry 218, etc.) and the memory subsystem generated during execution of a code object, memory address(es) accessed, etc. In some examples, the runtime metrics 220 can include a number of floating-point, integer, and total operations performed by a code object. In some examples, the runtime metrics 220 can include execution time(s) of floating-point, integer, and total operations performed by a code object. In some examples, the runtime metrics generator 216 can generate the runtime metrics 220 for the program 212 as a whole and/or individual code objects. In some examples, the runtime metrics 220 can include statistics, such as average, minimum, and/or maximum values for various runtime metrics (e.g., loop trip counts, loop/function execution time, loop/function memory traffic, etc.). In some examples, the runtime metrics 220 can include time values, such as runtimes of respective code objects, and/or, more generally, a runtime of the program 212 as a whole. For example, a runtime of a code object can be a time duration, a time value, a time of execution, etc., that the second host processor circuitry 218 requires to execute and/or otherwise complete processing of the code object.

In some examples, the instrumentation code can be added to the program 212 by an instrumentation tool, such as the "pin" instrumentation tool offered by Intel®. For example, an instrumentation tool can insert the instrumentation code into an executable version of the program 212 to generate new code and cause the new code to execute on the first host processor circuitry 204. Additionally and/or alternatively, the offload analyzer 208, and/or, more generally, the electronic system 200, can add the instrumentation code into an executable version of the program 212.

In some examples, in addition to the runtime metrics 220 including program performance information generated during executing of the program 212 on the first host processor circuitry 204, the runtime metrics 220 can further include metrics derived by the runtime metrics generator 216 from the program performance information. For example, the runtime metrics generator 216 can generate arithmetic intensity metrics that reflect the ratio of operations (e.g., floating-point, integer, etc.) performed by the first host processor circuitry 204 to the amount of information sent from the first host processor circuitry 204 to memory (e.g., cache memory) of the electronic system 200. For example, an arithmetic intensity metric for a code object can be the ratio of floating operation performed per second by the first host processor circuitry 204 to the number of bytes sent by the first host processor circuitry 204 to memory (e.g., L1 cache memory).

In some examples, the runtime metrics generator 216 or another component of the offload analyzer 208 can identify code objects of the program 212. For example, the runtime metrics generator 216 can identify code objects within the program 212 based on code object information supplied to the runtime metrics generator 216, and/or, more generally, the offload analyzer 208. In some examples, the runtime metrics 220 include metrics for fewer than all of the code objects in the program 212.

Accelerators can have architectural features that are different from host processor circuitry, such as wider vector lanes or larger register files. Due to these differences, the runtime metrics 220 may need to be modified to reflect the expected performance of code objects on an accelerator. In some examples, the offload analyzer 208 can utilize several models to estimate the performance of code objects offloaded to an accelerator: the accelerator model 232, the accelerator cache model 236, and the data transfer model 238. The accelerator model 232 can generate estimated accelerator metrics 248 indicating estimated performance for code objects if they were offloaded to a target accelerator. For example, for accelerators with configurable architectures (e.g., an FPGA, a CSA, etc.), the number of accelerator resources used in the offload analysis is estimated from the first host processor circuitry 204 instruction stream and the runtime metrics 220 associated with the consumption of compute resources on the first host processor circuitry 204 can be used to generate estimated compute-bound accelerator execution time of offloaded code objects.

In some examples, the accelerator cache model 236 models the performance of the memory hierarchy available to the accelerator on the target electronic system 217. The accelerator cache model 236 can model the cache memories (e.g., L1, L2, L3, last level cache (LLC), etc.) and can additionally model one or more levels of system memory (that is, one or more levels of memory below the lowest level of cache memory in the memory hierarchy, such as a first level of (embedded or non-embedded) DRAM). In some examples, the accelerator cache model 236 models memory access elision. For example, some host processor circuitry architectures, such as x86 processor architectures, are relatively register-poor and make more programmatic accesses to memory than other architectures. To account for this, the accelerator cache model 236 can employ an algorithm that removes some memory access traffic by tracking a set of recent memory accesses equal in size to an amount of in-accelerator storage (e.g., registers). The reduced memory stream can be used to drive the accelerator cache model 236 to provide high fidelity modeling of accelerator cache behavior.

In some examples, the accelerator cache model 236 generates modeled accelerator cache metrics 244 based on the runtime metrics 220 and accelerator configuration information 254. The accelerator configuration information 254 allows for variations in various accelerator features, such as cache configuration and accelerator operational frequency to be explored in the offload analysis for a program. The accelerator configuration information 254 can specify, for example, the number of levels in the cache, and, for each level, the cache size, number of ways, number of sets, and cache line size. The accelerator configuration information 254 can include more or less configuration information in other examples. The runtime metrics 220 utilized by the accelerator cache model 236 to generate the modeled accelerator cache metrics 244 include metrics related to the amount of traffic sent between the first host processor circuitry 204 and the cache memory available to the first host processor circuitry 204. The modeled accelerator cache metrics 244 can include metrics for one or more of the cache levels (e.g., L1, L2, L3, LLC, etc.). In some examples, if the target accelerator is located in an SoC, the LLC can be a shared memory between the accelerator and host processor circuitry. The modeled accelerator cache metrics 244 can include metrics indicating the amount of traffic to a first level of DRAM (which can be embedded DRAM or system DRAM) in the memory subsystem. The modeled accelerator cache metrics 244 can include metrics on a code object basis as well as on a per-instance and/or a per-iteration basis for each code object.

In some examples, the data transfer model 238 models the offload overhead associated with transferring information (e.g., code objects, data, memory objects, etc.) between host processor circuitry and an accelerator. The data transfer model 238 can account for the locality of the accelerator to the host processor circuitry, with data transfer overhead being less for accelerators located on the same integrated circuit die or integrated circuit component as host processor circuitry than an accelerator located in a separate integrated circuit component from the one containing the host processor circuitry. The data transfer model 238 can utilize the runtime metrics 220 (e.g., code object call frequency, code object data dependencies (such as the amount of information provided to a called code object, the amount of information returned by code object), code object size, etc.) to generate modeled data transfer metrics 242. The modeled data transfer metrics 242 can include an estimated amount of offload overhead for individual code objects associated with data transfer between host processor circuitry and an accelerator.

In some examples, the accelerator model 232 can model the behavior of the accelerator on which offloaded code objects are to run and can generate estimated accelerator metrics 248 for the program 212 based on at least one of the runtime metrics 220, the modeled accelerator cache metrics 244, or the modeled data transfer metrics 240. In some examples, the estimated accelerator metrics 248 are generated based on the acceleration configuration information. The estimated accelerator metrics 248 can include metrics indicating the estimated performance of offloaded program code objects. The estimated accelerator metrics 248 can include an estimated accelerator execution time for individual code objects. In some examples, the accelerator model 232 utilizes Equations (1) and (2) below or similar equations to determine an estimated accelerated time for an offloaded code object.

$$T_{accelerated} = T_{overhead} + T_{accel\,exec},\quad \text{Equation(1)}$$

$$T_i = \max \begin{cases} T_i^{Compute} \\ T_i^{M_{k\,only}}(M_i^k) = \dfrac{M_i^k}{BW_k}, \end{cases} \quad \text{Equation(2)}$$

The estimated accelerated time for a code object, $T_{accelerated}$, includes an estimate of the overhead involved in offloading the code object to the accelerator, $T_{overhead}$, and an estimated accelerator execution time for the code object, $T_{accel\,exec}$.

The estimated offload overhead time can depend on the type of the accelerator 224 and/or the architecture of the target electronic system 217. In some examples, the estimated offload overhead time for a code object can include one or more of the following components: a modeled data transfer time generated by the data transfer model 238, a kernel launch overhead time, and reconfiguration time. Not all of these offload overhead components may be present in a particular accelerator. The kernel launch time can represent the time to invoke a function to be run on the accelerator by the code object (e.g., the time to copy kernel code to the accelerator). The reconfiguration time can be the amount of time it takes to reconfigure a configurable accelerator (e.g., an FPGA, a Configurable Computing Accelerator (CCA), etc.).

In some examples, the estimated accelerator execution time is based on a compute-bound constraint and one or more memory-bound constraints. As such, the example of Equation (2) above can be considered to be a roofline model for determining an estimated accelerator execution time. In some examples, the estimated accelerator execution time for a code object can consider additional constraints, such as software constraints (e.g., loop iteration counts and data dependencies, such as loop-carried dependencies, etc.).

In the example of Equation (2) above, $T_i$ is the runtime for kernel i. In the example of Equation (2) above, $T_i^{Compute}$ is an estimated compute-bound accelerator execution time for a code object and can be based on one or more of the runtime metrics 220 associated with the code object, such as loop trip count, function/loop call count, number of floating-point and integer operation performed in a loop or function, code object execution time, etc., and/or any combination(s) thereof. Some existing accelerator classes are more parallel than some existing classes of host processor circuitry and in some examples, the accelerator model 232 determines whether accelerator parallelism can be utilized by analyzing loop trip counts and cross-iteration dependencies in the runtime metrics 220. Depending on the type of accelerator being contemplated for use in offloading, different algorithms can be used to convert runtime metrics to estimated accelerator metrics.

In the example of Equation (2) above, $$T_i^{M_{k\,only}}$$

is an estimated memory-bound accelerator execution time for a code object for the kth level of the memory hierarchy of the target electronic system 217. In the example of Equation (2) above, $M_i^k$ represents the memory traffic at the kth level of the memory hierarchy for the code object and $BW_k$ represents the memory bandwidth of the kth level of the memory hierarchy. The accelerator cache model 236 can generate $M_i^k$ and $M_i^k$ can be included in the modeled accelerator cache metrics 244. As there are multiple memory levels in a memory hierarchy, any one of them (e.g., L1, L2, L3, LLC, DRAM, etc.) could set the estimated accelerator execution time for a code object. In the example of Equation (2) above, the runtime for kernel i is the maximum of the bound of the kernel compute operations on the target electronic system 217 and the bound of the kernel memory bandwidth on the target electronic system 217. Additionally and/or alternatively, any other quantity and/or type of constraint may be utilized to determine the runtime for kernel i such as data transfer and remote memory access limits.

In some examples, the estimated accelerator metrics 248 can include, for individual code objects, at least one of an estimated accelerated time, an estimated offload overhead time, an estimated accelerator execution time, a modeled data transfer time, an estimated compute-bound accelerator execution time, or an estimated memory-bound accelerator execution time for multiple memory hierarchy levels. In some examples, the estimated accelerator metrics 248 can include at least one of a speed-up factor reflecting an improvement in offloaded code object performance, an estimated amount of memory traffic (read, write, total), or an estimated amount of data transferred from the second host processor circuitry 218 to the accelerator 224 and vice versa.

In some examples, the accelerator model 232 can determine which code objects are offloadable and determine estimated accelerated times for just the offloadable code objects. The accelerator model 232 can determine which code objects to be offloadable based on code object characteristics and/or accelerator characteristics. For example, the accelerator model 232 can determine a loop code object to be offloadable if the loop can be implemented in the accelerator 224. That is, for a spatial accelerator, the accelerator model 232 can determine a loop to be offloadable if there are enough programming elements in the accelerator 224 to implement the loop. The code object offload selector 264 can select code objects for offloading 252 based on at least one of the estimated accelerator metrics 248, the modeled data transfer metrics 240, or the runtime metrics 220.

In the illustrated example, the offload analyzer 208 can generate one or more example heterogeneous programs 268. In some examples, the heterogeneous programs 268 are versions of the program 212 that can operate on the heterogeneous target electronic system 217. The heterogeneous programs 268 can be written in any programming language that supports program operation on a heterogeneous platform, such as OpenCL, OpenMP, or Data Parallel C++ (DPC++). The code objects for offloading 252 can be included in a recommended offload implementation (e.g., an offload implementation recommendation). In some examples, a recommended offload implementation can be presented to a user (e.g., a programmer) in the form of an offload analysis report, which can be displayed on an example display 260 coupled to the electronic system 200 or a different electronic system. The display 260 can be integrated into, wired or wirelessly attached to, or accessible over a network by the electronic system 200. For example, the display 260 can be implemented by one or more display devices (e.g., a light emitting diode (LED) display, an organic light emitting diode (OLED) display, a liquid crystal display (LCD), a cathode ray tube (CRT) display, an in-place switching (IPS) display, a touchscreen, etc.).

In some examples, the code object offload selector 264 can automatically select the code objects for offloading 252. In some examples, the code object offload selector 264 can determine an offload implementation by selecting code objects for offloading if their associated estimated accelerated time is less than their associated host processor circuitry execution time, or if their associated estimated accelerated time is less than their associated host processor circuitry execution time by a threshold amount, which could be a speed-up threshold factor, threshold time, etc. The offload analyzer 208 can generate a report for such an offload implementation, cause the report to be displayed on the display 260, generate a heterogenous version of the program for this offload implementation (e.g., the heterogeneous program 268), and cause the heterogeneous version to execute on the heterogeneous target electronic system 217.

In some examples, the memory operation selector 202 determines the location in the target electronic system 217 of each memory object during each phase of execution of the program 212. For example, the memory operation selector 202 can determine that a first code object of the code objects for offloading 252 is to be offloaded from the second host processor circuitry 218 to the accelerator 224. The memory operation selector 202 can identify which data should be migrated and when that data should be migrated in connection with execution of the first code object. In some examples, the memory operation selector 202 can determine that the first code object of the program accesses a memory object. The memory operation selector 202 can determine a location of the memory object, such as whether the memory object is stored in a data buffer of the second host processor circuitry 218 or a data buffer of the accelerator 224.

The memory operation selector 202 can determine whether the accelerator 224 is to access the first code object by way of an in-place memory access, a direct memory access, a migration operation, etc., and/or any combination(s) thereof. In some examples, an in-place memory access can be implemented by a remote access or a local access to data in memory. For example, an in-place memory access can be implemented by a remote access by the accelerator 224 to access the first code object stored in the second host processor circuitry 218. In some examples, an in-place memory access can be implemented by a local access by the accelerator 224 to access the first code object stored in the second host processor circuitry 218. In some examples, a direct memory access can be implemented by a local access of data in memory. For example, a direct memory access can be implemented by a local access by the accelerator 224 to the first code object stored in the accelerator 224). In some examples, a migration operation can be implemented by a transfer of data from first memory to second memory. For example, a migration operation can be implemented by a transfer of the first code object from the second host processor circuitry 218 to the accelerator 224. In some examples, the migration operation can be followed by an in-place access operation of the first code object by the accelerator 224 after the migration operation. Remote accesses are beneficial when the total bytes accessed by the first code object is small relative to the size of the memory object. Local accesses are beneficial when the memory object will be accessed many times in the new location, including accesses across several code object executions.

In some examples, the memory operation selector 202 determines, generates, and/or otherwise outputs example memory operations 256. The memory operations 256 are associated with operations to be executed in connection with memory objects to be accessed by code objects (e.g., the code objects for offloading 252) during execution of the heterogeneous program 268. For example, the memory operations 256 can include an in-place access memory access operation, a direct memory access operation, a migration operation, and/or any combination(s) thereof (e.g., a migration operation followed by an in-place memory access operation). In some examples, the memory operation selector 202 can output the memory operations 256 to the display 260 for presentation to a user. For example, the memory operation selector 202 can cause the memory operations 256 to be presented to a user as recommendations to improve execution of the heterogeneous program 268. In some examples, the memory operation selector 202 can insert one(s) of the memory operation 256 into the heterogeneous program 268 as memory instruction(s).

Figure 3:
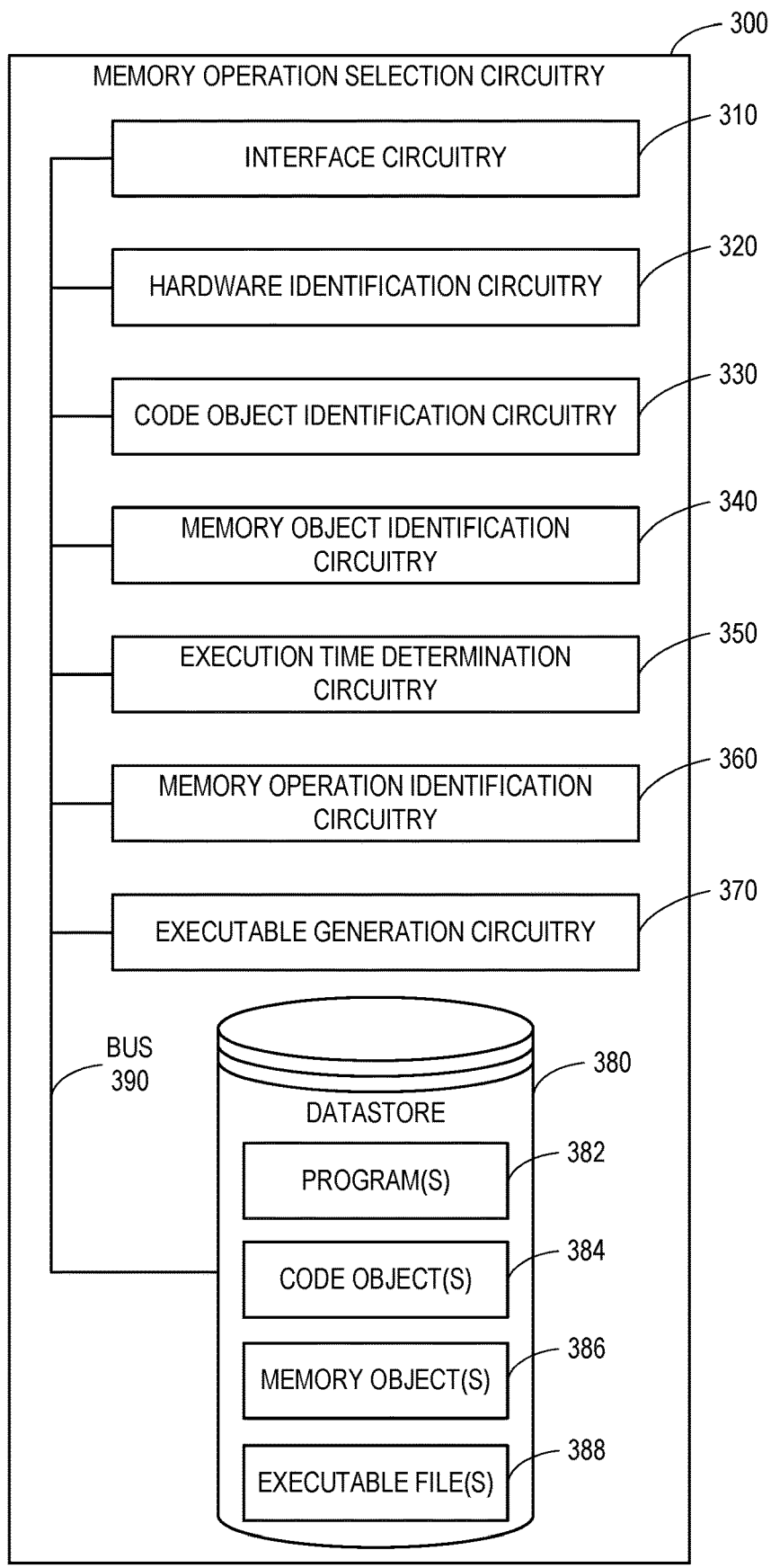
FIG. 3 is a block diagram of an example implementation of the memory operation selector of FIG. 2.

FIG. 3 is a block diagram of example memory operation selection circuitry 300. In some examples, the memory operation selection circuitry 300 improves and/or otherwise optimizes an execution of a program by improving and/or otherwise optimizing data buffer motion policy selection. The memory operation selection circuitry 300 of FIG. 3 may be instantiated (e.g., creating an instance of, bring into being for any length of time, materialize, implement, etc.) by processor circuitry such as a CPU executing instructions. Additionally or alternatively, the memory operation selection circuitry 300 of FIG. 3 may be instantiated (e.g., creating an instance of, bring into being for any length of time, materialize, implement, etc.) by an ASIC or an FPGA structured to perform operations corresponding to the instructions. It should be understood that some or all of the memory operation selection circuitry 300 of FIG. 3 may, thus, be instantiated at the same or different times. Some or all of the memory operation selection circuitry 300 may be instantiated, for example, in one or more threads executing concurrently on hardware and/or in series on hardware. Moreover, in some examples, some or all of the memory operation selection circuitry 300 of FIG. 3 may be implemented by one or more virtual machines and/or containers executing on the microprocessor. In some examples, the memory operation selection circuitry 300 can implement the memory operation selector 202 of FIG. 2.

The memory operation selection circuitry 300 of the illustrated example includes example interface circuitry 310, example hardware identification circuitry 320, example code object identification circuitry 330, example memory object identification circuitry 340, example execution time determination circuitry 350, example memory operation identification circuitry 360, example executable generation circuitry 370, an example datastore 380, and an example bus 390. In this example, the datastore 380 includes example program(s) 382, example code object(s) 384, example memory object(s) 386, and example executable file(s) 388.

In the illustrated example of FIG. 3, the interface circuitry 310, the hardware identification circuitry 320, the code object identification circuitry 330, the memory object identification circuitry 340, the execution time determination circuitry 350, the memory operation identification circuitry 360, the executable generation circuitry 370, and the datastore 380 are in communication with one(s) of each via the bus 390. For example, the bus 390 can be implemented by at least one of an Inter-Integrated Circuit (I2C) bus, a Serial Peripheral Interface (SPI) bus, a PCI bus, or PCIe bus. Additionally or alternatively, the bus 390 can be implemented by any other type of computing or electrical bus.

The memory operation selection circuitry 300 includes the interface circuitry 310 to receive and/or transmit data. In some examples, the interface circuitry 310 receives data, such as the program 212 and/or the accelerator configuration information 254 of FIG. 2. In some examples, the interface circuitry 310 transmits and/or otherwise outputs data, such as data to be presented on the display 260, the heterogeneous program, etc.

The memory operation selection circuitry 300 includes the hardware identification circuitry 320 to identify target hardware of a heterogeneous electronic device or system to execute a code object. For example, the hardware identification circuitry 320 can identify the second host processor circuitry 218, the accelerator 224, and/or, more generally, the target electronic system 217, to execute a code object of the heterogeneous program 268. In some examples, the hardware identification circuitry 320 can identify the second host processor circuitry 218 to execute a first code object of the heterogeneous program 268 and the accelerator 224 to execute a second code object of the heterogeneous program 268. In some examples, the hardware identification circuitry 320 can identify and/or otherwise determine that the first code object is to be offloaded from the second host processor circuitry 218 to the accelerator 224 for execution. In some examples, the program(s) 382 can implement the program 212 and/or the heterogeneous program 268 of FIG. 2. In some examples, the code object(s) 384 can implement the first code object and/or the second object.

The memory operation selection circuitry 300 includes the code object identification circuitry 330 to identify a code object of an application to be executed by a heterogeneous electronic device or system. For example, the code object identification circuitry 330 can identify a plurality of code objects that compose and/or otherwise make up the program 212, such as a first code object, a second object, etc. In some examples, the code object identification circuitry 330 determines that there is another code object of a program to be executed by the heterogeneous electronic device or system. For example, in response to the memory operation selection circuitry 300 processing the first code object, the code object identification circuitry 330 can determine that the second code object has not yet been processed. In some examples, the code object identification circuitry 330 can determine that all of the code objects of the program 212 have been processed.

The memory operation selection circuitry 300 includes the memory object identification circuitry 340 to identify a memory object to be accessed by target hardware of a heterogeneous electronic device or system during execution of a first code object by the target hardware. For example, the memory object identification circuitry 340 can determine that a first code object of the program 212 is to be executed by the second host processor circuitry 218. In some examples, the memory object identification circuitry 340 can determine that the first code object is to access a memory object during execution of the first code object by the second host processor circuitry 218. In some examples, the memory object(s) 386 can implement the memory object.

The memory operation selection circuitry 300 includes the execution time determination circuitry 350 to determine a runtime associated with executing a code object by a heterogeneous electronic device based on at least one of a location of a memory object or a data transfer penalty. In some examples, the data transfer penalty is associated with access of the memory object in response to execution of the code object. For example, the heterogeneous electronic device can include first hardware (e.g., the second host processor circuitry 218) and second hardware (e.g., the accelerator 224). In some examples, the execution time determination circuitry 350 determines a first time value associated with the second hardware executing the code object based on the first hardware storing the memory object. For example, the execution time determination circuitry 350 can determine the first time value based on the accelerator 224 paying and/or otherwise incurring a data transfer penalty in connection with carrying out an in-process memory access operation on a memory object to be accessed by the second hardware in response to execution of the code object.

In some examples, the execution time determination circuitry 350 determines a second time value associated with the second hardware executing the code object based on the second hardware storing the memory object. For example, the execution time determination circuitry 350 can determine the second time value based on the accelerator 224 paying and/or otherwise incurring a data transfer penalty in connection with migrating a memory object from the first hardware to the second hardware with the access of the memory object in response to execution of the code object by the second hardware.

In some examples, the execution time determination circuitry 350 determines a runtime associated with execution of the code object based on a minimum value of the first time value and the second time value. For example, the runtime associated with execution of the code object can be based on a time to execute the code object and one or more prior code objects. In some examples, the runtime associated with execution of the code object can be based on a time to execute the code object. In some examples, the execution time determination circuitry 350 can determine the second time value based on the accelerator 224 executing a direct memory access operation on the memory object.

In some examples, the execution time determination circuitry 350 determines a minimum transfer penalty (or minimum transfer cost) to access a memory object by target hardware based on one of (i) an in-place access operation (e.g., an in-place memory access operation) or (ii) a migration operation (e.g., a memory migration operation, a memory migration operation followed by an in-place memory access operation, etc.). As used herein, the terms "transfer tax," "transfer penalty," and "transfer cost" are used interchangeably and refer to a time duration associated with an access of a memory object by hardware that is not stored by and/or otherwise local to the hardware. For example, an execution of an in-place access operation by the accelerator 224 can incur a transfer penalty because time is needed to carry out the access of a memory object that is not stored by the accelerator 224. In some examples, an execution of a migration operation by the accelerator 224 can incur a transfer penalty because time is needed to transfer a memory object from the second host processor circuitry 218 to the accelerator 224. In some examples, the execution time determination circuitry 350 can determine a first time duration or time value associated with performing the in-place access operation on a memory object. In some examples, the execution time determination circuitry 350 can determine a second time duration or time value associated with performing the migration operation on the memory object.

In some examples, the execution time determination circuitry 350 can determine that the first time value is less than the second time value. For example, in response to a determination that the first time value is less than the second time value, the execution time determination circuitry 350 can identify the minimum transfer penalty to be the first time value. In some examples, in response to a determination that the second time value is less than the first time value, the execution time determination circuitry 350 can identify the minimum transfer penalty to be the second time value.

The memory operation selection circuitry 300 includes the memory operation identification circuitry 360 to identify a memory operation associated with a memory object. In some examples, the memory operation identification circuitry 360 can identify a memory operation associated with a memory object based on times of execution of whether the memory object is stored in a first data buffer associated with the second host processor circuitry 218 or in a second data buffer associated with the accelerator 224. In some examples, the memory operation identification circuitry 360 determines memory operation(s) for memory object(s) based on minimum execution time(s) of code object(s).

In some examples, in response to a determination that a first time value associated with an in-place access operation is less than a second time value associated with a migration operation, the memory operation identification circuitry 360 can select a memory operation to be the in-place access operation. In some examples, in response to a determination that the second time value is less than the first time value, the memory operation identification circuitry 360 can select the memory operation to be the migration operation.

The memory operation selection circuitry 300 includes the executable generation circuitry 370 to generate an executable file based on the memory operation. For example, the executable file can be executed or instantiated by processor circuitry to cause execution of a code object by at least one of first hardware or second hardware of a heterogeneous electronic device based on the memory operation. In some examples, the executable generation circuitry 370 can compile the heterogeneous program 268 based on one or more code objects of the program 212 and one or more memory operations associated with memory object(s) to be accessed by the second host processor circuitry 218 and/or the accelerator 224 during execution of the one or more code objects. For example, the executable generation circuitry 370 can collect and/or otherwise obtain memory operation(s) for the memory object(s) from the memory operation identification circuitry 360. In some examples, the memory operation(s) can be implemented by the memory operations 256 of FIG. 2. The executable generation circuitry 370 can generate program execution operation(s) based on the memory operation(s). For example, the program execution operation(s) can include a sequence of execution of the code objects of the program 212, a sequence of execution of the memory operations associated with the execution of the code objects, etc., and/or any combination(s) thereof. In some examples, the executable generation circuitry 370 can generate an executable file based on the program execution operation(s) to execute the heterogeneous program 268. In some examples, the executable file can be implemented by the executable file(s) 388.

The memory operation selection circuitry 300 includes the datastore 380 to record data, such as the program(s) 382, the code object(s) 384, the memory object(s) 386, the executable file(s) 388, etc. The datastore 380 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The datastore 380 may additionally or alternatively be implemented by one or more double data rate (DDR) memories, such as DDR, DDR2, DDR3, DDR4, DDR5, mobile DDR (mDDR), DDR SDRAM, etc. The datastore 380 may additionally or alternatively be implemented by one or more mass storage devices such as hard disk drive(s) (HDD(s)), compact disk (CD) drive(s), digital versatile disk (DVD) drive(s), solid-state disk (SSD) drive(s), Secure Digital (SD) card(s), CompactFlash (CF) card(s), etc. While in the illustrated example the datastore 380 is illustrated as a single datastore, the datastore 380 may be implemented by any number and/or type(s) of datastores. Furthermore, the data stored in the datastore 380 may be in any data format such as, for example, binary data, comma delimited data, tab delimited data, structured query language (SQL) structures, etc.

In some examples, the program(s) 382 include one or more executable constructs (e.g., hardware or machine executable constructs), such as applications, programs (e.g., the program 212, the heterogeneous program 268, etc.), and/or, more generally, executable code (e.g., hardware or machine readable code). In some examples, the code object(s) 384 include one or more code objects of the program(s) 382. For example, the code object(s) 384 can be a portion of a program, such as a function, a kernel, method, a routine, etc., and/or any combination(s) thereof. In some examples, the memory object(s) 386 include one or more memory objects that may be accessed in response to execution of the code object(s) 384. For example, the memory object(s) 386 can be data (e.g., a data object) of any size or format. In some examples, the memory object(s) 386 is/are stored in a buffer (e.g., a data buffer) in memory (e.g., nonvolatile or volatile memory), a mass storage disc or device, etc. In some examples, the memory object(s) 386 is/are representative of any granularity of data in memory or storage. For example, the memory object(s) 386 can be implemented by array(s), page(s) (e.g., memory page(s)), etc., and/or any combination(s) thereof. In some examples, the memory object(s) 386 is/are location(s) of data in memory or storage. As used herein, the term "data" is information in any form that may be ingested, processed, interpreted and/or otherwise manipulated by processor circuitry to produce a result. The produced result may itself be data. In some examples, the executable file(s) 388 include one or more executable constructs (e.g., hardware or machine readable constructs) that, when executed or instantiated by processor circuitry, carry out the examples described herein. For example, the executable file(s) 388 can be a file in any executable file format (e.g., a binary executable file format (BIN), an executable file format (.EXE), a GPU file format (.GPU), etc.).

In some examples, the memory operation selection circuitry 300 includes means for identifying target hardware of a heterogeneous electronic device to execute a code object. For example, the means for identifying may be implemented by the hardware identification circuitry 320. In some examples, the hardware identification circuitry 320 may be instantiated by processor circuitry such as the example processor circuitry 1812 of FIG. 18. For instance, the hardware identification circuitry 320 may be instantiated by the example general purpose processor circuitry 1900 of FIG. 19 executing machine executable instructions such as that implemented by at least block 1504 of FIG. 15. In some examples, the hardware identification circuitry 320 may be instantiated by hardware logic circuitry, which may be implemented by an ASIC or the FPGA circuitry 2000 of FIG. 20 structured to perform operations corresponding to the machine readable instructions. Additionally or alternatively, the hardware identification circuitry 320 may be instantiated by any other combination of hardware, software, and/or firmware. For example, the hardware identification circuitry 320 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the memory operation selection circuitry 300 includes means for identifying a code object to be executed by a heterogeneous electronic device including first hardware and second hardware. For example, the means for identifying may be implemented by the code object identification circuitry 330. In some examples, the code object identification circuitry 330 may be instantiated by processor circuitry such as the example processor circuitry 1812 of FIG. 18. For instance, the code object identification circuitry 330 may be instantiated by the example general purpose processor circuitry 1900 of FIG. 19 executing machine executable instructions such as that implemented by at least block 1402 of FIG. 14 and/or blocks 1502, 1510 of FIG. 15. In some examples, the code object identification circuitry 330 may be instantiated by hardware logic circuitry, which may be implemented by an ASIC or the FPGA circuitry 2000 of FIG. 20 structured to perform operations corresponding to the machine readable instructions. Additionally or alternatively, the code object identification circuitry 330 may be instantiated by any other combination of hardware, software, and/or firmware. For example, the code object identification circuitry 330 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the memory operation selection circuitry 300 includes means for identifying a memory object to be accessed by hardware in response to execution of a code object. For example, the means for identifying may be implemented by the memory object identification circuitry 340. In some examples, the memory object identification circuitry 340 may be instantiated by processor circuitry such as the example processor circuitry 1812 of FIG. 18. For instance, the memory object identification circuitry 340 may be instantiated by the example general purpose processor circuitry 1900 of FIG. 19 executing machine executable instructions such as that implemented by at least block 1404 of FIG. 14 and/or block 1506 of FIG. 15. In some examples, the memory object identification circuitry 340 may be instantiated by hardware logic circuitry, which may be implemented by an ASIC or the FPGA circuitry 2000 of FIG. 20 structured to perform operations corresponding to the machine readable instructions. Additionally or alternatively, the memory object identification circuitry 340 may be instantiated by any other combination of hardware, software, and/or firmware. For example, the memory object identification circuitry 340 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the memory operation selection circuitry 300 includes means for determining a runtime. For example, the means for determining can determine a runtime associated with executing a code object by a heterogeneous electronic device based on at least one of a location of a memory object or a data transfer penalty, and the data transfer penalty associated with access of the memory object in response to execution of the code object. For example, the means for determining may be implemented by the execution time determination circuitry 350. In some examples, the execution time determination circuitry 350 may be instantiated by processor circuitry such as the example processor circuitry 1812 of FIG. 18. For instance, the execution time determination circuitry 350 may be instantiated by the example general purpose processor circuitry 1900 of FIG. 19 executing machine executable instructions such as that implemented by at least block 1302 of FIG. 13, blocks 1406, 1408, 1410 of FIG. 14, block 1508 of FIG. 15, blocks 1602, 1604, 1606, 1608, 1610, 1612, 1614, 1616 of FIG. 16, and/or blocks 1702, 1704, 1706, 1708, 1712 of FIG. 17. In some examples, the execution time determination circuitry 350 may be instantiated by hardware logic circuitry, which may be implemented by an ASIC or the FPGA circuitry 2000 of FIG. 20 structured to perform operations corresponding to the machine readable instructions. Additionally or alternatively, the execution time determination circuitry 350 may be instantiated by any other combination of hardware, software, and/or firmware. For example, the execution time determination circuitry 350 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for determining is to determine a data transfer penalty based on one of (i) an in-place access operation from a first data buffer of first hardware by second hardware or (ii) a migration operation to transfer a memory object from the first data buffer to a second data buffer of the second hardware. In some examples, the means for determining is to determine a first time value associated with the second hardware executing a code object based on the first hardware storing the memory object. In some examples, the means for determining is to determine a second time value associated with the second hardware executing the code object based on the second hardware storing the memory object. In some examples, the means for determining is to determine the runtime based on a minimum value of the first time value and the second time value.

In some examples in which the code object is a second code object, the means for determining is to determine a third time value associated with execution of a first code object based on the first hardware storing the memory object during execution of the first code object, the first code object to be executed prior to the second code object. In some examples, the means for determining is to determine a fourth time value associated with execution of the first code object based on the second hardware storing the memory object during execution of the first code object. In some examples, the means for determining is to determine the data transfer penalty based on a fifth time value associated with transferring the memory object from the second hardware to the first hardware, the first time value based on the third time value, the fourth time value, and the fifth time value.

In some examples in which the code object is a second code object, the means for determining is to determine a third time value associated with execution of a first code object based on the first hardware storing the memory object during execution of the first code object, the first code object to be executed prior to the second code object. In some examples, the means for determining is to determine a fourth time value associated with execution of the first code object based on the second hardware storing the memory object during execution of the first code object. In some examples, the means for determining is to determine the data transfer penalty based on a fifth time value associated with transferring the memory object from the first hardware to the second hardware, the second time value based on the third time value, the fourth time value, and the fifth time value.

In some examples, the means for determining is to determine a first time value associated with performing an in-place access operation on the memory object, determine a second time value associated with performing a migration operation on the memory object, and, in response to a determination that the first time value is less than the second time value, identify the data transfer penalty to be the first time value.

In some examples, the means for determining is to determine a first time value associated with performing an in-place access operation on the memory object, determine a second time value associated with performing a migration operation on the memory object, and, in response to a determination that the second time value is less than the first time value, identify the data transfer penalty to be the second time value.

In some examples, the memory operation selection circuitry 300 includes means for identifying a memory operation for a memory object based on a runtime. In some examples, the memory operation selection circuitry 300 includes means for selecting the memory operation to be an in-place access operation or a migration operation. For example, the means for identifying and/or the means for selecting may be implemented by the memory operation identification circuitry 360. In some examples, the memory operation identification circuitry 360 may be instantiated by processor circuitry such as the example processor circuitry 1812 of FIG. 18. For instance, the memory operation identification circuitry 360 may be instantiated by the example general purpose processor circuitry 1900 of FIG. 19 executing machine executable instructions such as that implemented by at least block 1304 of FIG. 13, block 1412 of FIG. 14, block 1512 of FIG. 15, and/or block 1710, 1714 of FIG. 17. In some examples, the memory operation identification circuitry 360 may be instantiated by hardware logic circuitry, which may be implemented by an ASIC or the FPGA circuitry 2000 of FIG. 20 structured to perform operations corresponding to the machine readable instructions. Additionally or alternatively, the memory operation identification circuitry 360 may be instantiated by any other combination of hardware, software, and/or firmware. For example, the memory operation identification circuitry 360 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the memory operation selection circuitry 300 includes means for generating an executable file based on a memory operation. In some examples, the means for generating is to generate the executable file to cause execution of the code object by at least one of first hardware or second hardware of a heterogeneous electronic device based on the memory operation. For example, the means for generating may be implemented by the executable generation circuitry 370. In some examples, the executable generation circuitry 370 may be instantiated by processor circuitry such as the example processor circuitry 1812 of FIG. 18. For instance, the executable generation circuitry 370 may be instantiated by the example general purpose processor circuitry 1900 of FIG. 19 executing machine executable instructions such as that implemented by at least block 1306 of FIG. 13, blocks 1414, 1416 of FIG. 14, and blocks 1514, 1516 of FIG. 15. In some examples, the executable generation circuitry 370 may be instantiated by hardware logic circuitry, which may be implemented by an ASIC or the FPGA circuitry 2000 of FIG. 20 structured to perform operations corresponding to the machine readable instructions. Additionally or alternatively, the executable generation circuitry 370 may be instantiated by any other combination of hardware, software, and/or firmware. For example, the executable generation circuitry 370 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for generating is to identify an offload operation to transfer execution of the code object from the first hardware to the second hardware based on at least one of the runtime or the memory operation, and the generating of the executable file is to be based on the offload operation. In some examples, the means for generating is to generate the executable file as a software development kit. In some examples, the first hardware is a central processor unit and the second hardware is a graphics processor unit.

While an example manner of implementing the memory operation selector 202 of FIG. 2 is illustrated in FIG. 3, one or more of the elements, processes, and/or devices illustrated in FIG. 3 may be combined, divided, re-arranged, omitted, eliminated, and/or implemented in any other way. Further, the interface circuitry 310, the hardware identification circuitry 320, the code object identification circuitry 330, the memory object identification circuitry 340, the execution time determination circuitry 350, the memory operation identification circuitry 360, the executable generation circuitry 370, the datastore 380, the bus 390, and/or, more generally, the example memory operation selector 202 of FIG. 2, may be implemented by hardware alone or by hardware in combination with software and/or firmware. Thus, for example, any of the interface circuitry 310, the hardware identification circuitry 320, the code object identification circuitry 330, the memory object identification circuitry 340, the execution time determination circuitry 350, the memory operation identification circuitry 360, the executable generation circuitry 370, the datastore 380, the bus 390, and/or, more generally, the example memory operation selector 202, could be implemented by processor circuitry, analog circuit(s), digital circuit(s), logic circuit(s), programmable processor(s), programmable microcontroller(s), GPU(s), DSP(s), ASIC(s), programmable logic device(s) (PLD(s)), and/or field programmable logic device(s) (FPLD(s)) such as FPGAs. Further still, the example memory operation selector 202 of FIG. 2 may include one or more elements, processes, and/or devices in addition to, or instead of, those illustrated in FIG. 3, and/or may include more than one of any or all of the illustrated elements, processes and devices.

Figure 4:
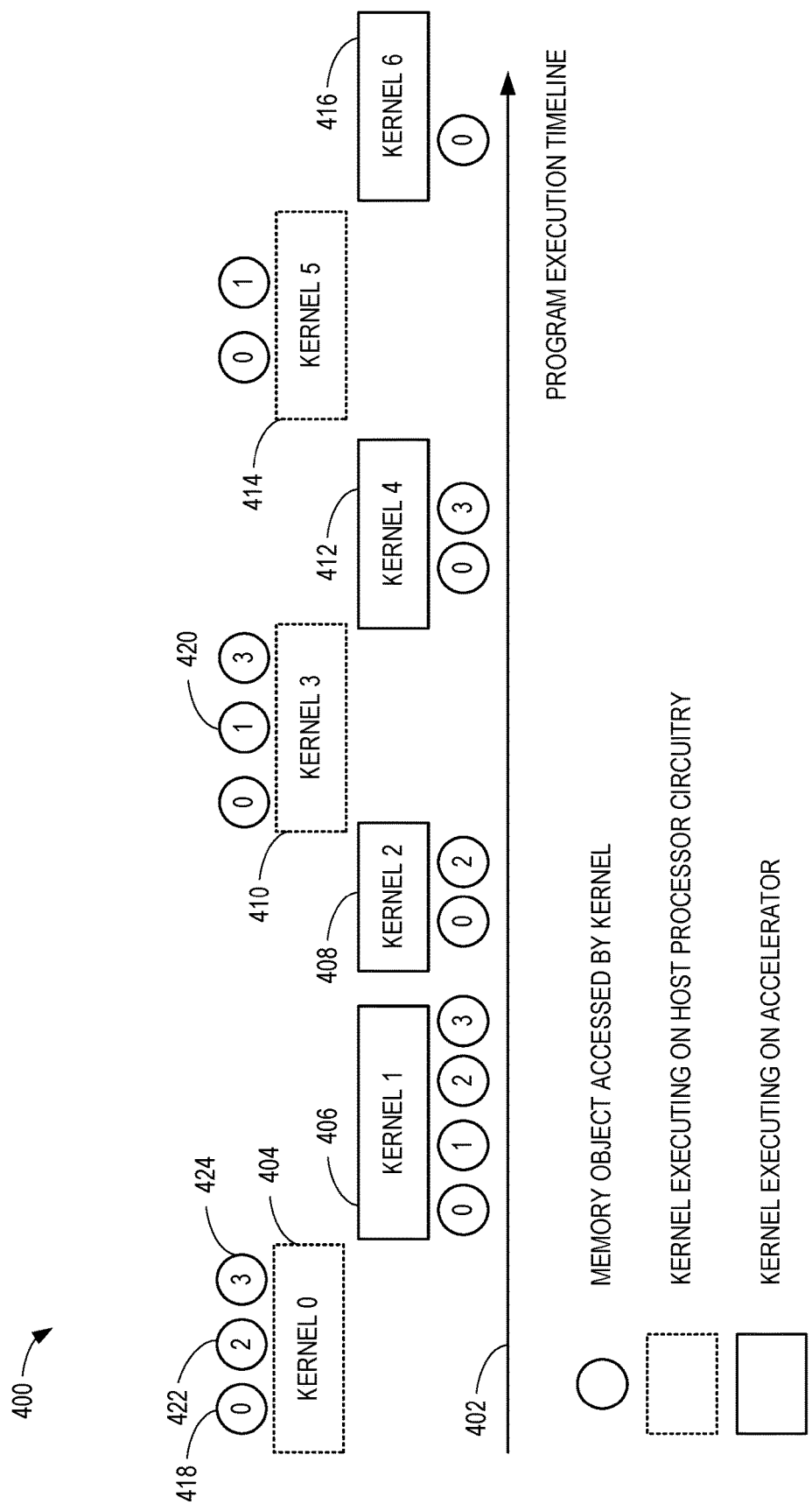
FIG. 4 is an illustration of an example program execution timeline for an example heterogeneous program that can be executed by the example electronic system of FIG. 1.

FIG. 4 is an illustration of an example program execution timeline 402 for an example heterogeneous program 400 that can be executed by the example electronic system 100 of FIG. 1 and/or the target electronic system 217 of FIG. 2. In some examples, the heterogeneous program 400 can implement the heterogeneous program 268 of FIG. 2, the program(s) 382 of FIG. 3, and/or the executable file(s) 388 of FIG. 3.

In the illustrated example, the heterogeneous program 400 includes a first example kernel 404 (identified by KERNEL 0), a second example kernel 406 (identified by KERNEL 1), a third example kernel 408 (identified by KERNEL 2), a fourth example kernel 410 (identified by KERNEL 3), a fifth example kernel 412 (identified by KERNEL 4), a sixth example kernel 414 (identified by KERNEL 5), and a seventh example kernel 416 (identified by KERNEL 6). In the illustrated example, the first kernel 404 is executed in the heterogeneous program 400 before the second kernel 406, the second kernel 406 is executed in the heterogeneous program 400 before the third kernel 408, and so forth.

In some examples, first portion(s) of the heterogeneous program 400 can be executed by the second host processor circuitry 218 and second portion(s) of the heterogeneous program 400 can be executed by the accelerator 224. For example, the second host processor circuitry 218 can execute the first kernel 404, the fourth kernel 410, and the sixth kernel 414. The accelerator 224 can execute the second kernel 406, the third kernel 408, the fifth kernel 412, and the seventh kernel 416.

In the illustrated example, the kernels 404, 406, 408, 410, 412, 414, 416 access one or more example memory objects 418, 420, 422, 422 during execution of the kernels 404, 406, 408, 410, 412, 414, 416. The memory objects 418, 420, 422, 424 of the illustrated example include a first example memory object 418 (identified by 0), a second example memory object 420 (identified by 1), a third example memory object 422 (identified by 2), and a fourth example memory object 424 (identified by 3). In some examples, one(s) of the memory objects 418, 420, 422, 424 can be in the second host processor circuitry 218 or the accelerator 224. In some examples, the second host processor circuitry 218 and/or the accelerator 224 can have direct access to one(s) of the memory objects 418, 420, 422, 424 placed in their local memory. In some examples, the second host processor circuitry 218 and/or the accelerator 224 can access one(s) of the memory objects 418, 420, 422, 424 when they are stored in remote memory, but with lower bandwidth and increased latency. For example, the second host processor circuitry 218 can access the first memory object 418 when the first memory object 418 is stored in remote memory (e.g., stored in a data buffer of the accelerator 224) by way of either (i) a migration operation (e.g., migrating a memory page from the remote memory to local memory of the second host processor circuitry 218, which can include a subsequent in-place access of the migrated memory page) or (ii) an in-place access from the remote memory.

In response to and/or otherwise during execution of the first kernel 404, the first kernel 404 is to access the first memory object 418, the third memory object 422, and the fourth memory object 424. In response to and/or otherwise during execution of the second kernel 406, the second kernel 406 is to access each of the memory objects 418, 420, 422, 424. In response to and/or otherwise during execution of the third kernel 408, the third kernel 408 is to access the first memory object 418 and the third memory object 422. In response to and/or otherwise during execution of the fourth kernel 410, the fourth kernel 410 is to access the first memory object 418, the second memory object 420, and the fourth memory object 424. In response to and/or otherwise during execution of the fifth kernel 412, the fifth kernel 412 is to access the first memory object 418 and the fourth memory object 424. In response to and/or otherwise during execution of the sixth kernel 414, the sixth kernel 414 is to access the first memory object 418 and the second memory object 420. In response to and/or otherwise during execution of the seventh kernel 416, the seventh kernel 416 is to access the first memory object 418.

Figure 5:
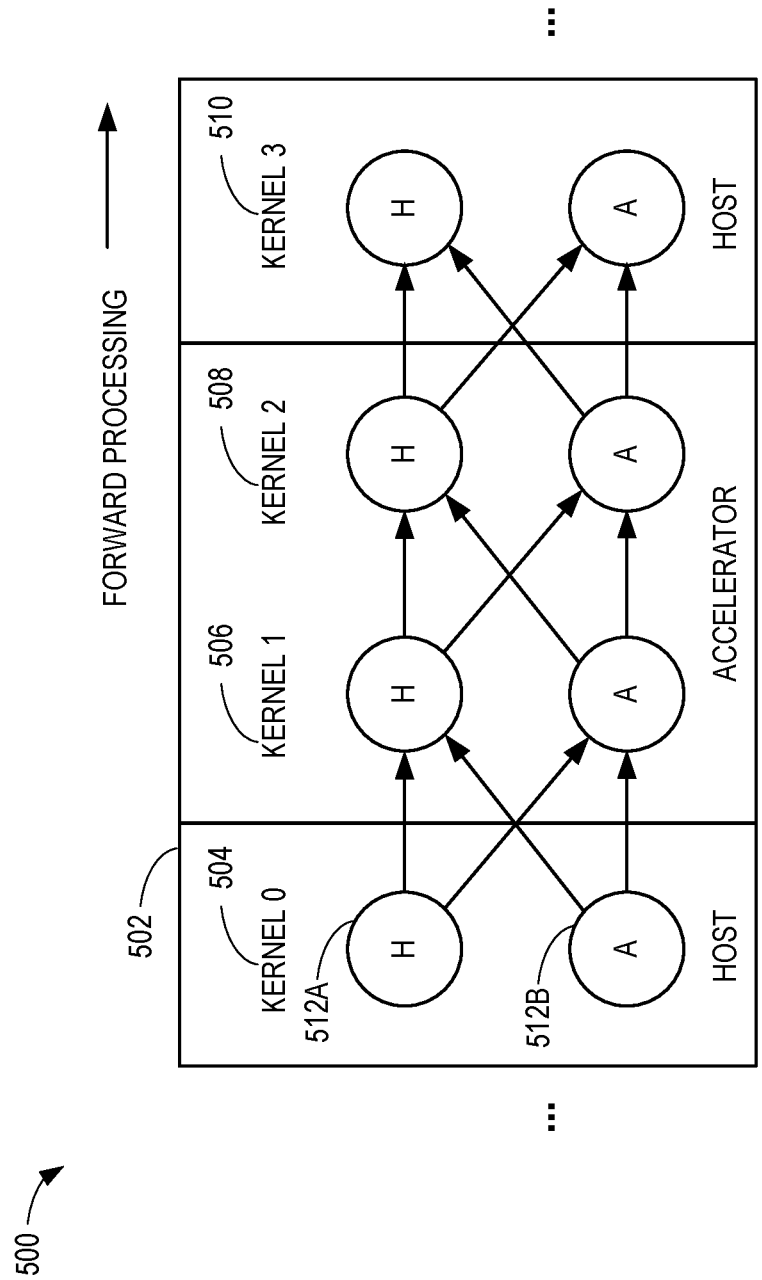
FIG. 5 is an illustration of example memory operation strategies to implement an example heterogeneous program.

FIG. 5 is an illustration of example memory operation strategies 500 to implement an example heterogeneous program 502, such as the heterogeneous program 268 of FIG. 2, the program(s) 382 of FIG. 3, the executable file(s) 388 of FIG. 3, and/or the heterogeneous program 400 of FIG. 4. The heterogeneous program 502 includes a first example kernel 504 (identified by KERNEL 0), a second example kernel 506 (identified by KERNEL 1), a third example kernel 508 (identified by KERNEL 2), and a fourth example kernel 510 (identified by KERNEL 3). For example, the kernels 504, 506, 508, 510 can be code objects of the heterogeneous program 502. The heterogeneous program 502 includes an example memory object 512A, 512B. The memory object 512A is a memory object with a first state and the memory object 512B is the memory object with a second state as described below.

In some examples, the memory operation selector 202 of FIG. 2 and/or the memory operation selection circuitry 300 of FIG. 3 determines and/or otherwise decides a location in a heterogeneous system in which to store the memory object 512A, 512B during the phases of the program execution. For example, the memory operation selection circuitry 300 can determine what data should be migrated and when that data should be migrated. In the illustrated example, the heterogeneous program 502 assumes that the heterogeneous system has a cache-coherent interconnect (e.g., CXL), and that data can be accessed by either the second host processor circuitry 218 or the accelerator 224 remotely without a need to rehome (e.g., migrate or transfer the data from a first memory/storage location to a second memory/storage location), although these accesses have lower bandwidth and higher latency. For example, rehoming can influence performance, but not application correctness. In some examples, remote accesses are beneficial when the total bytes accessed by the kernel 504, 506, 508, 510 is small relative to the size of the memory object 512A, 512B. Alternatively, the memory object 512A, 512B can be moved between the second host processor circuitry 218 and the accelerator 224 to localize the memory object 512A, 512B to execution. Local accesses are beneficial when the memory object 512A, 512B is to be accessed many times in the new location, including accesses across several kernel executions.

An example technique for choosing data location (e.g., memory object location) is to simply relocate the memory object 512A, 512B when the memory object 512A, 512B is accessed a threshold number of times by a particular kernel. However, purely local choices about moving data can be suboptimal, for example if a memory object with only a few accesses is moved back and forth between the second host processor circuitry 218 and the accelerator 224. To avoid this issue and to achieve a program-scale optimal data transfer strategy, an example linear-time algorithm as described below considers all uses of the memory object 512A, 512B and can optimize amongst all of the uses.

In some examples, policies for individual memory objects are separable for the most part. As used herein, the term "separable" indicates that each memory object's impact on a program is essentially independent. For example, the memory operation selection circuitry 300 can determine a transfer strategy for each memory object in isolation. In some examples, a data transfer strategy includes a location of a memory object for each kernel that accesses the memory object. In some examples, when the location is changed, the memory object is assumed transferred, and a data transfer cost is to be paid or expended.

In some examples, the memory operation selection circuitry 300 determines an overall runtime of the heterogeneous program 502 based on data transfer strategies (e.g., memory object transfer strategies) in connection with the memory object 512A, 512B. For example, data transfer strategies can be optimally solved in linear time by using a trellis and by adapting state machine optimization techniques (e.g., Viterbi's algorithm). In the trellis of the illustrated example of FIG. 5, the memory object 512A identified by H denotes that the memory object 512A is located on the host (e.g., the second host processor circuitry 218) during execution of a particular kernel. For example, the memory object 512A has a first state of being stored in a first data buffer of host processor circuitry, such as the second host processor circuitry 218. In the trellis of the illustrated example of FIG. 5, the memory object 512B identified by A denotes that the memory object 512B is located on the accelerator (e.g., the accelerator 224). For example, the memory object 512B has a second state of being stored in a second data buffer of an accelerator, such as the accelerator 224.

By way of example, the memory operation selection circuitry 300 can determine a minimum execution time of the second kernel 506 based on the example of Equation (3) below.

$$T(kernel_1, \text{accelerator}) = \min \left\{ \begin{array}{l} T_{transfer} + T_{exec}(kernel_1, \text{accelerator}) + T(kernel_0, \text{host}) \\ T_{exec}(kernel_1, \text{accelerator}) + T(kernel_0, \text{accelerator}) \end{array} \right\}, \quad \text{Equation (3)}$$

In the example of Equation (3) above, T(kernel$_1$,accelerator) is a runtime upon conclusion of the execution of the second kernel 506. For example, T(kernel$_1$,accelerator) can be a sum of a first time for the second host processor circuitry 218 to execute the first kernel 504 and a second time for the accelerator 224 to execute the second kernel 506. T$_{transfer}$ is a time to transfer the memory object 512A from the second host processor circuitry 218 to the accelerator 224. T$_{exec}$(kernel$_1$,accelerator) is a runtime (e.g., a time duration) to execute the second kernel 506 by the accelerator 224. T(kernel$_0$,host) is a time for the first kernel 504 to be executed by the second host processor circuitry 218 based on the second host processor circuitry 218 storing the memory object 512A in a local buffer, memory, storage, etc., of the second host processor circuitry 218. T(kernel$_0$, accelerator) is a time for the first kernel 504 to be executed by the second host processor circuitry 218 based on the accelerator 224 storing the memory object 512B in a local buffer, memory, storage, etc., of the accelerator 224.

In some examples, the total number of data transfer strategies can be exponential in the number of kernels accessing a memory object, and so calculating all of the possible combinations of all of the kernels is likely not possible for large programs. In some examples, however, there is substantial structure in the memory object access pattern: a memory object is either located on a host or an accelerator, and at each kernel, the memory object can either be relocated or left at its current location. In the illustrated example of FIG. 5, this behavior can be represented by a state machine, wherein the state is the location of the memory object and the state transitions include the choice to either relocate the memory object or not relocate the memory object. In the illustrated example of FIG. 5, the heterogeneous program 502 is depicted as a trellis that captures the possible memory object locations across the entire heterogeneous program. In some examples, the memory operation selection circuitry 300 can determine an optimal and/or otherwise improved data transfer strategy based on example trellis optimization algorithms as described herein. In some examples, the trellis optimization algorithms are based on Viterbi's algorithm.

In some examples, the memory operation selection circuitry 300 can utilize a trellis optimization technique to calculate an optimal and/or otherwise improved sequence of states through a given state machine trellis in linear time with the number of discrete operations. For example, the memory operation selection circuitry 300 can execute the trellis optimization technique in two or more operations including: (1) a forward operation (identified by FORWARD PROCESSING in FIGS. 5 and/or 6) that evaluates the heterogeneous program execution time as a running total across the trellis, beginning with the first kernel 504 and using dynamic programming to eliminate most computation, and (ii) a backward operation that traces the optimal data transfer strategy (identified by REVERSE PROCESSING in FIG. 7).

Figure 6:
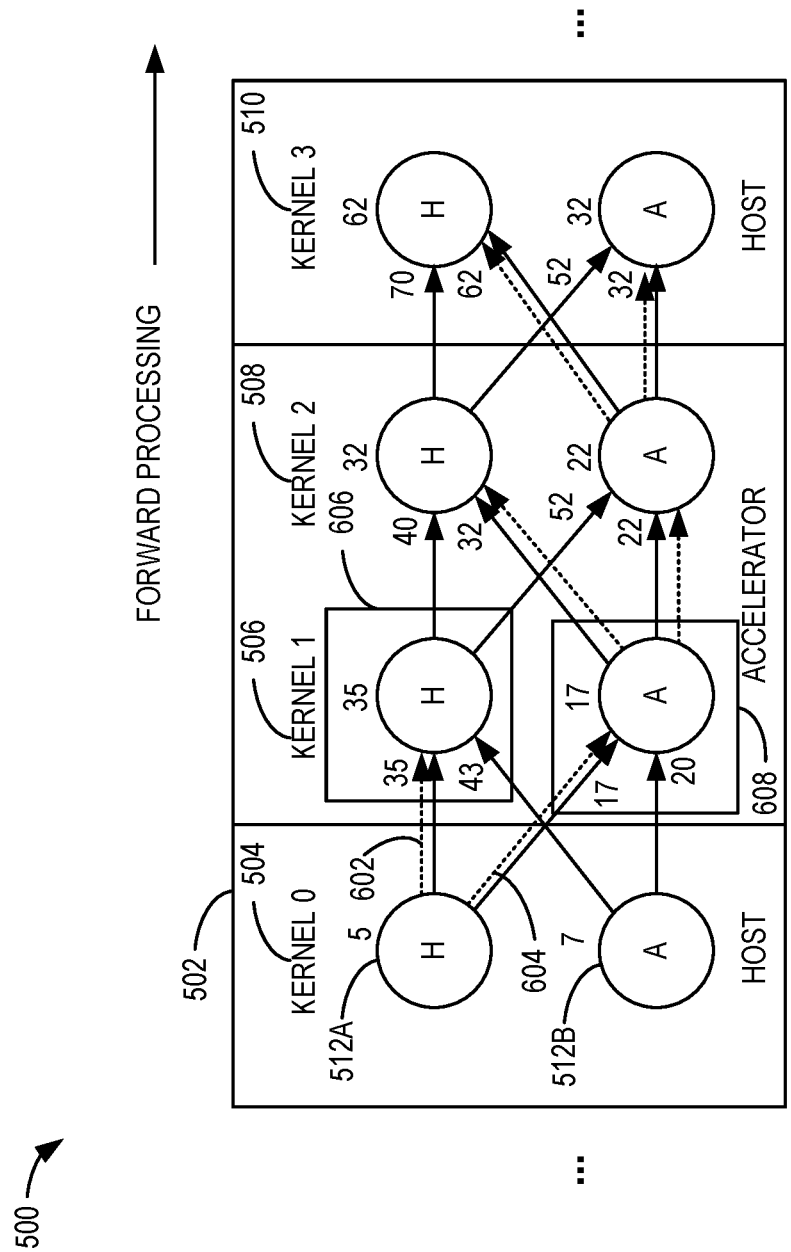
FIG. 6 is an illustration of example runtimes associated with the example memory operation strategies of FIG. 5.

FIG. 6 is an illustration of example runtimes associated with the memory operation strategies 500 of FIG. 5. The illustrated example of FIG. 6 includes the heterogeneous program 502, the kernels 504, 506, 508, 512, and the memory object 512A, 512B of FIG. 5. The illustrated example of FIG. 6 depicts the forward operation of the trellis optimization technique described herein.

Figure 7:
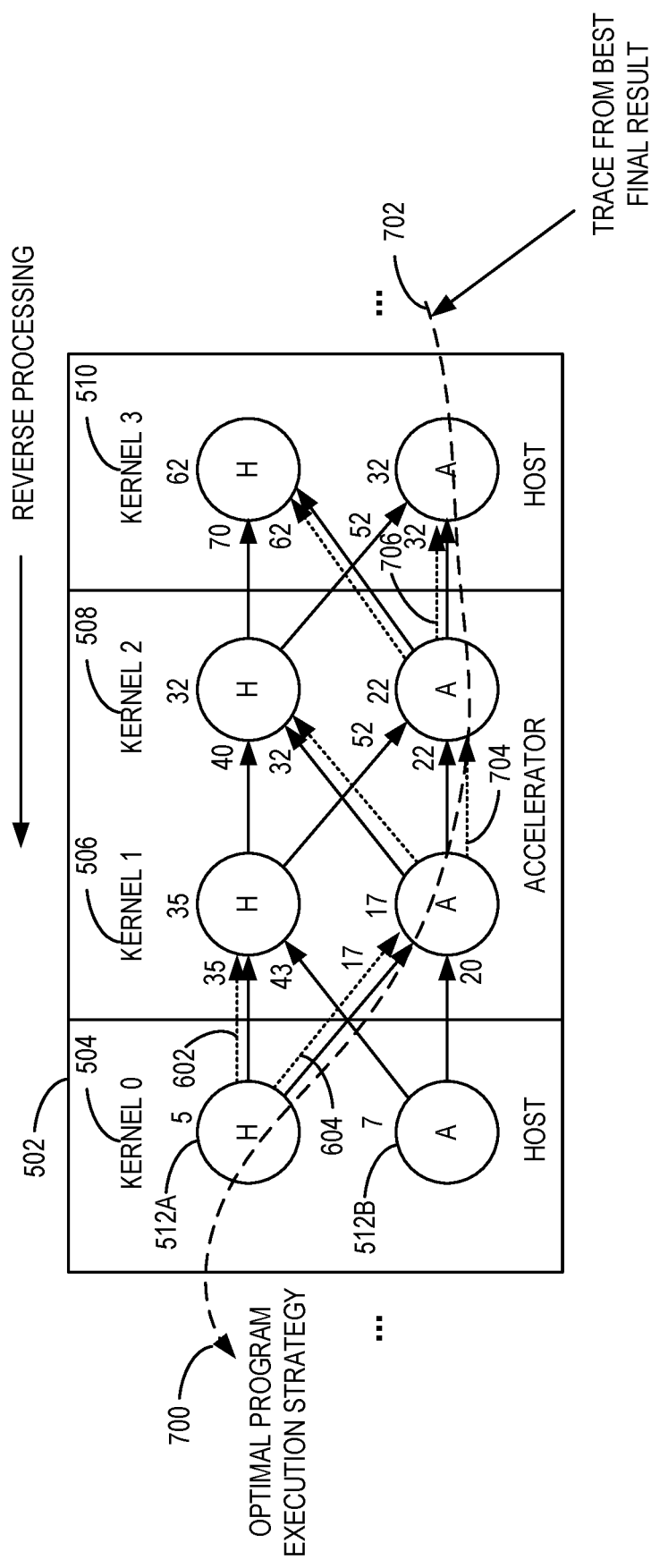
FIG. 7 is an illustration of identifying an optimal program execution strategy based on the example memory operation strategies of FIG. 5 and the example runtimes of FIG. 6.

In the illustrated example of FIG. 6, during the forward operation, evaluation proceeds across each state of a trellis in the temporal order of program execution. For example, the program 502 of FIGS. 5-7 is represented by a trellis. At each state in the trellis, the memory operation selection circuitry 300 determines minimum program execution through that phase in two example ways, as illustrated by the example of Equation (3) above. In the example of Equation (3) above, the memory operation selection circuitry 300 calculates the runtime of the heterogeneous program 502 after the execution of the second kernel 506, which will execute on an accelerator (e.g., the accelerator 224 of FIG. 2), and based on an assumption that the accelerator has the memory object 512B in its local storage. The memory operation selection circuitry 300 can evaluate two example cases in which the heterogeneous program 502 could have gotten to this state. For example, the memory operation selection circuitry 300 can determine that either the memory object 512B was local to the accelerator 224 during the previous kernel execution, or the memory object 512A is local to the second host processor circuitry 518.

In the first case (e.g., the second host processor circuitry 218 has the memory object 512A), the program execution time after the second kernel 506 is equal to the sum of the execution time (or runtime) through the first kernel 504, assuming the second host processor circuitry 218 has the memory object 512A, plus the projected execution time (or runtime) of the second kernel 506, assuming the accelerator 224 has the memory object 512B, plus the costs (e.g., a data transfer penalty) associated with transferring the memory object 512A from second host processor circuitry 218 to the accelerator 224.

In the second case (e.g., the accelerator 224 has the memory object 512B), the program execution time (or runtime) after the second kernel 506 is equal to the sum of the execution time (or runtime) through the first kernel 504, assuming the accelerator 224 has the memory object 512B, plus the projected execution time of the second kernel 506, assuming the accelerator 224 has the memory object 512B.

By way of example, the first kernel 504 is to be executed by the second host processor circuitry 218 (e.g., based on a determination by the memory operation selection circuitry 300). If the memory object 512A is local to the second host processor circuitry 218, the second host processor circuitry 218 can complete execution of the first kernel 504 in 5 millisecond (ms). Alternatively, any other time measurement may be used such as microseconds (us). If the memory object 512B is local to the accelerator 224, the second host processor circuitry 218 can complete execution of the first kernel 504 in 7 ms. The increase from 5 ms to 7 ms is a result of a transfer penalty, such as executing an in-place access of the memory object 512B, a migration of the memory object 512B to the second host processor circuitry 218 for localized execution, etc.

By way of another example, the second kernel 506 is to be executed by the accelerator 224 (e.g., based on a determination by the memory operation selection circuitry 300). If the memory object 512A is local to the second host processor circuitry 218 (example identified by reference numeral 606), the memory operation selection circuitry 300 can consider the above-referenced two cases to determine how the memory object 512A became local to the second host processor circuitry 218. In the first case, the accelerator 224 can complete execution of the second kernel 506 at a runtime of 43 ms (e.g., 43 ms after initializing execution of the heterogeneous program 502 at a runtime or timestamp of 0 ms). For example, the heterogeneous program 502 can take 43 ms for (i) the second host processor circuitry 218 to execute the first kernel 504 assuming the memory object 512B is local to the accelerator 224 and (ii) the accelerator 224 to execute the second kernel 506 assuming the memory object 512A is local to the second host processor circuitry 218. In the second case, the accelerator 224 can complete execution of the second kernel 506 at a runtime of 35 ms (e.g., 35 ms after initializing execution of the heterogeneous program 502 at a runtime or timestamp of 0 ms). For example, the heterogeneous program 502 can take 35 ms for (i) the second host processor circuitry 218 to execute the first kernel 504 assuming the memory object 512A is local to the second host processor circuitry 218 and (ii) the accelerator 224 to execute the second kernel 506 assuming the memory object 512A is local to the second host processor circuitry 218. In the illustrated example, the memory operation selection circuitry 300 can determine that the second case (e.g., the second host processor circuitry 218 has the memory object 512A during execution of the first kernel 504) has a first execution time of 35 ms that is less than a second execution time of 43 ms of the first case (e.g., transferring the memory object 512B from the accelerator 224 to the second host processor circuitry 218). In the illustrated example, the memory operation selection circuitry 300 can identify the second case as a first example survivor edge 602 (identified by a dotted line).

If the memory object 512B is local to the accelerator 224 (example identified by reference numeral 608), the memory operation selection circuitry 300 can consider the above-referenced two cases to determine how the memory object 512B became local to the accelerator 224. In the first case, the accelerator 224 can complete execution of the second kernel 506 at a runtime of 17 ms (e.g., 17 ms after initializing execution of the heterogeneous program 502 at a runtime or timestamp of 0 ms). For example, the heterogeneous program 502 can take 17 ms for (i) the second host processor circuitry 218 to execute the first kernel 504 assuming the memory object 512A is local to the second host processor circuitry 218 and (ii) the accelerator 224 to execute the second kernel 506 assuming the memory object 512B is local to the accelerator 224.

In the second case, the accelerator 224 can complete execution of the second kernel 506 at a timestamp of 20 ms (e.g., 20 ms after initializing execution of the heterogeneous program 502 at a runtime or timestamp of 0 ms). For example, the heterogeneous program 502 can consume 20 ms for (i) the second host processor circuitry 218 to execute the first kernel 504 assuming the memory object 512B is local to the accelerator 224 and (ii) the accelerator 224 to execute the second kernel 506 assuming the memory object 512B is local to the accelerator 224. In the illustrated example, the memory operation selection circuitry 300 can determine that the first case (e.g., transferring the memory object 512A from the second host processor circuitry 218 to the accelerator 224) has a first execution time of 17 ms that is less than a second execution time of 20 ms of the second case (e.g., the accelerator 224 has the memory object 512B during execution of the first kernel 504). In the illustrated example, the memory operation selection circuitry 300 can identify the first case as a second example survivor edge 604 (identified by a dotted line).

Survivor edges, such as the first survivor edge 602 and the second survivor edge 604, correspond to and/or are otherwise representative of minimum solutions associated with execution of the second kernel 506. For example, the first survivor edge 602 is retained as a first execution time associated with executing the second kernel 506 with the memory object 512A being local to the second host processor circuitry 218 during execution of the first kernel 504, and the transition (e.g., edge) leading into the state of the memory object 512A to remain unchanged during execution of the second kernel 506. In the illustrated example, the first survivor edge 602 represents the optimal and/or otherwise best path for execution of the second kernel 506 that assumes that the second host processor circuitry 218 stores the memory object 512A during execution of the second kernel 506.

The second survivor edge 604 is retained as a second execution time associated with executing the second kernel 506 with the memory object 512A being local to the second host processor circuitry 218 during the execution of the first kernel 504, and the transition (e.g., edge) leading into the state of the memory object 512A changing by way of a transfer of the memory object 512A from the second host processor circuitry 218 to the accelerator 224. In the illustrated example, the second survivor edge 604 represents the optimal and/or otherwise best path for execution of the second kernel 506 that assumes that the accelerator 224 stores the memory object 512B during execution of the second kernel 506. In some examples, the memory operation selection circuitry 300 identifies the survivor edges (identified by dotted lines in the illustrated example of FIG. 6) for each of the kernels 504, 506, 508, 510 that access the memory object 512A, 512B.

FIG. 7 is an illustration of identifying an example optimal program execution strategy 700 based on the example memory operation strategies 500 of FIGS. 5 and/or 6 and the example runtimes of FIG. 6. The illustrated example of FIG. 7 includes the heterogeneous program 502, the kernels 504, 506, 508, 512, and the memory object 512A, 512B of FIG. 5, and the survivor edges 602, 604 of FIG. 6. The illustrated example of FIG. 7 depicts the reverse operation of the example trellis optimization technique described herein.

In some examples, the memory operation selection circuitry 300 determines the optimal program execution strategy 700 of the illustrated example based on identification of survivor edges of the heterogeneous program 502, such as the survivor edges 602, 604 of FIG. 6. For example, the memory operation selection circuitry 300 can determine the optimal program execution strategy 700 by tracing the trellis (e.g., the trellis diagram) in reverse starting from the best final result. In the illustrated example, the best final result for execution time of the heterogeneous program 502 is 32 ms (e.g., a timestamp of 32 ms upon concluding the execution of the fourth kernel 510). In the illustrated example, the memory operation selection circuitry 300 can identify the best final result of 32 ms as associated with the accelerator 224 executing the fourth kernel 510 based on the memory object 512B being local to the accelerator 224 during execution of the fourth kernel 510. The memory operation selection circuitry 300 can trace backwards (e.g., from right-to-left in FIG. 7) along the survivor edges to determine the optimal program execution strategy 700. For example, the memory operation selection circuitry 300 can trace backwards starting at a point identified by reference numeral 702 and moving along a fourth example survivor edge 706, a third example survivor edge 704, and the second survivor edge 604. For example, in response to the memory operation selection circuitry 300 evaluating all of the nodes in the trellis of FIG. 7 and marking all forward survivor edges (e.g., the survivor edges 602, 604, 704, 706), the memory operation selection circuitry 300 can determine the optimal memory object transfer strategy by performing a backwards trace of the survivor edges 604, 704, 706 beginning with the final kernel's best memory location, and proceeding towards the first kernel 504 by way of following the surviving edges in a reverse direction as illustrated in the example of FIG. 7. In this example, the memory operation selection circuitry 300 can choose the optimal program execution strategy 700 through the trellis in terms of execution time. In the illustrated example, the optimal program execution strategy 700 also describes the optimal memory object transfer strategy. For example, the optimal memory object transfer strategy can indicate that when a state switches in the optimal program execution strategy 700, transfer of the memory object 512A, 512B is to occur logically at that point.

In some examples, memory object transfer strategies, policies, etc., are separable. For example, a first memory object transfer strategy/policy for the first kernel 504 can be independent from a second memory object transfer strategy/policy for the second kernel 506. In some examples, memory object transfer strategies/policies are not separable. For example, the memory object transfer strategies/policies may not be separable when a kernel execution has its limiting bound changed by a series of choices made for different memory objects. For example, the memory operation selection circuitry 300 can determine that a transition from compute bound to memory bound can sever the separability of memory object transfer strategies/policies for one(s) of the kernels 504, 506, 508, 510. In this example, relieving memory pressure may improve performance of the target electronic system 217. In some examples, the trellis optimization technique described herein can be iterated to recalculate and reconverge the bounds, which may can mitigate and/or otherwise reduce this effect.

In some examples, once the optimal memory object transfer strategy (or policy) is determined, the memory operation selection circuitry 300 can provided the strategy/policy to a user (e.g., a programmer) for use, or annotated into the heterogeneous program 268. In some examples, other objectives, such as optimizing energy consumption is contemplated to determine the optimal program execution strategy 700. For example, as data transfers are energy intensive, the memory operation selection circuitry 300 can consider energy consumption as an input to the determination of different strategies to minimize and/or otherwise reduce energy of execution.

Advantageously, the memory operation selection circuitry 300 can discover, identify, and/or otherwise determine optimal memory object (e.g., data) transfer strategies/policies for program execution over time. In some examples, the memory operation selection circuitry 300 can translate the memory object transfer strategies/policies from recommendations to performance. For example, the memory operation selection circuitry 300 can provide the recommendation to a user (e.g., a developer, a programmer, etc.) or tool (e.g., a software tool, an automated tool, etc.) can encode the recommended strategies/policies into the program 212 to generate the heterogeneous program 268. In some examples, the memory operation selection circuitry 300 can injecting data or memory object transfers as appropriate in code.

In some examples, the memory operation selection circuitry 300 can effectuate automation of this code injection at runtime. For example, the memory operation selection circuitry 300 can store execution paths and transfer predictions. As used herein, the term "execution path" refers to a sequence of kernels with some length. At execution, the runtime can trace the program execution, examine stored execution paths, and determine the best strategy provided the observed path and the present location of the memory objects 512A, 512B.

FIG. 8 is a first table 800 including mappings of example kernels to example target hardware and example memory objects to be accessed during execution of the kernels. The first table 800 of the illustrated example can represent an example program (or portion(s) thereof, such as the program 212 of FIG. 2, the program(s) 382 of FIG. 3, etc. For example, the first table 800 can represent a program that includes seven kernels with respective kernel identifiers 0-6 and four objects (e.g., data or memory objects) with respective object identifiers 0-3. For example, the program can include a first kernel (identified by KERNEL ID 0) to be executed on host processor circuitry (e.g., the second host processor circuitry 218). During execution of the first kernel, the first kernel can access objects (e.g., data objects, memory objects, etc.) 0, 2, and 3. By way of another example, the program as indicated by the first table 800 can include a second kernel (identified by KERNEL ID 1) to be executed on an accelerator, such as the accelerator 160 of FIG. 1, the accelerator(s) 224 of FIG. 2, etc. During execution of the second kernel, the second kernel can access objects 0, 1, 2, and 3.

FIG. 9 is a second table 900 that illustrates example kernel access orders for the objects of FIG. 8 and data transfer penalties to access the objects from remote memory. In the illustrated example, the data transfer penalties represent the cost (e.g., a computational cost, a bandwidth cost, a latency cost, a throughput cost, etc., and/or any combination(s) thereof) to transfer data (e.g., a data or memory object) across an interconnect or link (e.g., the on-die interconnect 130 of FIG. 1) that connects host processor circuitry (e.g., the host processor circuitry 110 of FIG. 1) and an accelerator (e.g., the accelerator 160 of FIG. 1). For example, bandwidth to local memory can be orders of magnitude higher with respect to bandwidth to remote memory and, thus, the relative cost to access data from local memory can be insignificant and instead be part of kernel execution time.

In the second table 900, object 0, 1, 2, and 3 of FIG. 9 can correspond respectively to OBJECT ID 0, OBJECT ID 1, OBJECT ID 2, and OBJECT ID 3 of the first table 800. The kernel access order of the second table 900 represents the order in which in which object 0 is accessed. For example, object 0 can be accessed by KERNEL ID 0 through KERNEL ID 6 of FIG. 8. By way of another example, object 1 can be accessed by KERNEL ID 1 and followed by KERNEL ID 3 and KERNEL ID 5.

The second table 900 illustrates example execution targets (identified by EXE TARGET) for ones of the kernels of the first table 800. For example, object 0 can be accessed first by KERNEL ID 0 with KERNEL ID 0 to be executed on host processor circuitry.

The second table 900 illustrates example local and remote memory identifications. For example, when host processor circuitry is executing KERNEL ID 0, which causes object 0 to be accessed, local memory with respect to the host processor circuitry is local memory of the host processor circuitry. In this example, remote memory with respect to the host processor circuitry is memory from another device, such as an accelerator (identified by ACC in FIG. 9). In this example, the data transfer penalty to access remote memory can either be 100 or 200. In some examples, the data transfer penalty has a unit of measure of time, such as milliseconds (e.g., 100 ms, 200 ms, etc.), microseconds (e.g., 100 us, 200 us, etc.), etc. In some examples, the data transfer penalty is unitless.

In the illustrated example, if object 0 is stored in remote memory when the host processor circuitry is executing KERNEL ID 0, the data transfer penalty for the host processor circuitry to access object 0 via an in-place access operation is 100. If object 0 is stored in remote memory when the host processor circuitry is executing KERNEL ID 0, the data transfer penalty for the host processor circuitry to access object 0 via a migration operation to local memory is 200. For example, a migration operation can correspond to migrating object 0 (e.g., one or more memory pages that implement and/or otherwise compose object 0) from remote memory to local memory for local execution of KERNEL ID 0 on object 0. In some examples, an in-place access operation can be executed to access object 0 after the migration operation of object 0 is complete.

Figure 10:
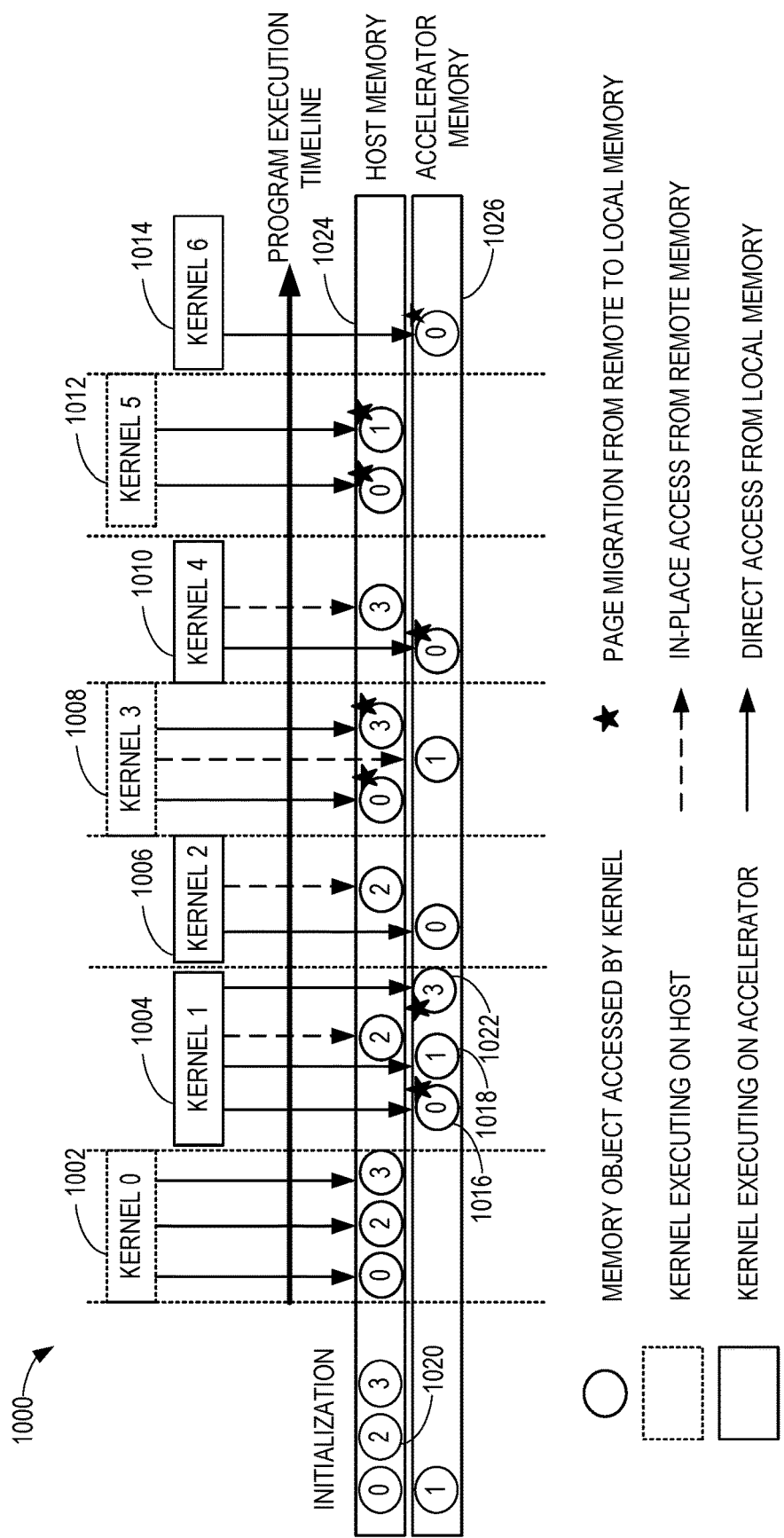
FIG. 10 is an illustration of an example program execution timeline based on an example memory operation selection technique.

FIG. 10 is an illustration of a first example program execution timeline 1000 to effectuate an example memory operation selection technique. For example, the memory operation selection technique illustrated in FIG. 10 can optimize and/or otherwise improve data transfer operations on a per-kernel basis.

The first program execution timeline 1000 represents execution of a heterogeneous program, such as the heterogeneous program 268 of FIG. 2, the program(s) 382 of FIG. 3, etc. The first program execution timeline 1000 includes a first example kernel 1002 (identified by KERNEL 0), a second example kernel 1004 (identified by KERNEL 1), a third example kernel 1006 (identified by KERNEL 2), a fourth example kernel 1008 (identified by KERNEL 3), a fifth example kernel 1010 (identified by KERNEL 4), a sixth example kernel 1012 (identified by KERNEL 5), and a seventh example kernel 1014 (identified by KERNEL 6). The first program execution timeline 1000 of the illustrated example includes a first example memory object 1016 (identified by memory object 0), a second example memory object 1018 (identified by memory object 1), a third example memory object 1020 (identified by memory object 2), and a fourth example memory object 1022 (identified by memory object 3).

In the program represented by the illustrated example of FIG. 10, the first kernel 1002, the fourth kernel 1008, and the sixth kernel 1012 are identified to be executed on host processor circuitry (e.g., a CPU). In the program represented by the illustrated example of FIG. 10, the second kernel 1004, the third kernel 1006, the fifth kernel 1010, and the seventh kernel 1014 are identified to be executed on an accelerator (e.g., a GPU).

In response to execution of the program represented by the illustrated example of FIG. 10, the first memory object 1016, the third memory object 1020, and the fourth memory object 1022 are located in and/or otherwise stored in example host memory 1024 during an initialization stage. For example, the host memory 1024 can implement one or more data buffers that can store at least one of the first memory object 1016, the third memory object 1020, or the fourth memory object 1022. During the initialization stage, the second memory object 1018 is located in and/or otherwise stored in example accelerator memory 1026. For example, the accelerator memory 1026 can implement one or more data buffers that can store the second memory object 1018.

In the illustrated example, in response to executing the first kernel 1002, the host processor circuitry can access the first memory object 1016, the third memory object 1020, and the fourth memory object 1022. In this example, the host processor circuitry executes a direct access operation on the first memory object 1016, the third memory object 1020, and the fourth memory object 1022 from local memory of the host processor circuitry because the first memory object 1016, the third memory object 1020, and the fourth memory object 1022 are in the host memory 1024.

In response to executing the second kernel 1004, the accelerator can access the first memory object 1016, the second memory object 1018, the third memory object 1020, and the fourth memory object 1022. The accelerator can execute a direct access operation of the second memory object 1018 because the second memory object 1018 is in local memory of the accelerator. The accelerator can execute a migration operation (e.g., a page migration operation) to migrate and/or otherwise move the first memory object 1016 and the fourth memory object 1022 from remote memory to local memory. The accelerator can execute an in-place access operation of the third memory object 1020 from the remote memory. In some examples, the accelerator can execute an in-place access operation of the third memory object 1020 in local memory in response to migrating the third memory object 1020 from remote memory to local memory. As depicted in the illustrated example of FIG. 10, by considering data transfer strategies on a per-kernel basis, there are an increased number of page migrations from remote to local memory because repeated accesses of memory objects may not be considered. For example, the first memory object 1016 is accessed by each of the kernels 1002, 1004, 1006, 1008, 1010, 1012, 1014 and is migrated five times in the illustrated example. As a result, the increased number of data migrations can increase latency of program execution due to lower bandwidth of interconnects between the host processor circuitry and the accelerator.

Figure 11:
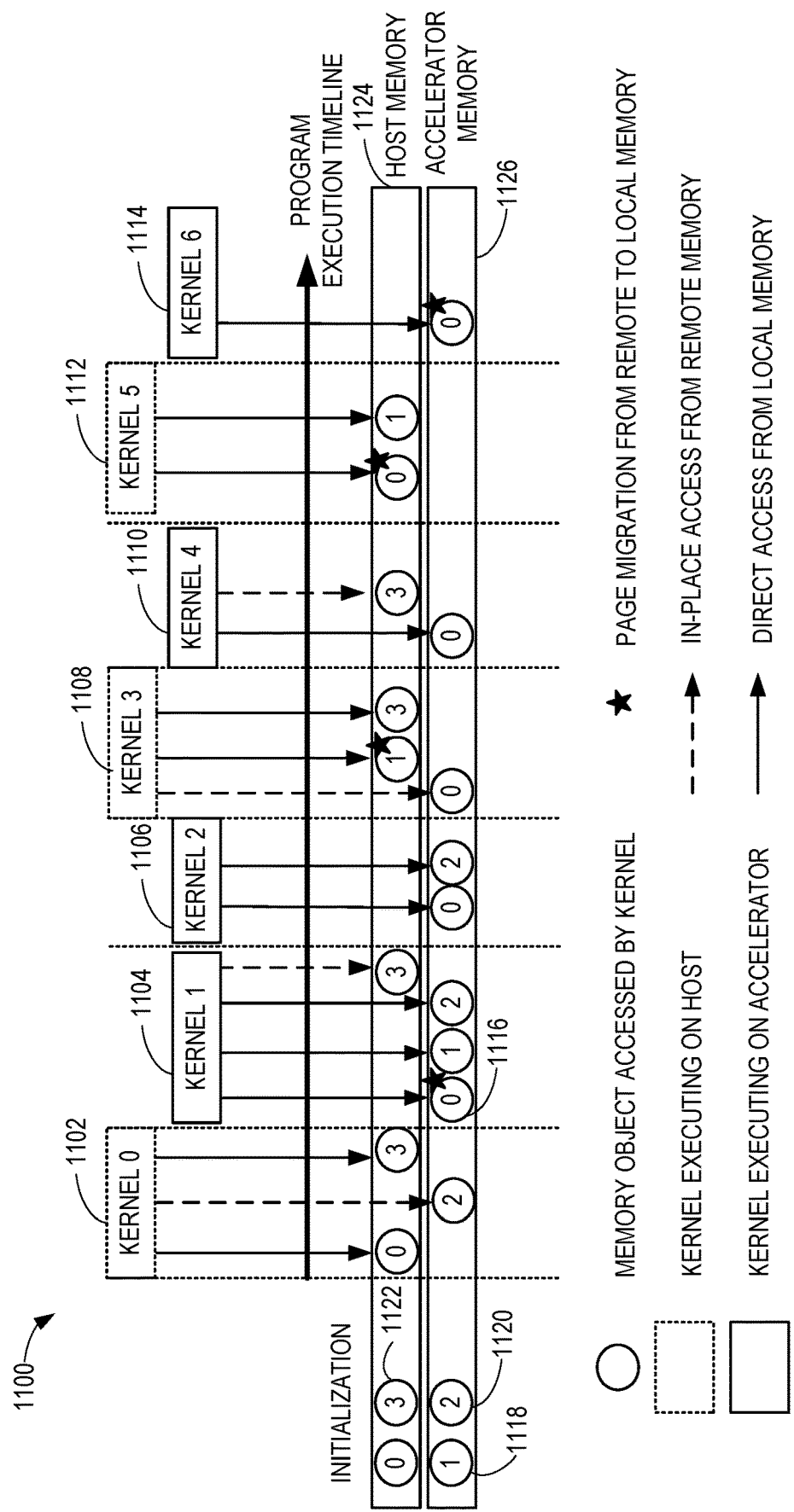
FIG. 11 is an illustration of an example program execution timeline based on another example memory operation selection technique.

FIG. 11 is an illustration of a second example program execution timeline 1100 to effectuate another example memory operation selection technique. For example, the memory operation selection technique illustrated in FIG. 11 can optimize and/or otherwise improve data transfer operations on a per-program basis by evaluating the entire program or portion(s) thereof. For example, the memory operation selection circuitry 300 can consider memory object reuse across the second program execution timeline 1100 and select optimal and/or otherwise improved data transfer operations across the entire program (or portion(s) thereof).

The second program execution timeline 1100 represents execution of a heterogeneous program, such as the heterogeneous program 268 of FIG. 2, the program(s) 382 of FIG. 3, etc. The second program execution timeline 1100 includes a first example kernel 1102 (identified by KERNEL 0), a second example kernel 1104 (identified by KERNEL 1), a third example kernel 1106 (identified by KERNEL 2), a fourth example kernel 1108 (identified by KERNEL 3), a fifth example kernel 1110 (identified by KERNEL 4), a sixth example kernel 1112 (identified by KERNEL 5), and a seventh example kernel 1114 (identified by KERNEL 6). For example, the kernels 1102, 1104, 1106, 1108, 1110, 1112, 1114 can be code objects of the heterogeneous program. The second program execution timeline 1100 of the illustrated example includes a first example memory object 1116 (identified by memory object 0), a second example memory object 1118 (identified by memory object 1), a third example memory object 1120 (identified by memory object 2), and a fourth example memory object 1122 (identified by memory object 3).

In the program represented by the illustrated example of FIG. 11, the first kernel 1102, the fourth kernel 1108, and the sixth kernel 1112 are identified to be executed on host processor circuitry (e.g., a CPU). In the program represented by the illustrated example of FIG. 11, the second kernel 1104, the third kernel 1106, the fifth kernel 1110, and the seventh kernel 1114 are identified to be executed on an accelerator (e.g., a GPU).

During an initialization of the program represented by the illustrated example of FIG. 11, the first memory object 1116 and the fourth memory object 1122 are located in and/or otherwise stored in example host memory 1124 during an initialization stage. For example, the host memory 1124 can implement one or more data buffers that can store at least one of the first memory object 1116 or the fourth memory object 1122. During the initialization stage, the second memory object 1118 and the third memory object 1120 is located in and/or otherwise stored in example accelerator memory 1126. For example, the accelerator memory 1026 can implement one or more data buffers that can store the second memory object 1118 and the third memory object 1120.

In some examples, the second program execution timeline 1100 of FIG. 10 corresponds to the first table 800 of FIG. 8 and/or the second table 900 of FIG. 9. For example, in response to executing the first kernel 1102, the host processor circuitry can access the first memory object 1116, the third memory object 1120, and the fourth memory object 1122. In this example, the host processor circuitry executes a direct access operation on the first memory object 1116 and the fourth memory object 1122 from local memory of the host processor circuitry because the first memory object 1116 and the fourth memory object 1122 are in the host memory 1124. In this example, the host processor circuitry executes an in-place access operation on the third memory object 1120. In this example, the remote memory is the accelerator memory 1126 and the local memory is the host memory 1124. For example, as illustrated in the second table 900 of FIG. 9, the data transfer penalty associated with the third memory object 1120 (e.g., KERNEL ACCESS ORDER 0 for OBJECT 2 in the second table 900) for an in-place access operation is 50 whereas the data transfer penalty associated with the third memory object 1120 for a migration operation is 200. As a result, the memory operation selection circuitry 300 can select the optimal and/or otherwise improved memory operation for the third memory object 1120 to be the in-place access operation.

In response to executing the second kernel 1104, the accelerator can access the first memory object 1116, the second memory object 1118, the third memory object 1120, and the fourth memory object 1122. The accelerator can execute a direct access operation of the second memory object 1118 and the third memory object 1120 because the second memory object 1118 and the third memory object 1120 are in local memory of the accelerator. The accelerator can execute a migration operation (e.g., a page migration operation) to migrate and/or otherwise move the first memory object 1116 from remote memory to local memory. In this example, the remote memory is the host memory 1124 and the local memory is the accelerator memory 1126. For example, as illustrated in the second table 900 of FIG. 9, the data transfer penalty associated with the first memory object 1116 (e.g., KERNEL ACCESS ORDER 1 for OBJECT 0 in the second table 900) for an in-place access operation is 300 whereas the data transfer penalty associated with the first memory object 1016 for a migration operation is 50. As a result, the memory operation selection circuitry 300 can select the optimal and/or otherwise improved memory operation for the first memory object 1116 is a migration operation. In some examples, the memory operation selection circuitry 300 can select the improved memory operation for the first memory object 1116 to be a migration operation from remote to local memory followed by an in-place access operation of the local memory. The accelerator can execute an in-place access operation of the fourth memory object 1122 from the remote memory. For example, as illustrated in the second table 900 of FIG. 9, the data transfer penalty associated with the fourth memory object 1122 (e.g., KERNEL ACCESS ORDER 1 for OBJECT 3 in the second table 900) for an in-place access operation is 30 whereas the data transfer penalty associated with the third memory object 1020 for a migration operation is 50. As a result, the memory operation selection circuitry 300 can select the optimal and/or otherwise improved memory operation for the third memory object 1120 as an in-place access operation.

As demonstrated by the illustrated example of FIG. 11, the memory operation selection circuitry 300 can execute the example trellis optimization technique described herein to reduce latency in connection with program execution. For example, the number of page migrations of the first memory object 1116 is reduced from five times in FIG. 10 to three times in FIG. 11. By way of another example, the number of page migrations of the fourth memory object 1122 is reduced from two times in FIG. 10 to zero times in FIG. 11. Advantageously, the memory operations selection circuitry 300 can reduce latency in connection with program execution by identifying memory operations based on at least one of locations of memory objects or execution times of memory operations, which can include in-place access operations and migration operations.

Figure 12:
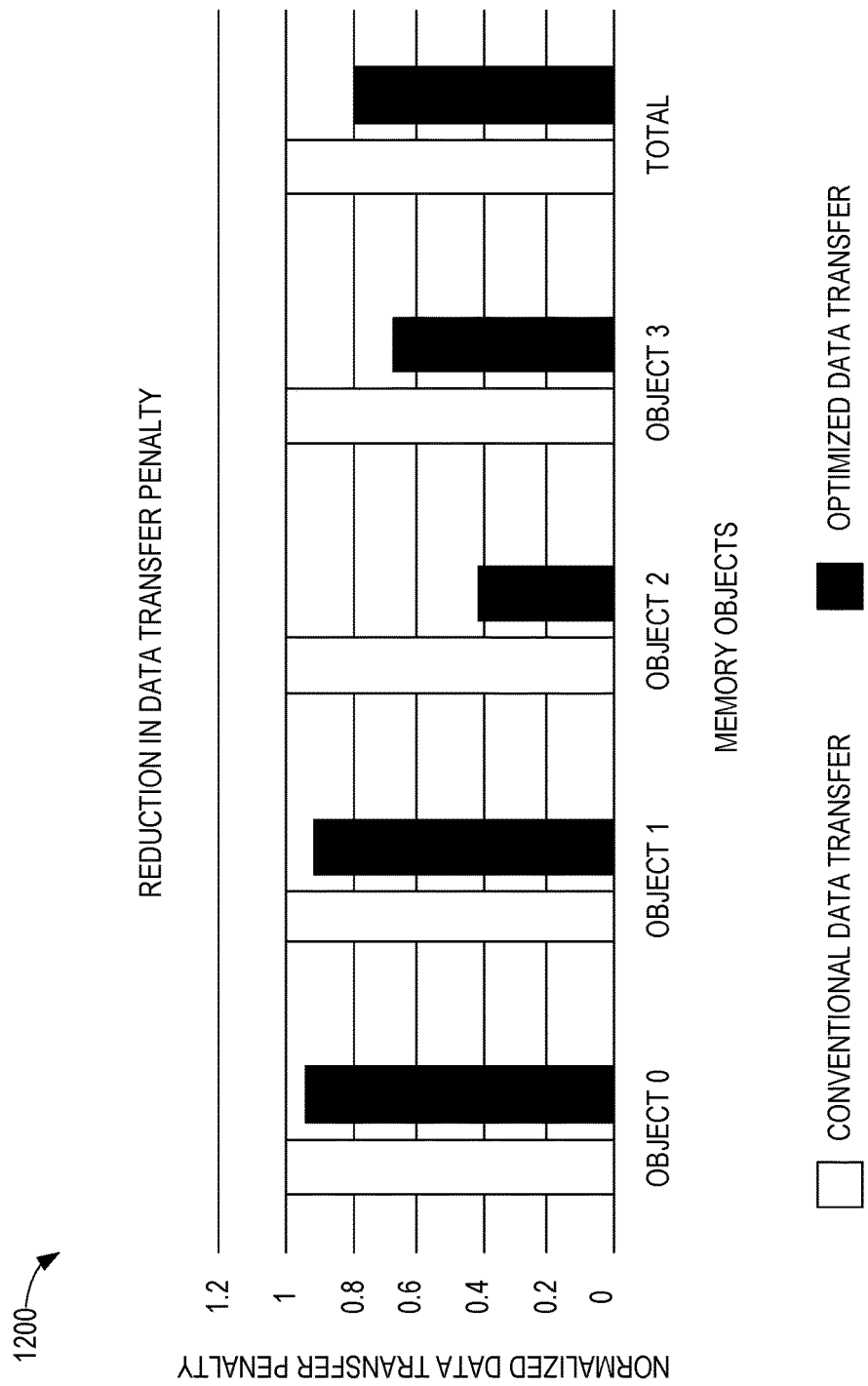
FIG. 12 is a graph of example reductions in data transfer penalties using example memory operation selection techniques with respect to conventional memory operation selection techniques.

FIG. 12 is a graph 1200 of example reductions in data transfer penalties using example memory operation selection techniques with respect to conventional memory operation selection techniques. In the graph 1200, first normalized values of data transfer penalties are depicted for a conventional data transfer technique. In the graph 1200, second normalized values of data transfer penalties are depicted for the example optimized data transfer technique as described herein. For example, the second normalized values can correspond to data transfer penalties incurred in response to the memory operation selection circuitry 300 identifying memory operations for optimal and/or otherwise improved program execution (e.g., reduced latency). Advantageously, the memory operation selection circuitry 300 can reduce the normalized data transfer penalty from 1.0 to approximately 0.9 for OBJECT 1 (e.g., the second memory object 1018 of FIG. 10, the second memory object 1118 of FIG. 11, etc.). Advantageously, the memory operation selection circuitry 300 can improve execution of a heterogeneous program by identifying memory operations to reduce incurred data transfer penalties.

Flowcharts representative of example hardware logic circuitry, machine readable instructions, hardware implemented state machines, and/or any combination thereof for implementing the memory operation selection circuitry 300 of FIG. 3 are shown in FIGS. 13-17. The machine readable instructions may be one or more executable programs or portion(s) of an executable program for execution by processor circuitry, such as the processor circuitry 1812 shown in the example processor platform 1800 discussed below in connection with FIG. 18 and/or the example processor circuitry discussed below in connection with FIGS. 19 and/or 20. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. In some examples, the program may implement an SDK that, when executed or instantiated, can implement the offload analyzer 208 of FIG. 2. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 13-17, many other methods of implementing the example memory operation selection circuitry 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), an SDK, an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 13-17 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 13:
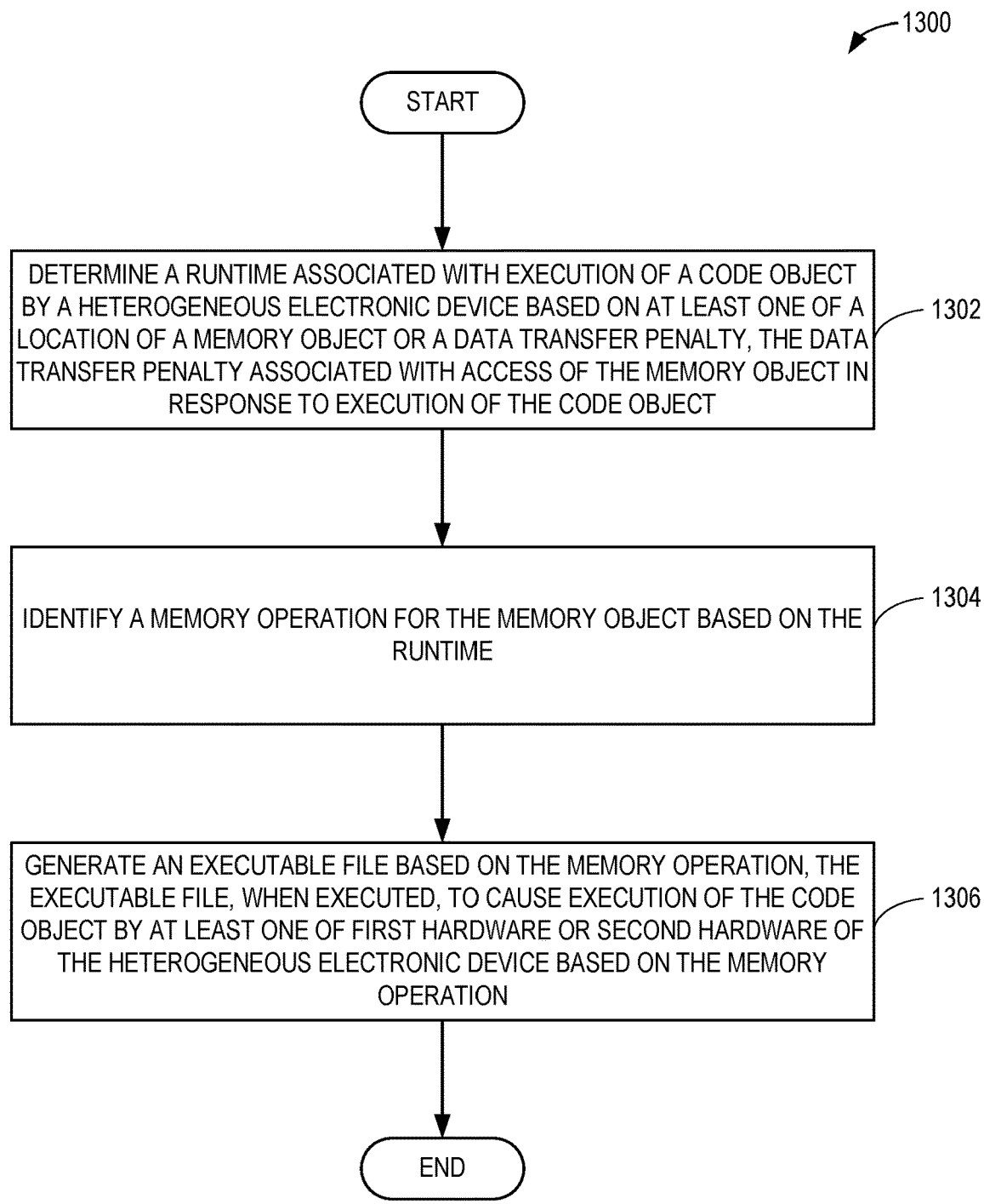
FIG. 13 is a flowchart representative of example machine readable instructions and/or example operations that may be executed by example processor circuitry to implement the example memory operation selection circuitry of FIG. 3 to generate an executable file based on a memory operation.

FIG. 13 is a flowchart representative of example machine readable instructions and/or example operations 1300 that may be executed and/or instantiated by processor circuitry to generate an executable file based on a memory operation. The example machine readable instructions and/or the example operations 1300 of FIG. 13 begin at block 1302, at which the memory operation selection circuitry 300 determines a runtime associated with execution of a code object by a heterogeneous electronic device based on at least one of a location of a memory object or a data transfer penalty, the data transfer penalty associated with access of the memory object in response to execution of the code object. For example, the memory object identification circuitry 340 (FIG. 3) can identify the memory object 512A, 512B to be accessed by the accelerator 224 during execution of a code object, such as the second kernel 506 of FIGS. 5-7, by the accelerator 224. In some examples, the execution time determination circuitry 350 (FIG. 3) can determine the runtime to be 17 ms, which is a minimum of (i) 35 ms associated with the memory object 512A remaining in a first data buffer of the second host processor circuitry 218 and (ii) 17 ms associated with migrating the memory object 512A from the first data buffer of the second host processor circuitry 218 to a second data buffer of the accelerator 224. In some examples, the execution time determination circuitry 350 determines the data transfer penalty based on one of (i) an in-place access operation from the first data buffer of the second host processor circuitry 218 by the accelerator 224 or (ii) a migration operation to transfer the memory object 512A from the first data buffer to the second data buffer.

At block 1304, the memory operation selection circuitry 300 identifies a memory operation for the memory object based on the runtime. For example, the memory operation identification circuitry 360 (FIG. 3) can identify the memory operation associated with the memory object 512A, 512B to be a migration operation from the second host processor circuitry 218 to the accelerator 224 at the edge of the first kernel 504 and the second kernel 506. In some examples, the memory operation is identified by the second survivor edge 604 of FIGS. 6-7.

At block 1306, the memory operation selection circuitry 300 generates an executable file based on the memory operation, the executable file, when executed, to cause execution of the code object by at least one of first hardware or second hardware of the heterogeneous electronic device based on the memory operation. For example, the executable generation circuitry 370 (FIG. 3) can generate the executable file(s) 388 based on the optimal program execution strategy 700 of FIG. 7, which includes the memory operation identified by the second survivor edge 604. In response to generating the executable file based on the memory operation at block 1306, the example machine readable instructions and/or the example operations 1300 of FIG. 13 conclude.

Figure 14:
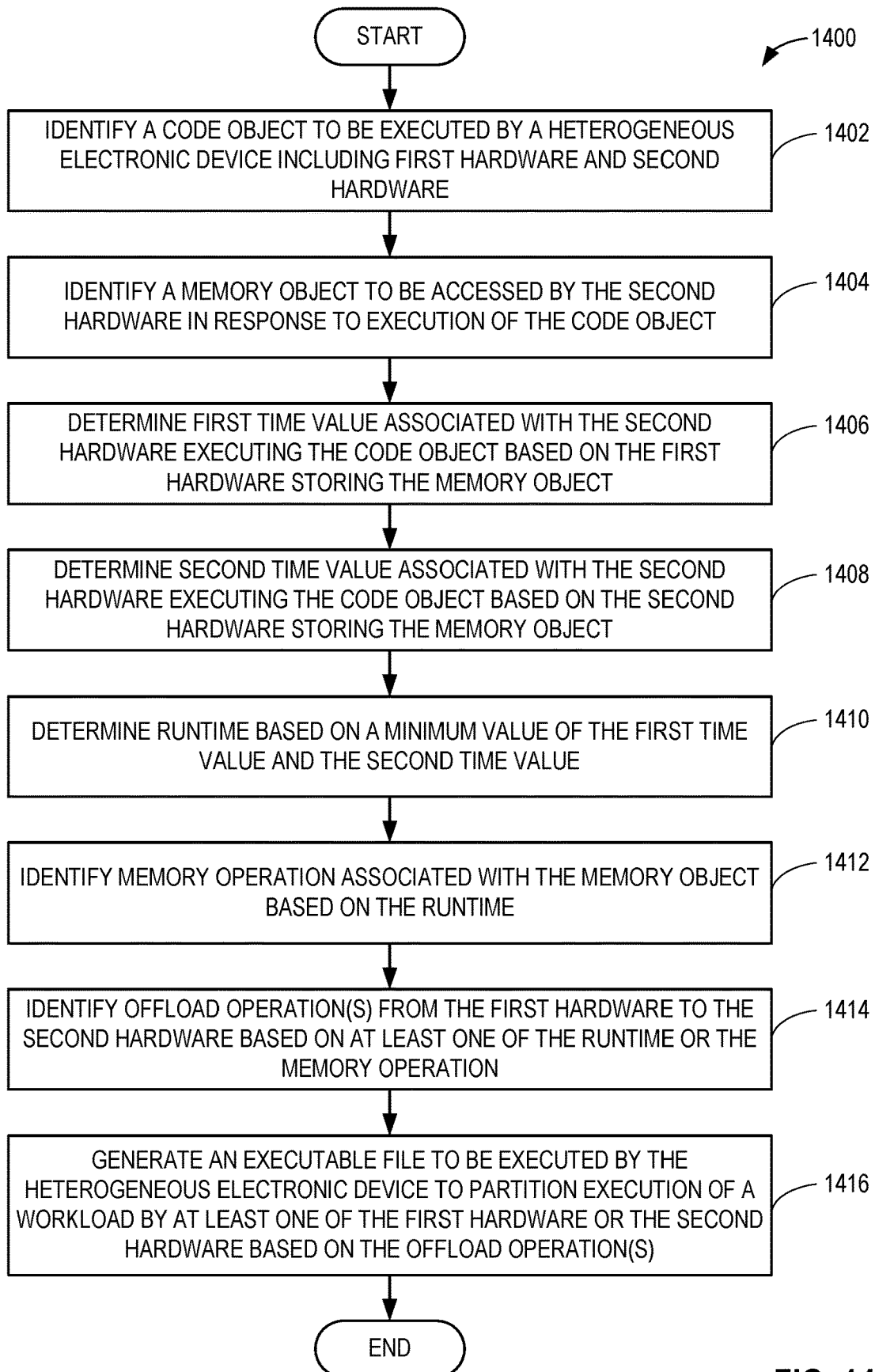
FIG. 14 is a flowchart representative of example machine readable instructions and/or example operations that may be executed by example processor circuitry to implement the example memory operation selection circuitry of FIG. 3 to generate an executable file to be executed by a heterogeneous electronic device to partition execution of a workload.

FIG. 14 is a flowchart representative of example machine readable instructions and/or example operations 1400 that may be executed and/or instantiated by processor circuitry to generate an executable file to be executed by a heterogeneous electronic device to partition execution of a workload. The example machine readable instructions and/or the example operations 1400 of FIG. 14 begin at block 1402, at which the memory operation selection circuitry 300 identifies a code object to be executed by a heterogeneous electronic device including first hardware and second hardware. For example, the code object identification circuitry 330 (FIG. 3) can identify the second kernel 506 of FIGS. 5-7.

At block 1404, the memory operation selection circuitry 300 identifies a memory object to be accessed by the second hardware in response to execution of the code object. For example, the memory object identification circuitry 340 (FIG. 3) can identify the memory object 512A, 512B to be accessed by the accelerator 224 during execution of the second kernel 506.

At block 1406, the memory operation selection circuitry 300 determines a first time value associated with the second hardware executing the code object based on the first hardware storing the memory object. For example, the execution time determination circuitry 350 (FIG. 3) can determine a first runtime (e.g., a first runtime value) to be 35 ms, which is a minimum value of (i) 35 ms associated with the second host processor circuitry 218 storing the memory object 512A during execution of the first kernel 504 and (ii) 43 ms associated with the accelerator 224 storing the memory object 512B during execution of the first kernel 504 and transferring the memory object 512B from the accelerator 224 to the second host processor circuitry 218.

At block 1408, the memory operation selection circuitry 300 determines a second time value associated with the second hardware executing the code object based on the second hardware storing the memory object. For example, the execution time determination circuitry 350 can determine a second runtime (e.g., a second runtime value) to be 17 ms, which is a minimum value of (i) 20 ms associated with the accelerator 224 storing the memory object 512B during execution of the first kernel 504 and (ii) 17 ms associated with the second host processor circuitry 218 storing the memory object 512A during execution of the first kernel 504 and transferring the memory object 512A from the second host processor circuitry 218 to the accelerator 224.

At block 1410, the memory operation selection circuitry 300 determines a runtime based on a minimum value of the first time value and the second time value. For example, the execution time determination circuitry 350 can determine a minimum runtime value of 17 ms associated with execution of the first kernel 504 and the second kernel 506 based on a minimum value of the first runtime of 35 ms and the second runtime of 17 ms.

At block 1412, the memory operation selection circuitry 300 identifies a memory operation associated with the memory object based on the runtime. For example, the memory operation identification circuitry 360 (FIG. 3) can identify the memory operation associated with the memory object 512A, 512B to be a migration operation from the second host processor circuitry 218 to the accelerator 224 at the edge of the first kernel 504 and the second kernel 506. In some examples, the memory operation is identified by the second survivor edge 604 of FIGS. 6-7.

At block 1414, the memory operation selection circuitry 300 identifies offload operation(s) from the first hardware to the second hardware based on at least one of the runtime or the memory operation. For example, the executable generation circuitry 370 (FIG. 3) can determine to transfer execution of a code object, such as the second kernel 506, from the second host processor circuitry 218 to the accelerator 224 based on at least one of the minimum runtime of 17 ms or the memory operation identified by the second survivor edge 604, and/or, more generally, the optimal program execution strategy 700 of FIG. 7. For example, the executable generation circuitry 370 can determine to offload execution of the second kernel 506 and/or the third kernel 508 from the second host processor circuitry 218 to the accelerator 224 based on the memory operations identified at the edges of the trellis illustrated in the examples of FIGS. 5-7. Advantageously, the executable generation circuitry 370 can determine offload operations (e.g., an offload or transfer of execution of a code object from the second host processor circuitry 218 to the accelerator 224) based on identifications of optimal and/or otherwise improved memory object transfers as illustrated by the optimal program execution strategy 700 of FIG. 7.

At block 1416, the memory operation selection circuitry 300 generates an executable file to be executed by the heterogeneous electronic device to partition execution of a workload by at least one of the first hardware or the second hardware based on the offload operation(s). For example, the executable generation circuitry 370 can generate the executable file(s) 388 based on the optimal program execution strategy 700 of FIG. 7, which includes the memory operation identified by the second survivor edge 604. In some examples, the memory operation identified by the second survivor edge 604 can cause a partition of a workload (e.g., the heterogeneous program 502 or portion(s) thereof) to be executed in part by the second host processor circuitry 218 and in part by the accelerator 224. In response to generating the executable file to be executed by the heterogeneous electronic device to partition execution of a workload by at least one of the first hardware or the second hardware based on the offload operation(s) at block 1416, the example machine readable instructions and/or the example operations 1400 of FIG. 14 conclude.

Figure 15:
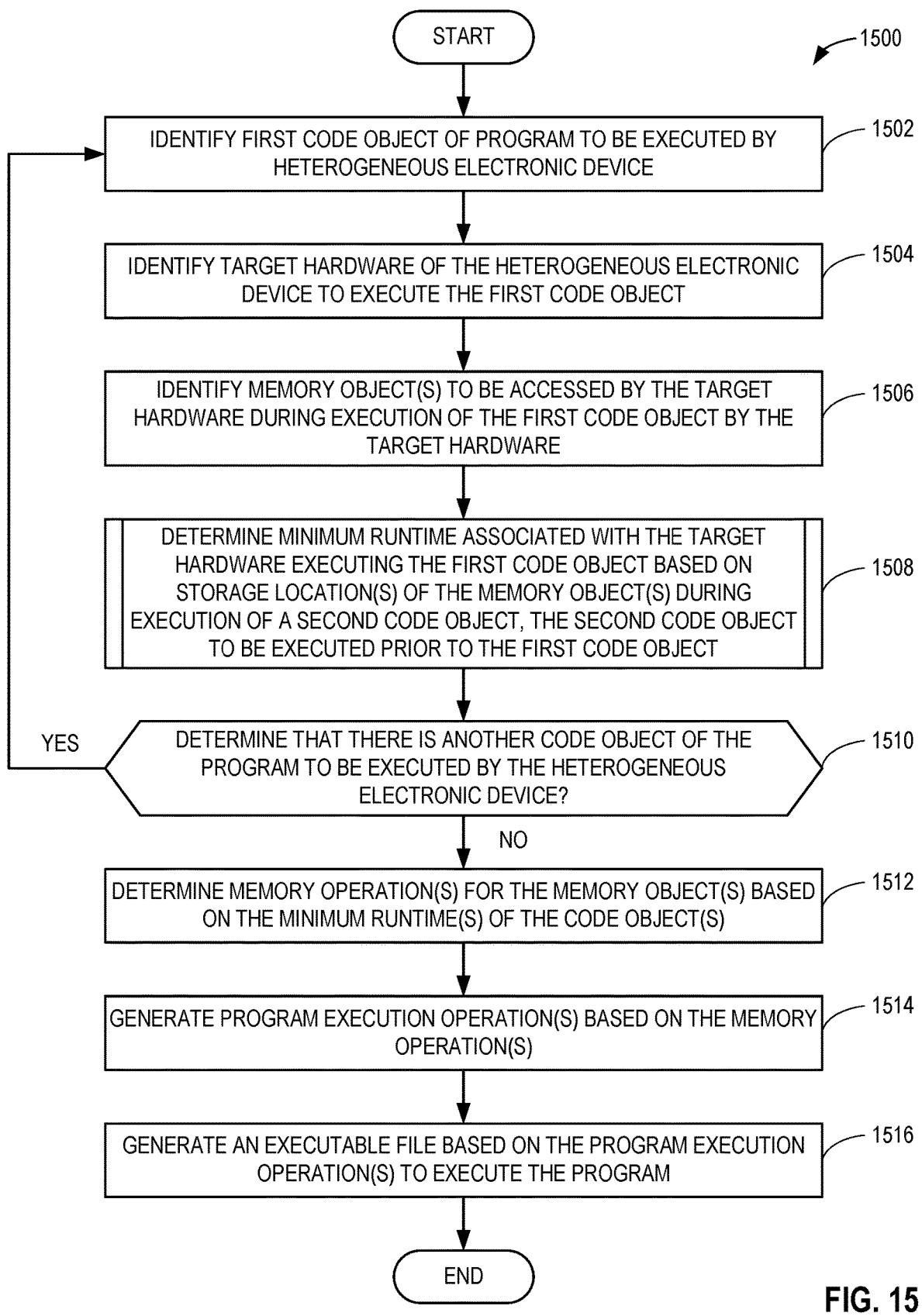
FIG. 15 is another flowchart representative of example machine readable instructions and/or example operations that may be executed by example processor circuitry to implement the example memory operation selection circuitry of FIG. 3 to generate an executable file based on a memory operation.

FIG. 15 is a flowchart representative of example machine readable instructions and/or example operations 1500 that may be executed and/or instantiated by processor circuitry to generate an executable file based on a memory operation. The example machine readable instructions and/or the example operations 1500 of FIG. 15 begin at block 1502, at which the memory operation selection circuitry 300 identifies a first code object of a program to be executed by a heterogeneous electronic device. For example, the code object identification circuitry 330 (FIG. 3) can identify the second kernel 1104 of FIG. 11.

At block 1504, the memory operation selection circuitry 300 identifies target hardware of the heterogeneous electronic device to execute the first code object. For example, the hardware identification circuitry 320 (FIG. 3) can identify the accelerator 224 of FIG. 2 to execute the second kernel 1104.

At block 1506, the memory operation selection circuitry 300 identifies memory object(s) to be accessed by the target hardware during execution of the first code object by the target hardware. For example, the memory object identification circuitry 340 (FIG. 3) can identify the first memory object 1116, the second memory object 1118, the third memory object 1120, and the fourth memory object 1122 to be accessed by the accelerator 224 during execution of the second kernel 1104.

At block 1508, the memory operation selection circuitry 300 determines a minimum runtime associated with the target hardware executing the first code object based on storage location(s) of the memory object(s) during execution of a second code object, the second code object to be executed prior to the first code object. For example, the execution time determination circuitry 350 (FIG. 3) can determine a minimum runtime associated with execution of the second kernel 1104 based on storage locations of the first memory object 1116, the second memory object 1118, the third memory object 1120, and the fourth memory object 1122 (e.g., stored in either the host memory 1124 or the accelerator memory 1126) during execution of the first kernel 1102. An example process that may be executed or instantiated by processor circuitry to implement block 1508 is described below in connection with FIG. 16.

At block 1510, the memory operation selection circuitry 300 determines whether there is another code object of the program to be executed by the heterogeneous electronic device. For example, the code object identification circuitry 330 can determine that there is another code object, such as the third kernel 1106, of the program to be executed by the target electronic system 217. If, at block 1510, the memory operation selection circuitry 300 determines that there is another code object of the program to be executed by the heterogeneous electronic device, control returns to block 1502, otherwise control proceeds to block 1512.

At block 1512, the memory operation selection circuitry 300 determines memory operation(s) for the memory object(s) based on the minimum runtime(s) of the code object(s). For example, the memory operation identification circuitry 360 (FIG. 3) can determine at least one of a first memory operation associated with the first memory object 1116 to be a page migration from remote to local memory, a second memory operation associated with the second memory object 1118 to be a direct access from local memory, a third memory operation associated with the third memory object 1120 to be a direct access from local memory, or a fourth memory operation associated with the fourth memory object 1122 to be an in-place access from remote memory based on the minimum execution time value(s).

At block 1514, the memory operation selection circuitry 300 generates a program execution operation(s) based on the memory operation(s). For example, the executable generation circuitry 370 (FIG. 3) can determine program execution operation(s), such as local execution of code object(s) by the second host processor circuitry 218 or offload operations from host processor circuitry 218 to the accelerator 224. In some examples, the executable generation circuitry 370 can determine a first program execution operation to be execution of the first kernel 1102 by the second host processor circuitry 218, a second program execution operation to be an offload operation from the second host processor circuitry 218 to the accelerator 224, etc.

At block 1516, the memory operation selection circuitry 300 generates an executable file based on the program execution operation(s) to execute the program. For example, the executable generation circuitry 370 can generate the executable file(s) 388 based on the first program execution operation, the second program execution operation, etc. In some examples, the executable file(s) 388, when executed or instantiated by the target electronic system 217, can execute a heterogeneous workload. For example, the target electronic system 217 can execute a heterogeneous workload that includes a first portion of a workload (e.g., the first program execution operation) to be executed by the second host processor circuitry 218, a second portion of the workload (e.g., the second program execution operation) to be executed by the accelerator 224, etc. In response to generating the executable file based on the program execution operation(s) to execute the program at block 1516, the example machine readable instructions and/or the example operations 1500 of FIG. 15 conclude.

Figure 16:
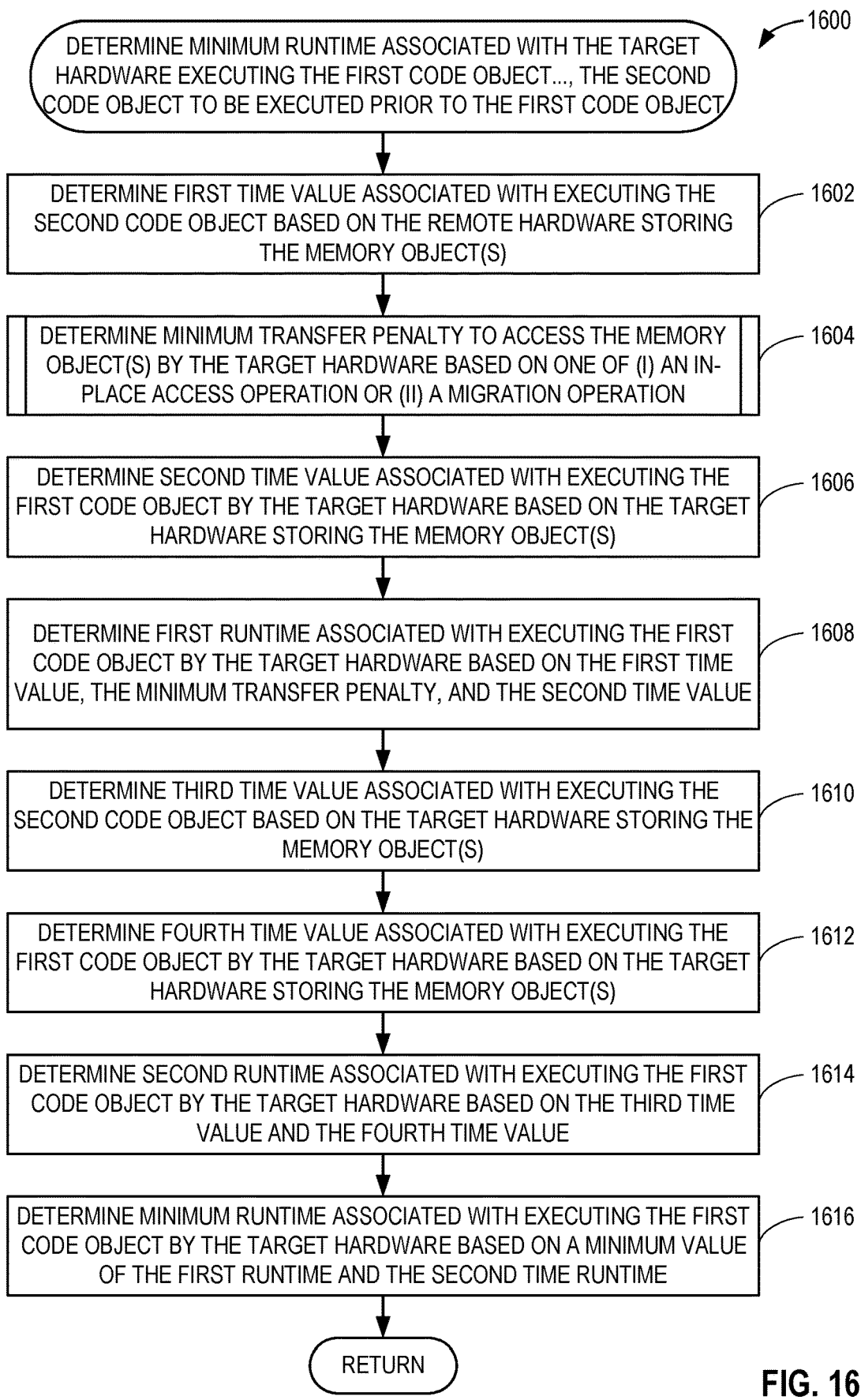
FIG. 16 is a flowchart representative of example machine readable instructions and/or example operations that may be executed by example processor circuitry to implement the example memory operation selection circuitry of FIG. 3 to determine a minimum execution time of a code object by target hardware.

FIG. 16 is a flowchart representative of example machine readable instructions and/or example operations 1600 that may be executed and/or instantiated by processor circuitry to determine a minimum runtime associated with the target hardware executing the first code object based on storage location(s) of memory object(s) during execution of a second code object, the second code object to be executed prior to the first code object. For example, the machine readable instructions and/or the operations 1600 of FIG. 16 can be executed or instantiated by processor circuitry to implement block 1508 of FIG. 15. In some examples, the machine readable instructions and/or the operations 1600 can be executed or instantiated by processor circuitry to implement the example of Equation (3) above to determine a minimum execution time value of a code object by target hardware.

The example machine readable instructions and/or the example operations 1600 of FIG. 16 begin at block 1602, at which the memory operation selection circuitry 300 determines a first time value associated with executing the second code object based on the remote hardware storing the memory object(s). For example, the first code object can be the second kernel 506 of FIG. 5, which is to be executed by the accelerator 224, and the second code object can be the first kernel 504 of FIG. 5, which is to be executed by the second host processor circuitry 218. In some examples, the execution time determination circuitry 350 (FIG. 3) can determine the first time value associated with executing the first kernel 504 to be 5 ms based on the second host processor circuitry 218 storing the memory object 512A during execution of the first kernel 504.

At block 1604, the memory operation selection circuitry 300 determines a minimum transfer penalty to access the memory object(s) by the target hardware based on one of (i) an in-place access operation or (ii) a migration operation. For example, the execution time determination circuitry 350 can determine a minimum transfer penalty based on either (i) the accelerator 224 accessing the memory object 512A from the second host processor circuitry 218 via an in-place access operation or (ii) migrating the memory object 512A from the second host processor circuitry 218 to the accelerator 224. An example process that may be executed or instantiated by processor circuitry to implement block 1604 is described below in connection with FIG. 17.

At block 1606, the memory operation selection circuitry 300 determines a second time value associated with executing the first code object by the target hardware based on the target hardware storing the memory object(s). For example, the execution time determination circuitry 350 can determine a runtime value of 17 ms associated with the accelerator 224 executing the second kernel 506 based on the accelerator 224 storing the memory object 512B during execution of the second kernel 506.

At block 1608, the memory operation selection circuitry 300 determines a first runtime value associated with executing the first code object by the target hardware based on the first time value, the minimum transfer penalty, and the second time value. For example, the execution time determination circuitry 350 can determine the first runtime to be 17 ms based on the first runtime of 5 ms, the minimum transfer penalty associated with migrating the memory object 512A to the accelerator 224, and the second runtime of 17 ms.

At block 1610, the memory operation selection circuitry 300 determines a third time value associated with executing the second code object based on the target hardware storing the memory object(s). For example, the execution time determination circuitry 350 can determine the third time value associated with executing the first kernel 504 to be 7 ms based on the accelerator 224 storing the memory object 512B during execution of the first kernel 504.

At block 1612, the memory operation selection circuitry 300 determines a fourth time value associated with executing the first code object by the target hardware based on the target hardware storing the memory object(s). For example, the execution time determination circuitry 350 can determine the fourth time value associated with executing the second kernel 506 to be 20 ms based on the accelerator 224 storing the memory object 512B during execution of the second kernel 506. In some examples, the fourth time value is based on the accelerator 224 executing a direct access operation on the memory object 512B.

At block 1614, the memory operation selection circuitry 300 determines a second runtime associated with executing the first code object by the target hardware based on the third time value and the fourth time value. For example, the execution time determination circuitry 350 can determine the second runtime associated with executing the second kernel 506 to be 20 ms based on the third time value of 7 ms and the fourth time value of 20 ms, which assumes the accelerator 224 is to execute a direct access operation on the memory object 512B.

At block 1616, the memory operation selection circuitry 300 determines a minimum runtime associated with executing the first code object by the target hardware based on a minimum value of the first runtime and the second runtime. For example, the execution time determination circuitry 350 can determine the minimum runtime associated with executing the second kernel 506 to be 17 ms based on a minimum of the first runtime of 17 ms and the second runtime of 20 ms.

In response to determining a minimum runtime associated with executing the first code object by the target hardware based on a minimum value of the first runtime and the second runtime at block 1616, the example machine readable instructions and/or the example operations 1600 conclude. For example, the machine readable instructions and/or the operations 1600 can return to block 1510 of FIG. 15 to determine whether there is another code object of the program to be executed by the heterogeneous electronic device.

Figure 17:
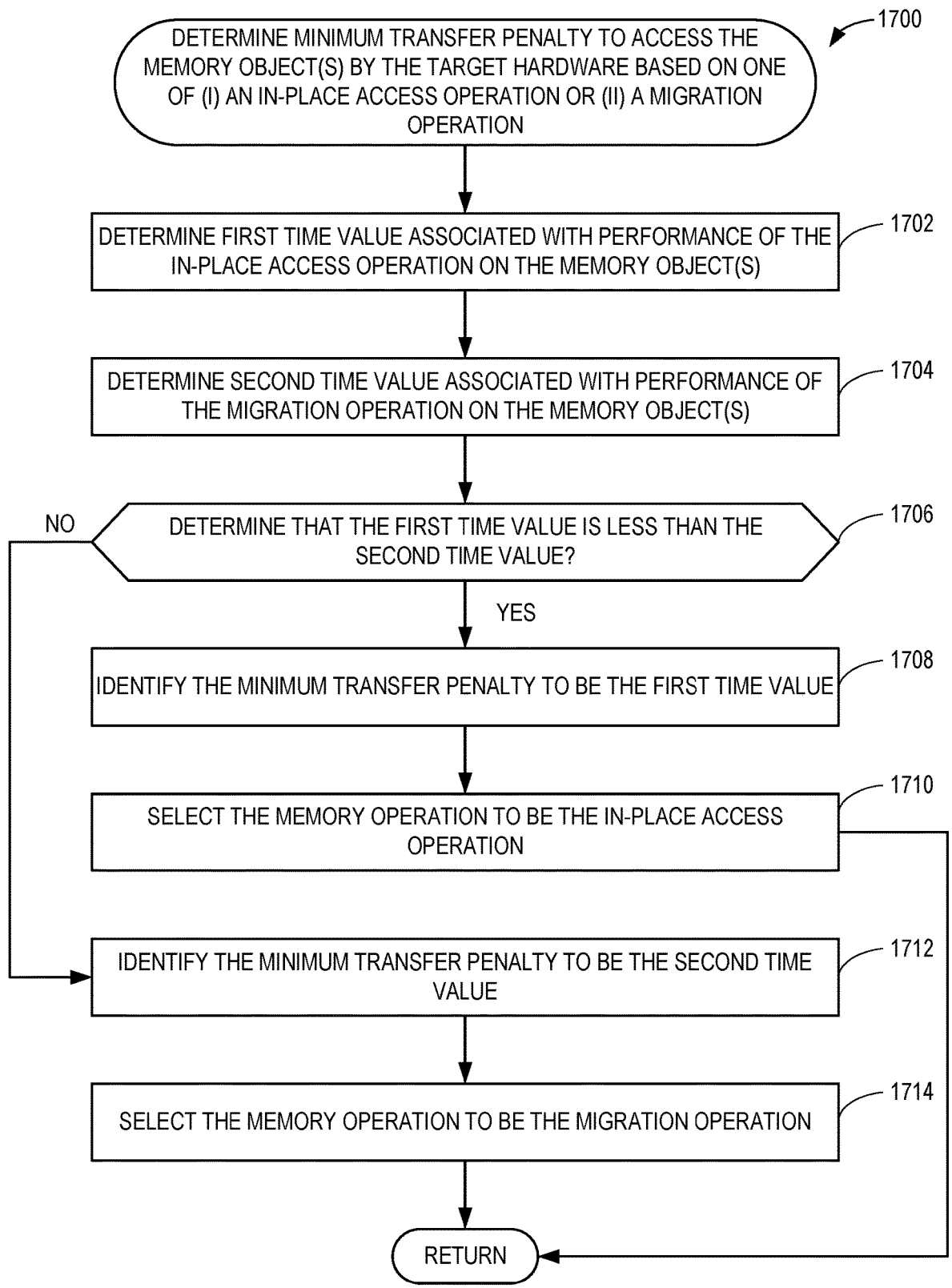
FIG. 17 is a flowchart representative of example machine readable instructions and/or example operations that may be executed by example processor circuitry to implement the example memory operation selection circuitry of FIG. 3 to determine a minimum transfer penalty.

FIG. 17 is a flowchart representative of example machine readable instructions and/or example operations 1700 that may be executed and/or instantiated by processor circuitry to determine a minimum transfer penalty to access memory object(s) by target hardware based on one of (i) an in-place access operation or (ii) a migration operation. For example, the machine readable instructions and/or the operations 1700 of FIG. 17 can be executed or instantiated by processor circuitry to implement block 1604 of FIG. 16. In some examples, the machine readable instructions and/or the operations 1700 can be executed or instantiated by processor circuitry to implement the example of Equation (3) above to determine a minimum execution time of a code object by target hardware based on a minimum transfer penalty.

The example machine readable instructions and/or the example operations 1700 of FIG. 17 begin at block 1702, at which the memory operation selection circuitry 300 determines a first time value associated with performance of the in-place access operation on the memory object(s). By way of example, assume that the memory object is the first memory object 1116 to be accessed by the accelerator 224 during execution of the second kernel 1104 of FIG. 11. In this example, the first memory object 1116 is in the host memory 1124 and the second kernel 1104 is to be executed by the accelerator 224. The memory operation selection circuitry 300 is to determine whether the accelerator 224 is to access the first memory object 1116 during execution of the second kernel 1104 via an in-place access operation or a migration operation. Turning to the second table 900 of FIG. 9, the execution time determination circuitry 350 (FIG. 3) can determine that the data transfer penalty to access remote memory (e.g., the host memory 1124) is 300 ms for an in-place access from remote memory based on the value identified in the KERNEL ACCESS ORDER 1 row of object 0 in the second table 900.

At block 1704, the memory operation selection circuitry 300 determines a second time value associated with performance of the migration operation on the memory object(s). For example, the execution time determination circuitry 350 can determine that the data transfer penalty to access remote memory (e.g., the host memory 1124) is 50 ms for migrating pages to local memory (e.g., the accelerator memory 1126) based on the values identified in the KERNEL ACCESS ORDER 1 row of object 0 in the second table 900.

At block 1706, the memory operation selection circuitry 300 determines whether the first time value is less than the second time value. For example, the execution time determination circuitry 350 can determine that the first time value of 300 ms is less than the time value of 50 ms.

If, at block 1706, the memory operation selection circuitry 300 determines that the first time value is less than the second time value, then, at block 1708, the memory operation selection circuitry 300 identifies the minimum transfer penalty to be the first time value. For example, the execution time determination circuitry 350 can determine the minimum transfer penalty to be 300 ms.

At block 1710, the memory operation selection circuitry 300 selects the memory operation to be the in-place access operation. For example, the memory operation identification circuitry 360 (FIG. 3) can select the memory operation to be the in-place access operation of the first memory object 1116, which is to be executed by the accelerator 224 in response to execution of the second kernel 1104.

In response to selecting the memory operation to be the in-place access operation at block 1710, the example machine readable instructions and/or the example operations 1700 of FIG. 17 conclude. For example, the machine readable instructions and/or the operations 1700 can return to block 1606 of the machine readable instructions and/or the operations 1600 of FIG. 16 to determine a second execution time of the first code object by the target hardware based on the target hardware storing the memory object(s).

If, at block 1706, the memory operation selection circuitry 300 determines that the first time value is not less than the second time value, control proceeds to block 1712. At block 1712, the memory operation selection circuitry 300 identifies the minimum transfer penalty to be the second time value. For example, the execution time determination circuitry 350 can identify the minimum transfer penalty to be 50 ms.

At block 1714, the memory operation selection circuitry 300 selects the memory operation to be the migration operation. For example, the memory operation identification circuitry 360 can select the memory operation to be the migration operation of the first memory object 1116, which is to be executed by the accelerator 224 in response to execution of the second kernel 1104.

In response to selecting the memory operation to be the migration operation at block 1704, the example machine readable instructions and/or the example operations 1700 of FIG. 17 conclude. For example, the machine readable instructions and/or the operations 1700 can return to block 1606 of the machine readable instructions and/or the operations 1600 of FIG. 16 to determine a second execution time of the first code object by the target hardware based on the target hardware storing the memory object(s).

Figure 18:
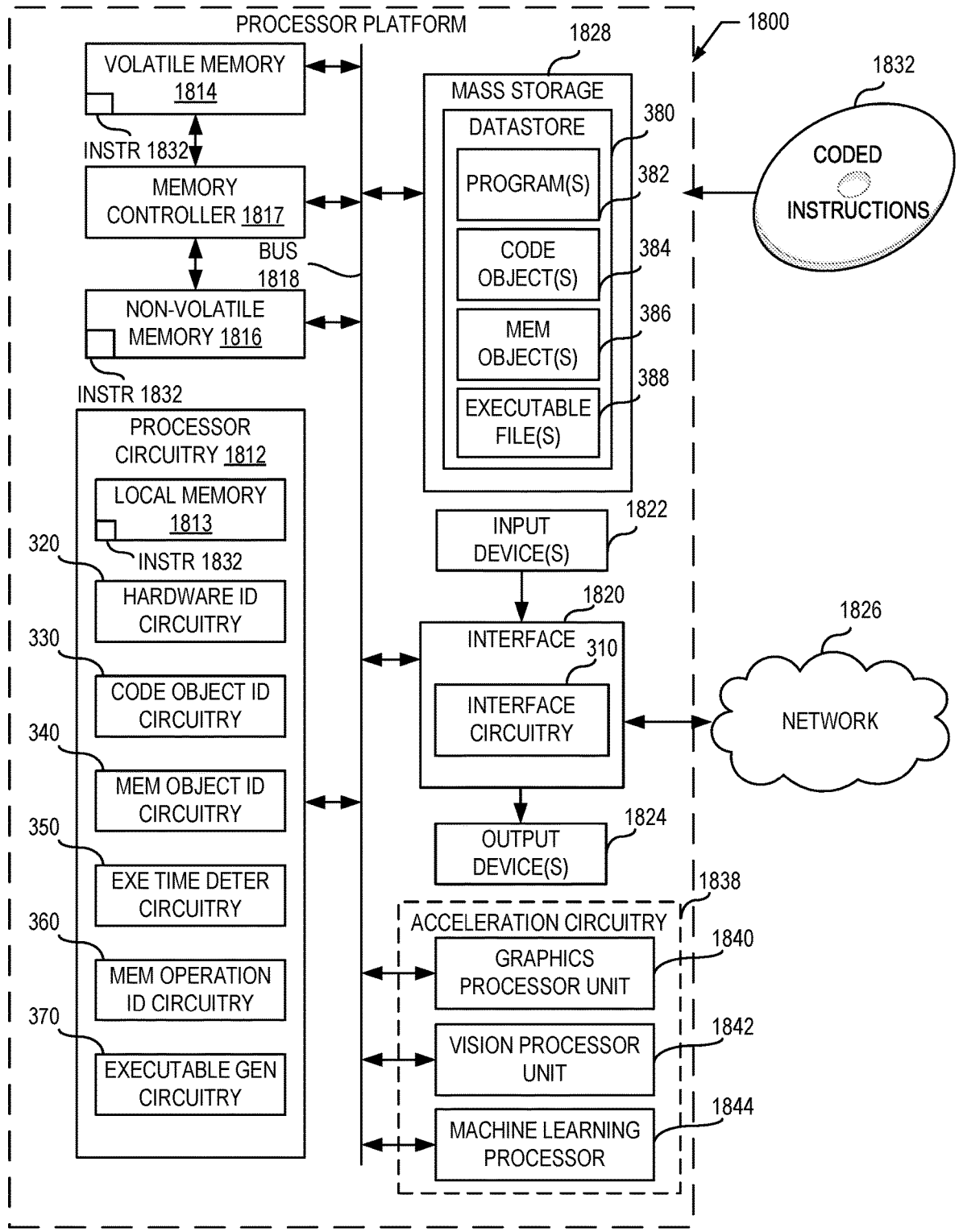
FIG. 18 is a block diagram of an example processing platform including processor circuitry structured to execute the example machine readable instructions and/or the example operations of FIGS. 13-17 to implement the example memory operation selection circuitry of FIG. 3.

FIG. 18 is a block diagram of an example processor platform 1800 structured to execute and/or instantiate the example machine readable instructions and/or the example operations of FIGS. 13-17 to implement the memory operation selection circuitry 300 of FIG. 3. The processor platform 1800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1800 of the illustrated example includes processor circuitry 1812. The processor circuitry 1812 of the illustrated example is hardware. For example, the processor circuitry 1812 can be implemented by one or more integrated circuits, logic circuits, FPGAs, microprocessors, CPUs, GPUs, DSPs, and/or microcontrollers from any desired family or manufacturer. The processor circuitry 1812 may be implemented by one or more semiconductor based (e.g., silicon based) devices. In this example, the processor circuitry 1812 implements the hardware identification circuitry 320 (identified by HARDWARE ID CIRCUITRY), the code object identification circuitry 330 (identified by CODE OBJECT ID CIRCUITRY), the memory object identification circuitry 340 (identified by MEM OBJECT ID CIRCUITRY), the execution time determination circuitry 350 (identified by EXE TIME DETER CIRCUITRY), the memory operation identification circuitry 360 (identified by MEM OPERATION ID CIRCUITRY), and the executable generation circuitry 370 (identified by EXECUTABLE GEN CIRCUITRY) of FIG. 3.

The processor circuitry 1812 of the illustrated example includes a local memory 1813 (e.g., a cache, registers, etc.). The processor circuitry 1812 of the illustrated example is in communication with a main memory including a volatile memory 1814 and a non-volatile memory 1816 by a bus 1818. In some examples, the bus 1818 implements the bus 390 of FIG. 3. The volatile memory 1814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1816 may be implemented by flash memory and/or any other desired type of memory device. Access to the main memory 1814, 1816 of the illustrated example is controlled by a memory controller 1817.

The processor platform 1800 of the illustrated example also includes interface circuitry 1820. The interface circuitry 1820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In this example, the interface 1820 implements the interface circuitry 310 of FIG. 3.

In the illustrated example, one or more input devices 1822 are connected to the interface circuitry 1820. The input device(s) 1822 permit(s) a user to enter data and/or commands into the processor circuitry 1812. The input device(s) 1822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1824 are also connected to the interface circuitry 1820 of the illustrated example. The output device(s) 1824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1820 of the illustrated example, thus, typically includes a graphics driver card, a graphics driver chip, and/or graphics processor circuitry such as a GPU.

The interface circuitry 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1800 of the illustrated example also includes one or more mass storage devices 1828 to store software and/or data. Examples of such mass storage devices 1828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1832, which may be implemented by the machine readable instructions of FIGS. 13-17, may be stored in the mass storage device 1828, in the volatile memory 1814, in the non-volatile memory 1816, and/or on a removable non-transitory computer readable storage medium such as a CD or DVD. In this example, the mass storage device 1828 implements the datastore 380 of FIG. 3, which includes the program(s) 382, the code object(s) 384, the memory object(s) 386 (identified by MEM OBJECT(S)), and the executable file(s) 388.

The processor platform 1800 of the illustrated example of FIG. 18 includes example acceleration circuitry 1838, which includes an example graphics processing unit (GPU) 1840, an example vision processing unit (VPU) 1842, and an example machine learning processor 1844. In this example, the GPU 1840, the VPU 1842, and the machine learning processor 1844 are in communication with different hardware of the processor platform 1800, such as the volatile memory 1814, the non-volatile memory 1816, etc., via the bus 1818.

In this example, the machine learning processor 1844 may be implemented by one or more integrated circuits, logic circuits, microprocessors, GPUs, DSPs, or controllers from any desired family or manufacturer that can be used to execute an artificial intelligence and/or machine learning workload (e.g., a neural network, a deep learning model, etc.). In some examples, the GPU 1840, the VPU 1842, and/or the machine learning processor 1844 may implement the accelerator 160 of FIG. 1, the accelerator 224 of FIG. 2, etc. In some examples, one or more of the hardware identification circuitry 320, the code object identification circuitry 330, the memory object identification circuitry 340, the execution time determination circuitry 350, the memory operation identification circuitry 360, and/or the executable generation circuitry 370 can be implemented in or with at least one of the GPU 1840, the VPU 1842, or the machine learning processor 1844 instead of or in addition to the processor circuitry 1812.

Figure 19:
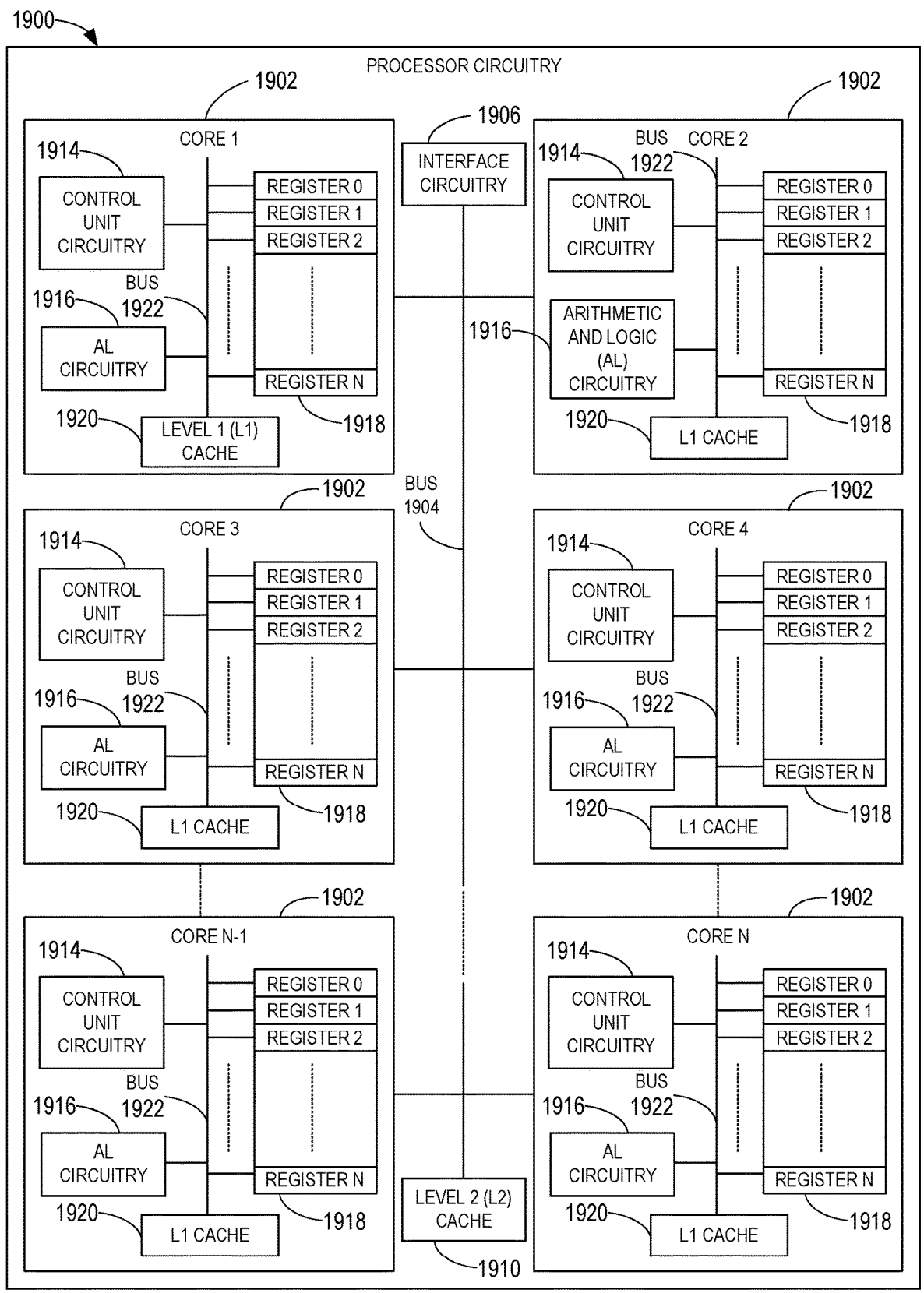
FIG. 19 is a block diagram of an example implementation of the processor circuitry of FIG. 18.

FIG. 19 is a block diagram of an example implementation of the processor circuitry 1812 of FIG. 18. In this example, the processor circuitry 1812 of FIG. 18 is implemented by a general purpose microprocessor 1900. The general purpose microprocessor circuitry 1900 executes some or all of the machine readable instructions of the flowcharts of FIGS. 13-17 to effectively instantiate the memory operation selection circuitry 300 of FIG. 3 as logic circuits to perform the operations corresponding to those machine readable instructions. In some such examples, the memory operation selection circuitry 300 of FIG. 3 is instantiated by the hardware circuits of the microprocessor 1900 in combination with the instructions. For example, the microprocessor 1900 may implement multi-core hardware circuitry such as a CPU, a DSP, a GPU, an XPU, etc. Although it may include any number of example cores 1902 (e.g., 1 core), the microprocessor 1900 of this example is a multi-core semiconductor device including N cores. The cores 1902 of the microprocessor 1900 may operate independently or may cooperate to execute machine readable instructions. For example, machine code corresponding to a firmware program, an embedded software program, or a software program may be executed by one of the cores 1902 or may be executed by multiple ones of the cores 1902 at the same or different times. In some examples, the machine code corresponding to the firmware program, the embedded software program, or the software program is split into threads and executed in parallel by two or more of the cores 1902. The software program may correspond to a portion or all of the machine readable instructions and/or operations represented by the flowcharts of FIGS. 13-17.

The cores 1902 may communicate by a first example bus 1904. In some examples, the first bus 1904 may implement a communication bus to effectuate communication associated with one(s) of the cores 1902. For example, the first bus 1904 may implement at least one of an Inter-Integrated Circuit (I2C) bus, a Serial Peripheral Interface (SPI) bus, a PCI bus, or a PCIe bus. Additionally or alternatively, the first bus 1904 may implement any other type of computing or electrical bus. The cores 1902 may obtain data, instructions, and/or signals from one or more external devices by example interface circuitry 1906. The cores 1902 may output data, instructions, and/or signals to the one or more external devices by the interface circuitry 1906. Although the cores 1902 of this example include example local memory 1920 (e.g., Level 1 (L1) cache that may be split into an L1 data cache and an L1 instruction cache), the microprocessor 1900 also includes example shared memory 1910 that may be shared by the cores (e.g., Level 2 (L2_cache)) for high-speed access to data and/or instructions. Data and/or instructions may be transferred (e.g., shared) by writing to and/or reading from the shared memory 1910. The local memory 1920 of each of the cores 1902 and the shared memory 1910 may be part of a hierarchy of storage devices including multiple levels of cache memory and the main memory (e.g., the main memory 1814, 1816 of FIG. 18). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1902 may be referred to as a CPU, DSP, GPU, etc., or any other type of hardware circuitry. Each core 1902 includes control unit circuitry 1914, arithmetic and logic (AL) circuitry (sometimes referred to as an ALU) 1916, a plurality of registers 1918, the L1 cache 1920, and a second example bus 1922. Other structures may be present. For example, each core 1902 may include vector unit circuitry, single instruction multiple data (SIMD) unit circuitry, load/store unit (LSU) circuitry, branch/jump unit circuitry, floating-point unit (FPU) circuitry, etc. The control unit circuitry 1914 includes semiconductor-based circuits structured to control (e.g., coordinate) data movement within the corresponding core 1902. The AL circuitry 1916 includes semiconductor-based circuits structured to perform one or more mathematic and/or logic operations on the data within the corresponding core 1902. The AL circuitry 1916 of some examples performs integer based operations. In other examples, the AL circuitry 1916 also performs floating point operations. In yet other examples, the AL circuitry 1916 may include first AL circuitry that performs integer based operations and second AL circuitry that performs floating point operations. In some examples, the AL circuitry 1916 may be referred to as an Arithmetic Logic Unit (ALU). The registers 1918 are semiconductor-based structures to store data and/or instructions such as results of one or more of the operations performed by the AL circuitry 1916 of the corresponding core 1902. For example, the registers 1918 may include vector register(s), SIMD register(s), general purpose register(s), flag register(s), segment register(s), machine specific register(s), instruction pointer register(s), control register(s), debug register(s), memory management register(s), machine check register(s), etc. The registers 1918 may be arranged in a bank as shown in FIG. 19. Alternatively, the registers 1918 may be organized in any other arrangement, format, or structure including distributed throughout the core 1902 to shorten access time. The second bus 1922 may implement at least one of an I2C bus, a SPI bus, a PCI bus, or a PCIe bus Each core 1902 and/or, more generally, the microprocessor 1900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 20:
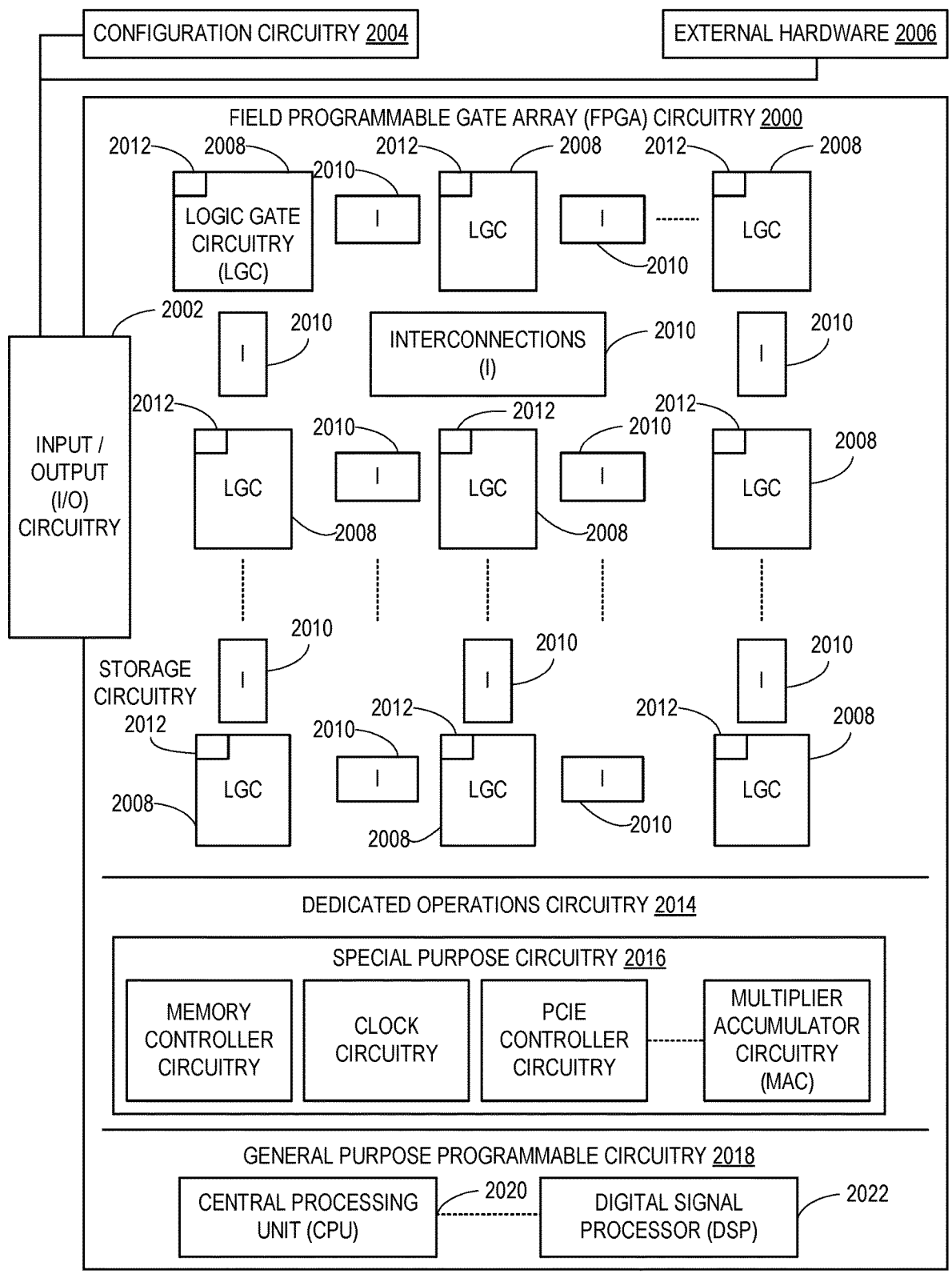
FIG. 20 is a block diagram of another example implementation of the processor circuitry of FIG. 18.

FIG. 20 is a block diagram of another example implementation of the processor circuitry 1812 of FIG. 18. In this example, the processor circuitry 1812 is implemented by FPGA circuitry 2000. The FPGA circuitry 2000 can be used, for example, to perform operations that could otherwise be performed by the example microprocessor 1900 of FIG. 19 executing corresponding machine readable instructions. However, once configured, the FPGA circuitry 2000 instantiates the machine readable instructions in hardware and, thus, can often execute the operations faster than they could be performed by a general purpose microprocessor executing the corresponding software.

More specifically, in contrast to the microprocessor 1900 of FIG. 19 described above (which is a general purpose device that may be programmed to execute some or all of the machine readable instructions represented by the flowcharts of FIGS. 13-17 but whose interconnections and logic circuitry are fixed once fabricated), the FPGA circuitry 2000 of the example of FIG. 20 includes interconnections and logic circuitry that may be configured and/or interconnected in different ways after fabrication to instantiate, for example, some or all of the machine readable instructions represented by the flowcharts of FIGS. 13-17. In particular, the FPGA 2000 may be thought of as an array of logic gates, interconnections, and switches. The switches can be programmed to change how the logic gates are interconnected by the interconnections, effectively forming one or more dedicated logic circuits (unless and until the FPGA circuitry 2000 is reprogrammed). The configured logic circuits enable the logic gates to cooperate in different ways to perform different operations on data received by input circuitry. Those operations may correspond to some or all of the software represented by the flowcharts of FIGS. 13-17. As such, the FPGA circuitry 2000 may be structured to effectively instantiate some or all of the machine readable instructions of the flowcharts of FIGS. 13-17 as dedicated logic circuits to perform the operations corresponding to those software instructions in a dedicated manner analogous to an ASIC. Therefore, the FPGA circuitry 2000 may perform the operations corresponding to the some or all of the machine readable instructions of FIGS. 13-17 faster than the general purpose microprocessor can execute the same.

In the example of FIG. 20, the FPGA circuitry 2000 is structured to be programmed (and/or reprogrammed one or more times) by an end user by a hardware description language (HDL) such as Verilog. The FPGA circuitry 2000 of FIG. 20, includes example input/output (I/O) circuitry 2002 to obtain and/or output data to/from example configuration circuitry 2004 and/or external hardware (e.g., external hardware circuitry) 2006. For example, the configuration circuitry 2004 may implement interface circuitry that may obtain machine readable instructions to configure the FPGA circuitry 2000, or portion(s) thereof. In some such examples, the configuration circuitry 2004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2006 may implement the microprocessor 1900 of FIG. 19. The FPGA circuitry 2000 also includes an array of example logic gate circuitry 2008, a plurality of example configurable interconnections 2010, and example storage circuitry 2012. The logic gate circuitry 2008 and interconnections 2010 are configurable to instantiate one or more operations that may correspond to at least some of the machine readable instructions of FIGS. 13-17 and/or other desired operations. The logic gate circuitry 2008 shown in FIG. 20 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2008 to enable configuration of the electrical structures and/or the logic gates to form circuits to perform desired operations. The logic gate circuitry 2008 may include other electrical structures such as look-up tables (LUTs), registers (e.g., flip-flops or latches), multiplexers, etc.

The interconnections 2010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2008 to program desired logic circuits.

The storage circuitry 2012 of the illustrated example is structured to store result(s) of the one or more of the operations performed by corresponding logic gates. The storage circuitry 2012 may be implemented by registers or the like. In the illustrated example, the storage circuitry 2012 is distributed amongst the logic gate circuitry 2008 to facilitate access and increase execution speed.

The example FPGA circuitry 2000 of FIG. 20 also includes example Dedicated Operations Circuitry 2014. In this example, the Dedicated Operations Circuitry 2014 includes special purpose circuitry 2016 that may be invoked to implement commonly used functions to avoid the need to program those functions in the field. Examples of such special purpose circuitry 2016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2000 may also include example general purpose programmable circuitry 2018 such as an example CPU 2020 and/or an example DSP 2022. Other general purpose programmable circuitry 2018 may additionally or alternatively be present such as a GPU, an XPU, etc., that can be programmed to perform other operations.

Although FIGS. 19 and 20 illustrate two example implementations of the processor circuitry 1812 of FIG. 18, many other approaches are contemplated. For example, as mentioned above, modern FPGA circuitry may include an on-board CPU, such as one or more of the example CPU 2020 of FIG. 20. Therefore, the processor circuitry 1812 of FIG. 18 may additionally be implemented by combining the example microprocessor 1900 of FIG. 19 and the example FPGA circuitry 2000 of FIG. 20. In some such hybrid examples, a first portion of the machine readable instructions represented by the flowcharts of FIGS. 13-17 may be executed by one or more of the cores 1902 of FIG. 19, a second portion of the machine readable instructions represented by the flowcharts of FIGS. 13-17 may be executed by the FPGA circuitry 2000 of FIG. 20, and/or a third portion of the machine readable instructions represented by the flowcharts of FIGS. 13-17 may be executed by an ASIC. It should be understood that some or all of the memory operation selection circuitry 300 of FIG. 3 may, thus, be instantiated at the same or different times. Some or all of the memory operation selection circuitry 300 may be instantiated, for example, in one or more threads executing concurrently and/or in series. Moreover, in some examples, some or all of the memory operation selection circuitry 300 of FIG. 3 may be implemented within one or more virtual machines and/or containers executing on the microprocessor.

In some examples, the processor circuitry 1812 of FIG. 18 may be in one or more packages. For example, the processor circuitry 1900 of FIG. 19 and/or the FPGA circuitry 2000 of FIG. 20 may be in one or more packages. In some examples, an XPU may be implemented by the processor circuitry 1812 of FIG. 18, which may be in one or more packages. For example, the XPU may include a CPU in one package, a DSP in another package, a GPU in yet another package, and an FPGA in still yet another package.

Figure 21:
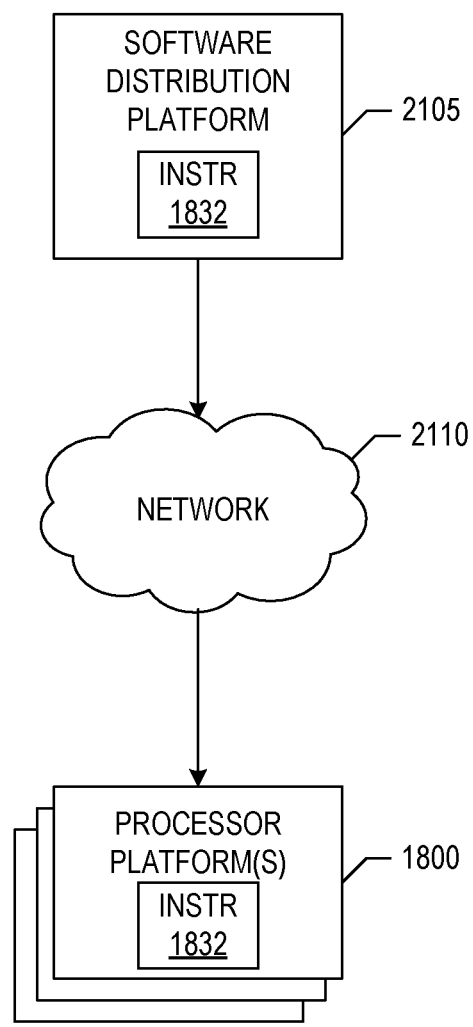
FIG. 21 is a block diagram of an example software distribution platform (e.g., one or more servers) to distribute software (e.g., software corresponding to the example machine readable instructions of FIGS. 13-17) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2105 to distribute software such as the example machine readable instructions 1832 of FIG. 18 to hardware devices owned and/or operated by third parties is illustrated in FIG. 21. The example software distribution platform 2105 may be implemented by any computer server, data facility, cloud service, etc., capable of storing and transmitting software to other computing devices. The third parties may be customers of the entity owning and/or operating the software distribution platform 2105. For example, the entity that owns and/or operates the software distribution platform 2105 may be a developer, a seller, and/or a licensor of software such as the example machine readable instructions 1832 of FIG. 18. The third parties may be consumers, users, retailers, OEMs, etc., who purchase and/or license the software for use and/or re-sale and/or sub-licensing. In the illustrated example, the software distribution platform 2105 includes one or more servers and one or more storage devices. The storage devices store the machine readable instructions 1832, which may correspond to the example machine readable instructions 1300, 1400, 1500, 1600, 1700 of FIGS. 13-17, as described above. The one or more servers of the example software distribution platform 2105 are in communication with a network 2110, which may correspond to any one or more of the Internet and/or any of the example networks 1826 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1832 from the software distribution platform 2105. For example, the software, which may correspond to the example machine readable instructions 1300, 1400, 1500, 1600, 1700 of FIGS. 13-17, may be downloaded to the example processor platform 1800, which is to execute the machine readable instructions 1832 to implement the memory operation selection circuitry 300 of FIG. 3. In some examples, one or more servers of the software distribution platform 2105 periodically offer, transmit, and/or force updates to the software (e.g., the example machine readable instructions 1832 of FIG. 18) to ensure improvements, patches, updates, etc., are distributed and applied to the software at the end user devices.

From the foregoing, it will be appreciated that example systems, methods, apparatus, and articles of manufacture have been disclosed for improving data transfer for heterogeneous programs. Disclosed systems, methods, apparatus, and articles of manufacture improve the efficiency of using a computing device by optimizing and/or otherwise improving data locations and transfers in a heterogeneous system with respect to a host-accelerator partitioned program. Disclosed systems, methods, apparatus, and articles of manufacture can reduce execution time and latency with respect to execution of the host-accelerator partitioned program based on the improved data locations and transfers. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for improved data transfer for heterogeneous programs are disclosed herein. Further examples and combinations thereof include the following:

Example 1 includes an apparatus for improving data transfer for a heterogeneous program, the apparatus comprising instructions in the apparatus, and processor circuitry to at least one of execute or instantiate the instructions to determine a runtime associated with execution of a code object by a heterogeneous electronic device based on at least one of a location of a memory object or a data transfer penalty, the data transfer penalty associated with access of the memory object in response to execution of the code object, identify a memory operation for the memory object based on the runtime, and generate an executable file based on the memory operation, the executable file, when executed, to cause execution of the code object by at least one of first hardware or second hardware of the heterogeneous electronic device based on the memory operation.

Example 2 includes the apparatus of example 1, wherein the processor circuitry is to determine the data transfer penalty based on one of (i) an in-place access operation from a first data buffer of the first hardware by the second hardware or (ii) a migration operation to transfer the memory object from the first data buffer to a second data buffer of the second hardware.

Example 3 includes the apparatus of example 1, wherein the processor circuitry is to identify an offload operation to transfer execution of the code object from the first hardware to the second hardware based on at least one of the runtime or the memory operation, and the generation of the executable file is based on the offload operation.

Example 4 includes the apparatus of example 1, wherein the processor circuitry is to determine a first time value associated with the second hardware executing the code object based on the first hardware storing the memory object, determine a second time value associated with the second hardware executing the code object based on the second hardware storing the memory object, and determine the runtime based on a minimum value of the first time value and the second time value.

Example 5 includes the apparatus of example 4, wherein the code object is a second code object, and the processor circuitry is to determine a third time value associated with execution of a first code object based on the first hardware storing the memory object during execution of the first code object, the first code object to be executed prior to the second code object, determine a fourth time value associated with execution of the first code object based on the second hardware storing the memory object during execution of the first code object, and determine the data transfer penalty based on a fifth time value associated with transfer of the memory object from the second hardware to the first hardware, the first time value based on the third time value, the fourth time value, and the fifth time value.

Example 6 includes the apparatus of example 4, wherein the code object is a second code object, and the processor circuitry is to determine a third time value associated with execution of a first code object based on the first hardware storing the memory object during execution of the first code object, the first code object to be executed prior to the second code object, determine a fourth time value associated with execution of the first code object based on the second hardware storing the memory object during execution of the first code object, and determine the data transfer penalty based on a fifth time value associated with transferring the memory object from the first hardware to the second hardware, the second time value based on the third time value, the fourth time value, and the fifth time value.

Example 7 includes the apparatus of example 1, wherein the processor circuitry is to determine a first time value associated with performance of an in-place access operation on the memory object, determine a second time value associated with performance of a migration operation on the memory object, and in response to a determination that the first time value is less than the second time value identify the data transfer penalty to be the first time value, and select the memory operation to be the in-place access operation.

Example 8 includes the apparatus of example 1, wherein the processor circuitry is to determine a first time value associated with performance of an in-place access operation on the memory object, determine a second time value associated with performance of a migration operation on the memory object, and in response to a determination that the second time value is less than the first time value identify the data transfer penalty to be the second time value, and select the memory operation to be the migration operation.

Example 9 includes the apparatus of example 1, wherein the first hardware is a central processor unit and the second hardware is a graphics processor unit.

Example 10 includes the apparatus of example 1, wherein the processor circuitry is to generate the executable file as a software development kit.

Example 11 includes at least one non-transitory computer readable storage medium comprising instructions that, when executed, cause processor circuitry to at least determine a runtime associated with execution of a code object by a heterogeneous electronic device based on at least one of a location of a memory object or a data transfer penalty, the data transfer penalty associated with access of the memory object in response to execution of the code object, identify a memory operation for the memory object based on the runtime, and generate an executable file based on the memory operation, the executable file, when executed, to cause execution of the code object by at least one of first hardware or second hardware of the heterogeneous electronic device based on the memory operation.

Example 12 includes the at least one non-transitory computer readable storage medium of example 11, wherein the instructions, when executed, cause the processor circuitry to determine the data transfer penalty based on one of (i) an in-place access operation from a first data buffer of the first hardware by the second hardware or (ii) a migration operation to transfer the memory object from the first data buffer to a second data buffer of the second hardware.

Example 13 includes the at least one non-transitory computer readable storage medium of example 11, wherein the instructions, when executed, cause the processor circuitry to identify an offload operation to transfer execution of the code object from the first hardware to the second hardware based on at least one of the runtime or the memory operation, and the generation of the executable file to be based on the offload operation.

Example 14 includes the at least one non-transitory computer readable storage medium of example 11, wherein the instructions, when executed, cause the processor circuitry to determine a first time value associated with the second hardware executing the code object based on the first hardware storing the memory object, determine a second time value associated with the second hardware executing the code object based on the second hardware storing the memory object, and determine the runtime based on a minimum value of the first time value and the second time value.

Example 15 includes the at least one non-transitory computer readable storage medium of example 14, wherein the code object is a second code object, and the instructions, when executed, cause the processor circuitry to determine a third time value associated with execution of a first code object based on the first hardware storing the memory object during execution of the first code object, the first code object to be executed prior to the second code object, determine a fourth time value associated with execution of the first code object based on the second hardware storing the memory object during execution of the first code object, and determine the data transfer penalty based on a fifth time value associated with transfer of the memory object from the second hardware to the first hardware, the first time value based on the third time value, the fourth time value, and the fifth time value.

Example 16 includes the at least one non-transitory computer readable storage medium of example 14, wherein the code object is a second code object, and the instructions, when executed, cause the processor circuitry to determine a third time value associated with execution of a first code object based on the first hardware storing the memory object during execution of the first code object, the first code object to be executed prior to the second code object, determine a fourth time value associated with execution of the first code object based on the second hardware storing the memory object during execution of the first code object, and determine the data transfer penalty based on a fifth time value associated with transfer of the memory object from the first hardware to the second hardware, the second time value based on the third time value, the fourth time value, and the fifth time value.

Example 17 includes the at least one non-transitory computer readable storage medium of example 11, wherein the instructions, when executed, cause the processor circuitry to determine a first time value associated with performance of an in-place access operation on the memory object, determine a second time value associated with performance of a migration operation on the memory object, and in response to a determination that the first time value is less than the second time value identify the data transfer penalty to be the first time value, and select the memory operation to be the in-place access operation.

Example 18 includes the at least one non-transitory computer readable storage medium of example 11, wherein the instructions, when executed, cause the processor circuitry to determine a first time value associated with performance of an in-place access operation on the memory object, determine a second time value associated with performance of a migration operation on the memory object, and in response to a determination that the second time value is less than the first time value identify the data transfer penalty to be the second time value, and select the memory operation to be the migration operation.

Example 19 includes the at least one non-transitory computer readable storage medium of example 11, wherein the first hardware is a central processor unit and the second hardware is a graphics processor unit.

Example 20 includes the at least one non-transitory computer readable storage medium of example 11, wherein the instructions, when executed, cause the processor circuitry to generate the executable file as a software development kit.

Example 21 includes an apparatus for improving data transfer for a heterogeneous program, the apparatus comprising means for determining a runtime associated with executing a code object by a heterogeneous electronic device based on at least one of a location of a memory object or a data transfer penalty, the data transfer penalty associated with access of the memory object in response to execution of the code object, means for identifying a memory operation for the memory object based on the runtime, and means for generating an executable file based on the memory operation, the executable file to cause execution of the code object by at least one of first hardware or second hardware of the heterogeneous electronic device based on the memory operation.

Example 22 includes the apparatus of example 21, wherein the means for determining is to determine the data transfer penalty based on one of (i) an in-place access operation from a first data buffer of the first hardware by the second hardware or (ii) a migration operation to transfer the memory object from the first data buffer to a second data buffer of the second hardware.

Example 23 includes the apparatus of example 21, wherein the means for generating is to identify an offload operation to transfer execution of the code object from the first hardware to the second hardware based on at least one of the runtime or the memory operation, and the generating of the executable file is to be based on the offload operation.

Example 24 includes the apparatus of example 21, wherein the means for determining is to determine a first time value associated with the second hardware executing the code object based on the first hardware storing the memory object, determine a second time value associated with the second hardware executing the code object based on the second hardware storing the memory object, and determine the runtime based on a minimum value of the first time value and the second time value.

Example 25 includes the apparatus of example 24, wherein the code object is a second code object, and the means for determining is to determine a third time value associated with execution of a first code object based on the first hardware storing the memory object during execution of the first code object, the first code object to be executed prior to the second code object, determine a fourth time value associated with execution of the first code object based on the second hardware storing the memory object during execution of the first code object, and determine the data transfer penalty based on a fifth time value associated with transferring the memory object from the second hardware to the first hardware, the first time value based on the third time value, the fourth time value, and the fifth time value.

Example 26 includes the apparatus of example 24, wherein the code object is a second code object, and the means for determining is to determine a third time value associated with execution of a first code object based on the first hardware storing the memory object during execution of the first code object, the first code object to be executed prior to the second code object, determine a fourth time value associated with execution of the first code object based on the second hardware storing the memory object during execution of the first code object, and determine the data transfer penalty based on a fifth time value associated with transferring the memory object from the first hardware to the second hardware, the second time value based on the third time value, the fourth time value, and the fifth time value.

Example 27 includes the apparatus of example 21, wherein the means for determining is to determine a first time value associated with performing an in-place access operation on the memory object, and determine a second time value associated with performing a migration operation on the memory object, and in response to a determination that the first time value is less than the second time value, identify the data transfer penalty to be the first time value, and means for selecting the memory operation to be the in-place access operation based on the determination.

Example 28 includes the apparatus of example 21, wherein the means for determining is to determine a first time value associated with performing an in-place access operation on the memory object, determine a second time value associated with performing a migration operation on the memory object, and in response to a determination that the second time value is less than the first time value, identify the data transfer penalty to be the second time value, and means for selecting the memory operation to be the migration operation based on the determination.

Example 29 includes the apparatus of example 21, wherein the first hardware is a central processor unit and the second hardware is a graphics processor unit.

Example 30 includes the apparatus of example 21, wherein the means for generating is to generate the executable file as a software development kit.

Example 31 includes a method for improving data transfer for a heterogeneous program, the method comprising determining a runtime associated with executing a code object by a heterogeneous electronic device based on at least one of a location of a memory object or a data transfer penalty, the data transfer penalty associated with access of the memory object in response to execution of the code object, identifying a memory operation for the memory object based on the runtime, and generating an executable file based on the memory operation, the executable file to cause execution of the code object by at least one of first hardware or second hardware of the heterogeneous electronic device based on the memory operation.

Example 32 includes the method of example 31, wherein the data transfer penalty is based on one of (i) an in-place access operation from a first data buffer of the first hardware by the second hardware or (ii) a migration operation to transfer the memory object from the first data buffer to a second data buffer of the second hardware.

Example 33 includes the method of example 31, further including identifying an offload operation to transfer execution of the code object from the first hardware to the second hardware based on at least one of the runtime or the memory operation, and the generating of the executable file to be based on the offload operation.

Example 34 includes the method of example 31, further including determining a first time value associated with the second hardware executing the code object based on the first hardware storing the memory object, determining a second time value associated with the second hardware executing the code object based on the second hardware storing the memory object, and determining the runtime based on a minimum value of the first time value and the second time value.

Example 35 includes the method of example 34, wherein the code object is a second code object, and the method further including determining a third time value associated with execution of a first code object based on the first hardware storing the memory object during execution of the first code object, the first code object to be executed prior to the second code object, determining a fourth time value associated with execution of the first code object based on the second hardware storing the memory object during execution of the first code object, and determining the data transfer penalty based on a fifth time value associated with transferring the memory object from the second hardware to the first hardware, the first time value based on the third time value, the fourth time value, and the fifth time value.

Example 36 includes the method of example 34, wherein the code object is a second code object, and the method further including determining a third time value associated with execution of a first code object based on the first hardware storing the memory object during execution of the first code object, the first code object to be executed prior to the second code object, determining a fourth time value associated with execution of the first code object based on the second hardware storing the memory object during execution of the first code object, and determining the data transfer penalty based on a fifth time value associated with transferring the memory object from the first hardware to the second hardware, the second time value based on the third time value, the fourth time value, and the fifth time value.

Example 37 includes the method of example 31, further including determining a first time value associated with performing an in-place access operation on the memory object, determining a second time value associated with performing a migration operation on the memory object, and in response to determining that the first time value is less than the second time value identifying the data transfer penalty to be the first time value, and selecting the memory operation to be the in-place access operation.

Example 38 includes the method of example 31, further including determining a first time value associated with performing an in-place access operation on the memory object, determining a second time value associated with performing a migration operation on the memory object, and in response to determining that the second time value is less than the first time value identifying the data transfer penalty to be the second time value, and selecting the memory operation to be the migration operation.

Example 39 includes the method of example 31, wherein the first hardware is a central processor unit and the second hardware is a graphics processor unit.

Example 40 includes the method of example 31, wherein the executable file is a software development kit.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus for improving data transfer for a heterogeneous program, the apparatus comprising:
   instructions in the apparatus; and
   processor circuitry to at least one of execute or instantiate the instructions to:
   determine a runtime associated with execution of a code object by a heterogeneous electronic device based on the lesser of a) a first data transfer penalty incurred by first hardware of the heterogeneous electronic device storing a memory object or b) a second data transfer penalty incurred by second hardware of the heterogeneous electronic device storing the memory object, the first data transfer penalty and the second data transfer penalty associated with access of the memory object in response to execution of the code object;
   identify a memory operation for the memory object based on the runtime; and
   generate an executable file based on the memory operation, the executable file, when executed, to cause execution of the code object by at least one of the first hardware or the second hardware of the heterogeneous electronic device based on the memory operation.

2. The apparatus of claim 1, wherein the processor circuitry is to determine the first data transfer penalty and the second data transfer penalty based on one of (i) an in-place access operation from a first data buffer of the first hardware by the second hardware or (ii) a migration operation to transfer the memory object from the first data buffer to a second data buffer of the second hardware.

3. The apparatus of claim 1, wherein the processor circuitry is to identify an offload operation to transfer execution of the code object from the first hardware to the second hardware based on at least one of the runtime or the memory operation, and the generation of the executable file is based on the offload operation.

4. The apparatus of claim 1, wherein the processor circuitry is to:
determine a first time value associated with the second hardware executing the code object; and
determine a second time value associated with the second hardware executing the code object.

5. The apparatus of claim 4, wherein the code object is a second code object, and the processor circuitry is to:
determine a third time value associated with execution of a first code object based on the first hardware storing the memory object during execution of the first code object, the first code object to be executed prior to the second code object;
determine a fourth time value associated with execution of the first code object based on the second hardware storing the memory object during execution of the first code object; and
determine a third data transfer penalty based on a fifth time value associated with transfer of the memory object from the second hardware to the first hardware, the first time value based on the third time value, the fourth time value, and the fifth time value.

6. The apparatus of claim 4, wherein the code object is a second code object, and the processor circuitry is to:
determine a third time value associated with execution of a first code object based on the first hardware storing the memory object during execution of the first code object, the first code object to be executed prior to the second code object;
determine a fourth time value associated with execution of the first code object based on the second hardware storing the memory object during execution of the first code object; and
determine a third data transfer penalty based on a fifth time value associated with transferring the memory object from the first hardware to the second hardware, the second time value based on the third time value, the fourth time value, and the fifth time value.

7. The apparatus of claim 1, wherein the processor circuitry is to:
determine a first time value associated with performance of an in-place access operation on the memory object;
determine a second time value associated with performance of a migration operation on the memory object; and
in response to a determination that the first time value is less than the second time value:
identify the second data transfer penalty to be the first time value; and
select the memory operation to be the in-place access operation.

8. The apparatus of claim 1, wherein the processor circuitry is to:
determine a first time value associated with performance of an in-place access operation on the memory object;
determine a second time value associated with performance of a migration operation on the memory object; and
in response to a determination that the second time value is less than the first time value:
identify the first data transfer penalty to be the second time value; and
select the memory operation to be the migration operation.

9. The apparatus of claim 1, wherein the first hardware is a central processor unit and the second hardware is a graphics processor unit.

10. The apparatus of claim 1, wherein the processor circuitry is to generate the executable file as a software development kit.

11. An apparatus for improving data transfer for a heterogeneous program, the apparatus comprising:
means for determining a runtime associated with execution of a code object by a heterogeneous electronic device based on the lesser of a) a first data transfer penalty incurred by first hardware of the heterogeneous electronic device storing a memory object or b) a second data transfer penalty incurred by second hardware of the heterogeneous electronic device storing the memory object, the first data transfer penalty and the second data transfer penalty associated with access of the memory object in response to execution of the code object;
means for identifying a memory operation for the memory object based on the runtime; and
means for generating an executable file based on the memory operation, the executable file to cause execution of the code object by at least one of the first hardware or the second hardware of the heterogeneous electronic device based on the memory operation.

12. The apparatus of claim 11, wherein the means for generating is to identify an offload operation to transfer execution of the code object from the first hardware to the second hardware based on at least one of the runtime or the memory operation, and the generating of the executable file is to be based on the offload operation.

13. The apparatus of claim 11, wherein the means for determining is to:
determine a first time value associated with the second hardware executing the code object; and
determine a second time value associated with the second hardware executing the code object.

14. The apparatus of claim 13, wherein the code object is a second code object, and the means for determining is to:
determine a third time value associated with execution of a first code object based on the first hardware storing the memory object during execution of the first code object, the first code object to be executed prior to the second code object;
determine a fourth time value associated with execution of the first code object based on the second hardware storing the memory object during execution of the first code object; and
determine a third data transfer penalty based on a fifth time value associated with transferring the memory object from the second hardware to the first hardware, the first time value based on the third time value, the fourth time value, and the fifth time value.

15. The apparatus of claim 13, wherein the code object is a second code object, and the means for determining is to:
- determine a third time value associated with execution of a first code object based on the first hardware storing the memory object during execution of the first code object, the first code object to be executed prior to the second code object;
- determine a fourth time value associated with execution of the first code object based on the second hardware storing the memory object during execution of the first code object; and
- determine a third data transfer penalty based on a fifth time value associated with transferring the memory object from the first hardware to the second hardware, the second time value based on the third time value, the fourth time value, and the fifth time value.

16. The apparatus of claim 11, wherein:
the means for determining is to:
- determine a first time value associated with performing an in-place access operation on the memory object; and
- determine a second time value associated with performing a migration operation on the memory object; and
- in response to a determination that the first time value is less than the second time value, identify the second data transfer penalty to be the first time value; and means for selecting the memory operation to be the in-place access operation based on the determination.

17. The apparatus of claim 11, wherein:
the means for determining is to:
- determine a first time value associated with performing an in-place access operation on the memory object;
- determine a second time value associated with performing a migration operation on the memory object; and
- in response to a determination that the second time value is less than the first time value, identify the first data transfer penalty to be the second time value; and means for selecting the memory operation to be the migration operation based on the determination.

18. At least one non-transitory computer readable storage medium comprising instructions that, when executed, cause processor circuitry to at least:
- determine a runtime associated with execution of a code object by a heterogeneous electronic device based on the lesser of a) a first data transfer penalty incurred by first hardware of the heterogeneous electronic device storing a memory object or b) a second data transfer penalty incurred by second hardware of the heterogeneous electronic device storing the memory object, the first data transfer penalty and the second data transfer penalty associated with access of the memory object in response to execution of the code object;
- identify a memory operation for the memory object based on the runtime; and
- generate an executable file based on the memory operation, the executable file, when executed, to cause execution of the code object by at least one of the first hardware or the second hardware of the heterogeneous electronic device based on the memory operation.

19. The at least one non-transitory computer readable storage medium of claim 18, wherein the instructions, when executed, cause the processor circuitry to determine the first data transfer penalty and the second data transfer penalty based on one of (i) an in-place access operation from a first data buffer of the first hardware by the second hardware or (ii) a migration operation to transfer the memory object from the first data buffer to a second data buffer of the second hardware.

20. The at least one non-transitory computer readable storage medium of claim 18, wherein the instructions, when executed, cause the processor circuitry to identify an offload operation to transfer execution of the code object from the first hardware to the second hardware based on at least one of the runtime or the memory operation, and the generation of the executable file to be based on the offload operation.

21. The at least one non-transitory computer readable storage medium of claim 18, wherein the instructions, when executed, cause the processor circuitry to:
- determine a first time value associated with the second hardware executing the code object; and
- determine a second time value associated with the second hardware executing the code object.

22. The at least one non-transitory computer readable storage medium of claim 21, wherein the code object is a second code object, and the instructions, when executed, cause the processor circuitry to:
- determine a third time value associated with execution of a first code object based on the first hardware storing the memory object during execution of the first code object, the first code object to be executed prior to the second code object;
- determine a fourth time value associated with execution of the first code object based on the second hardware storing the memory object during execution of the first code object; and
- determine a third data transfer penalty based on a fifth time value associated with transfer of the memory object from the second hardware to the first hardware, the first time value based on the third time value, the fourth time value, and the fifth time value.

23. The at least one non-transitory computer readable storage medium of claim 21, wherein the code object is a second code object, and the instructions, when executed, cause the processor circuitry to:
- determine a third time value associated with execution of a first code object based on the first hardware storing the memory object during execution of the first code object, the first code object to be executed prior to the second code object;
- determine a fourth time value associated with execution of the first code object based on the second hardware storing the memory object during execution of the first code object; and
- determine a third data transfer penalty based on a fifth time value associated with transfer of the memory object from the first hardware to the second hardware, the second time value based on the third time value, the fourth time value, and the fifth time value.

24. The at least one non-transitory computer readable storage medium of claim 18, wherein the instructions, when executed, cause the processor circuitry to:
- determine a first time value associated with performance of an in-place access operation on the memory object;
- determine a second time value associated with performance of a migration operation on the memory object; and
- in response to a determination that the first time value is less than the second time value:
  - identify the second data transfer penalty to be the first time value; and
  - select the memory operation to be the in-place access operation.

25. The at least one non-transitory computer readable storage medium of claim 18, wherein the instructions, when executed, cause the processor circuitry to:
- determine a first time value associated with performance of an in-place access operation on the memory object;
- determine a second time value associated with performance of a migration operation on the memory object; and
- in response to a determination that the second time value is less than the first time value:
  - identify the first data transfer penalty to be the second time value; and
  - select the memory operation to be the migration operation.

\* \* \* \* \*